United States Patent
Shen et al.

(10) Patent No.: US 12,478,620 B2
(45) Date of Patent: Nov. 25, 2025

(54) CYANO-SUBSTITUTED CYCLIC HYDRAZINE DERIVATIVE AND APPLICATION THEREOF

(71) Applicant: E-nitiate Biopharmaceuticals (Hangzhou) Co., Ltd, Hangzhou (CN)

(72) Inventors: Wang Shen, Shanghai (CN); Pengfei Liu, Shanghai (CN); Rujun Bai, Shanghai (CN); Yufei Liu, Shanghai (CN); Qiuping Luo, Shanghai (CN); Pingbo Ke, Shanghai (CN); Yanchuan Gong, Shanghai (CN)

(73) Assignee: E-NITIATE BIOPHARMACEUTICALS (HANGZHOU) CO., LTD, Hangzhou (CN)

( * ) Notice: Subject to any disclaimer, the term of this patent is extended or adjusted under 35 U.S.C. 154(b) by 824 days.

(21) Appl. No.: 17/642,567

(22) PCT Filed: Jun. 11, 2020

(86) PCT No.: PCT/CN2020/095605
§ 371 (c)(1),
(2) Date: Mar. 11, 2022

(87) PCT Pub. No.: WO2021/051899
PCT Pub. Date: Mar. 25, 2021

(65) Prior Publication Data
US 2022/0339146 A1    Oct. 27, 2022

(30) Foreign Application Priority Data
Sep. 16, 2019   (CN) .......................... 201910872780.1

(51) Int. Cl.
| | | |
|---|---|---|
| *A61K 31/4545* | (2006.01) | |
| *A61K 31/438* | (2006.01) | |
| *A61K 31/439* | (2006.01) | |
| *A61K 31/496* | (2006.01) | |
| *A61K 31/55* | (2006.01) | |
| *A61K 45/06* | (2006.01) | |
| *C07D 471/14* | (2006.01) | |
| *C07D 519/00* | (2006.01) | |

(52) U.S. Cl.
CPC ........ *A61K 31/4545* (2013.01); *A61K 31/438* (2013.01); *A61K 31/439* (2013.01); *A61K 31/496* (2013.01); *A61K 31/55* (2013.01); *A61K 45/06* (2013.01); *C07D 471/14* (2013.01); *C07D 519/00* (2013.01)

(58) Field of Classification Search
CPC .............. A61K 31/4545; A61K 31/438; A61K 31/439; A61K 31/496; A61K 31/55; A61K 45/06; C07D 471/14; C07D 519/00
See application file for complete search history.

(56) References Cited

U.S. PATENT DOCUMENTS

| | | | |
|---|---|---|---|
| 8,461,328 B2 | 6/2013 | Babu et al. | |
| 2011/0201593 A1* | 8/2011 | Babu ....................... | A61P 35/02 |
| | | | 544/126 |
| 2019/0100495 A1 | 4/2019 | Redda et al. | |

FOREIGN PATENT DOCUMENTS

| | | |
|---|---|---|
| AU | 2016208906 | 7/2016 |
| CN | 1775756 | 5/2006 |
| CN | 101432275 A | 5/2009 |
| CN | 102118968 | 7/2011 |
| CN | 102395589 | 3/2012 |
| CN | 102596954 | 7/2012 |
| CN | 102712640 | 10/2012 |
| CN | 101432275 B | 10/2013 |
| CN | 110088105 | 8/2019 |
| CN | 110483514 | 11/2019 |

(Continued)

OTHER PUBLICATIONS

DeFusco, A.A., Strauss, M.J.; Journal of Heterocyclic Chemistry, v18, pp. 351-355 (1981). (Year: 1981).*
Ragnarsson, U.; Chemical Society Reviews, v30, pp. 205-213 (2001). (Year: 2001).*
Kirchmair, et al.; Nature Reviews, v387, pp. 387-404 (2015). (Year: 2015).*
Strittmatter, et al.; Ullmann's Encyclopedia of Industrial Chemistry, Wiley-VCH, Weinheim (2007). (Year: 2007).*

(Continued)

*Primary Examiner* — Jeffrey S Lundgren
*Assistant Examiner* — W. Justin Youngblood
(74) *Attorney, Agent, or Firm* — NORTON ROSE FULBRIGHT US LLP

(57) ABSTRACT

The present invention provides a cyano-substituted cyclic hydrazine derivative, comprising: a compound represented by the following structural formula or a stereoisomer, a geometric isomer, a tautomer, a racemate, a hydrate, a solvate, a metabolite and a pharmaceutically acceptable salt or a prodrug thereof. The compound is used for prevention, treatment or alleviation of autoimmune diseases or proliferative diseases in patients, and/or for inhibiting or modulating protein kinase activity.

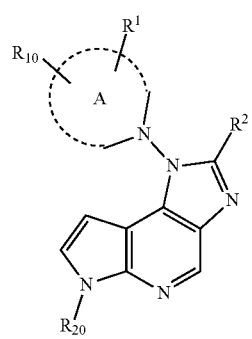

6 Claims, No Drawings

(56) References Cited

FOREIGN PATENT DOCUMENTS

| CN | 110724142 | 1/2020 |
|---|---|---|
| EA | 201791576 | 3/2018 |
| EP | 2523957 | 7/2011 |
| KR | 20140015162 | 2/2014 |
| WO | WO 2013/007765 | 1/2013 |
| WO | WO 2015/022663 | 2/2015 |
| WO | WO 2016/116025 | 7/2016 |

OTHER PUBLICATIONS

Testa, et al.; Chemistry & Biodiversity, v4, pp. 2031-2122 (2007). (Year: 2007).*
Fleischmann, et al.; The Lancet, v390, pp. 457-468; 2017 (Year: 2017).*
Brown, Bioisosteres in Medicinal Chemistry, Wiley-VCH, 2012 (Year: 2012).*
Zak, et al.; Journal of Medicinal Chemistry, v56, pp. 4764-4785; 2013 (Year: 2013).*
International Search Report and Written Opinion issued in Corresponding PCT Application No. PCT/CN2020/095605, dated Sep. 8, 2020.
Zak et al., "Identification of C-2 Hydroxyethyl Imidazopyrrolopyridines as Potent JAK1 Inhibitors with Favorable Physicochemical Properties and High Selectivity over JAK2" *Journal of Medicinal Chemistry* 2013, vol. 56, No. 11, ISSN: 0022-2623, pp. 4764-4785.
Extended European Search Report issued in corresponding European Application No. 20864315.5, dated Dec. 12, 2023.
Office Action issued in corresponding Eurasian Application No. 202290744, dated Apr. 24, 2023.
Office Action issued in corresponding Japanese Application No. 2022-516640, dated May 7, 2024.
Office Action issued in corresponding Korean Application No. 10-2022-7012392, dated Mar. 24, 2025 (No English translation provided).
Office Action issued in corresponding Mexican Application No. MX/a/2022/003130, dated Feb. 6, 2025 (No English translation provided).

* cited by examiner

CYANO-SUBSTITUTED CYCLIC HYDRAZINE DERIVATIVE AND APPLICATION THEREOF

CROSS REFERENCE TO RELATED APPLICATIONS

The present application is a national phase application under 35 U.S.C. § 371 of International Application No. PCT/CN2020/095605, filed Jun. 11, 2020, which claims the benefit of priority to Chinese patent application No. 201910872780.1, filed with the China National Intellectual Property Administration on Sep. 16, 2019, each of which are incorporated herein by reference in their entirety.

FIELD OF THE INVENTION

The present invention belongs to the field of drug synthesis, and in particular, the present invention relates to a JAK inhibitor, the preparation method and use thereof.

BACKGROUND OF THE INVENTION

Protein kinases are a class of enzymes that catalyze the phosphorylation of protein, and they are key factors in regulating cell signals such as the cell proliferation and cell differentiation, including the cell growth, survival, differentiation, organogenesis, morphogenesis, neovascularization, tissue repair and regeneration, etc.

The signal transduction of many cytokines, such as the interferon (IFN) family, glycoprotein 130 (gp130) family, γ-C family (common gamma chain, CD132 family-) and single chain family, involves Janus kinase family (JAK), as well as the signal transducers and activators of transcription (STAT) downstream of JAK. At present, there are four known members of JAK family in mammals: JAK1 (also known as Janus kinase-1), JAK2 (also known as Janus kinase-2), JAK3 (also known as Janus kinase-3) and TYK2 (also known as protein-tyrosine kinase 2).

The blocking signal transduction at JAK level provides a prospect for the development of therapeutic methods for inflammatory diseases, autoimmune diseases, bone marrow proliferative diseases and cancer. The inhibition of JAK also contributes to the treatment of skin immune diseases such as psoriasis and skin sensitization. Tofacitinib and Baricitinib, which have been launched on the market, are used to treat rheumatoid arthritis; ruxolitinib is used for the treatment of bone marrow fibrosis and acute graft-versus-host disease.

However, some JAK inhibitors also have some obvious toxic and side effects at present. JAK inhibitors can cause immune-related side effects: infection, including pneumonia, viral infection (such as herpes zoster infection), bacterial infection, actinomycosis infection (mycobacterial infection), fungal infection, decreased immunity (such as NK cell reduction) and anemia. But there are also some non-immune side effects, such as pulmonary embolism (which may be fatal). Studies have shown that the existing JAK inhibitors have no selectivity to JAK family kinase members, and its side effect of pulmonary embolism is related to the inhibition of JAK2.

To sum up, there is an urgent need in this field to develop inhibitors of Janus kinase or related kinases, especially inhibitors with high selectivity to JAK1.

SUMMARY OF INVENTION

The purpose of the present invention is to provide a novel inhibitor with high activity for JAK1 and high selectivity for JAK2, the preparation method and use thereof.

The present invention provides a cyano-substituted cyclic hydrazine derivative, which is characterized by being a compound represented by the following structural formula or its stereoisomer, geometric isomer, tautomer, racemate, hydrate, solvate, metabolite and pharmaceutically acceptable salt or prodrug;

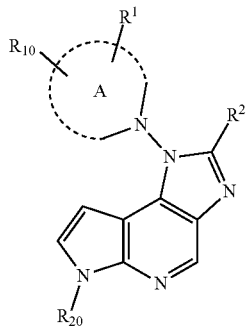

Wherein, ring A is heterocyclic group, fused heterocyclic group and spiroheterocyclic group;

The above $R^1$ is one or more substituents which are the same or different;

The above $R^1$ is selected from hydrogen, hydroxyl, halogen, amino, cyano, substituted or unsubstituted alkyl, substituted or unsubstituted alkoxy, substituted or unsubstituted heteroalkyl, substituted or unsubstituted cycloalkyl, substituted or unsubstituted heterocycloalkyl;

The above $R_{10}$ is selected from a cyano group or cyano-terminated group; the cyano-terminated group can be saturated or unsaturated in any form;

$R^2$ is selected from hydrogen, hydroxyl, halogen, nitro, amino, substituted amino, substituted or unsubstituted alkyl, substituted or unsubstituted heteroalkyl, substituted or unsubstituted cycloalkyl, substituted or unsubstituted heterocycloalkyl;

$R_{20}$ is selected from hydrogen, amino protecting group.

The above ring A is most preferably a heterocyclic group consisting of 4-9 atoms, or a fused heterocyclic group consisting of 6-12 atoms, or a spiroheterocyclic group consisting of 6-12 atoms;

Wherein, there are 1-3 heteroatoms selected from nitrogen, oxygen or sulfur.

The above ring A can be the structure shown in the following structure or its similar structure:

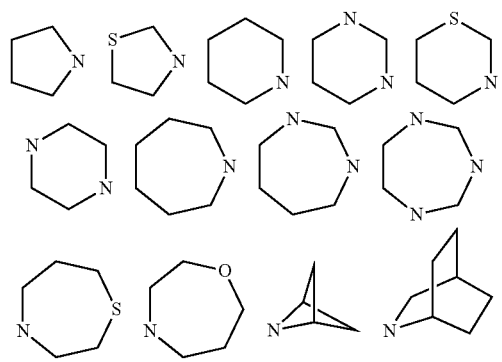

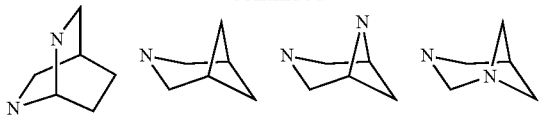

In the present invention, substituted or unsubstituted alkyl refers to:

The above unsubstituted alkyl is generally a branched alkyl with 6 or less carbon atoms or branched alkyl;

The above substituted alkyl refers to that one or more of the hydrogen atoms in the alkyl carbon chain are substituted by other groups, and the other groups mentioned here can be cycloalkyl (substituted in a form similar to

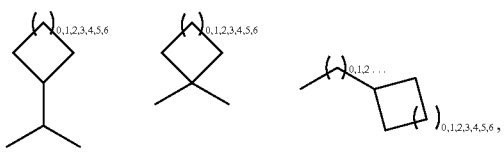

and any hydrogen atoms in the cycloalkyl ring can also be substituted by halogen, cyano, alkyl, hydroxyl, carboxyl, etc.), heterocycloalkyl (that is, on the basis of the above cycloalkyl, at least one carbon atom on the alkyl ring is replaced by oxygen, sulfur and nitrogen), halogen (F, Cl, Br, I), carboxyl, cyano (—CN), sulfonyl (—SO$_2$R$_a$, R$_a$ is alkyl, aryl, etc.), alkynyl (—C≡CH, —C≡CR$_b$, R$_b$ is alkyl, aryl, etc.), acylamino (—C(O)NR$_x$R$_y$, R$_x$R$_y$ is alkyl, aryl, etc.), ester (—C(O)O—R$_z$, R$_z$ is alkyl, aryl, etc.), aryl, heteroaryl and other groups;

In the present invention, substituted or unsubstituted cycloalkyl refers to:

The above unsubstituted cycloalkyl is generally a cycloalkyl with 3-8 carbon atoms;

The above substituted cycloalkyl refers to the substitution of one or more hydrogen atoms on the cyclyl ring with other groups, and the other groups mentioned here can be alkyl, substituted alkyl (ibid.), halogen (F, Cl, Br, I), carboxyl, cyano (—CN), sulfonyl (—SO$_2$R$_a$, R$_a$ is hydrogen, alkyl, aryl, etc.), alkynyl (—C≡CH, —C≡CR$_b$, R$_b$ is alkyl, aryl, etc.), acylamino (—C(O)NR$_x$R$_y$, R$_x$R$_y$ is alkyl, aryl, etc.), ester (—C(O)O—R$_z$, R$_z$ is alkyl, aryl, etc.), aryl, heteroaryl and other groups.

In the present invention, substituted or unsubstituted heteroalkyl means that on the basis of the substituted or unsubstituted alkyl, one or more carbon atoms in the carbon chain are replaced by oxygen, sulfur and nitrogen.

In the present invention, substituted or unsubstituted heterocycloalkyl means that on the basis of the substituted or unsubstituted cycloalkyl, one or more carbon atoms in the ring are replaced by oxygen, sulfur and nitrogen.

In the present invention, substituted or unsubstituted alkoxy refers to:

The above unsubstituted alkoxy is generally a branched alkoxy with 6 or less carbon atoms or branched alkoxy;

The above substituted alkoxy refers to that one or more of the hydrogen atoms in the alkyl carbon chain are substituted by other groups, and the other groups mentioned here can be cycloalkyl (substituted in a form similar to and any hydrogen atoms in the cycloalkyl ring can also be substituted by halogen, cyano, alkyl, hydroxyl, carboxyl, etc.), heterocycloalkyl (that is, on the basis of the above cycloalkyl, at least one carbon atom on the alkyl ring is replaced by oxygen, sulfur and nitrogen), halogen (F, Cl, Br, I), carboxyl, cyano (—CN), sulfonyl (—SO$_2$R$_a$, R$_a$ is hydrogen, alkyl, aryl, etc.), alkynyl (—C≡CH, —C≡CR$_b$, R$_b$ is alkyl, aryl, etc.), acylamino (—C(O)NR$_x$R$_y$, R$_x$R$_y$ is alkyl, aryl, etc.), ester (—C(O)O—R$_z$, R$_z$ is alkyl, aryl, etc.), aryl, heteroaryl and other groups.

In the present invention, the substituted amino means that one or more hydrogen atoms in the amino (—NH$_2$) are substituted by other groups, and the other groups referred to here can be alkyl, cycloalkyl, acylamino, ester and other groups.

Further, the present invention provides a cyano-substituted cyclic hydrazine derivative, wherein the structure is as following:

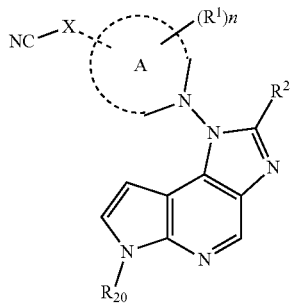

Wherein, n is selected from a natural number from 1 to 3;

The above X is selected from substituted or unsubstituted alkylene, substituted or unsubstituted heteroalkylene, —(CH$_2$)$_m$N(R$_3$)—, —(CH$_2$)$_m$C(O)N(R$_3$)—, —(CH$_2$)$_m$C(O)—;

The bond between X and ring A is single bond or double bond;

R$_3$ is selected from hydrogen, substituted or unsubstituted alkyl, substituted or unsubstituted heteroalkyl;

m is selected from a natural number from 1 to 3.

In the present invention, substituted or unsubstituted alkylene means:

The above unsubstituted alkylene refers to the form of —(CH$_2$)$_m$—;

The above substituted alkylene refers to that one or more hydrogen atoms in the —(CH$_2$)$_m$— carbon chain are substituted by other groups, and the other groups here can be alkyl, cycloalkyl (substituted in a form similar to

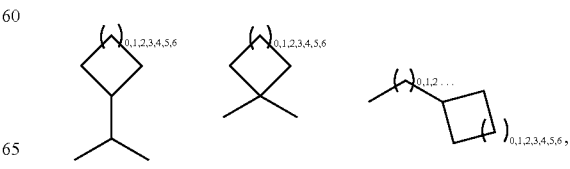

and any hydrogen atoms in the cycloalkyl ring can also be substituted by halogen, cyano, alkyl, hydroxyl, carboxyl, etc.), heterocycloalkyl (that is, on the basis of the above cycloalkyl, at least one carbon atom on the alkyl ring is replaced by oxygen, sulfur and nitrogen), halogen (F, Cl, Br, I), carboxyl, cyano (—CN), sulfonyl (—SO$_2$R$_a$, R$_a$ is hydrogen, alkyl, aryl, etc.), alkynyl (—C≡CH, —C≡CR$_b$, R$_b$ is alkyl, aryl, etc.), acylamino (—C(O)NR$_x$R$_y$, R$_x$R$_y$ is alkyl, aryl, etc.), ester (—C(O)O—R$_z$, R$_z$ is alkyl, aryl, etc.), aryl, heteroaryl and other groups.

In the present invention, substituted or unsubstituted heteroalkylene means that one or several carbon atoms of the unsubstituted alkylene are replaced by oxygen, sulfur and nitrogen.

Further, the present invention provides a cyano-substituted cyclic hydrazine derivative, wherein the structure is as following:

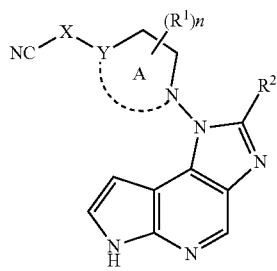

Wherein A, X, R$^1$ and R$^2$ are as defined above;

Y is selected from CR$^4$, N;

R$^4$ is selected from hydrogen, hydroxyl, substituted or unsubstituted alkyl, substituted or unsubstituted alkoxy.

Further, the present invention provides a cyano-substituted cyclic hydrazine derivative, wherein the structure is as following:

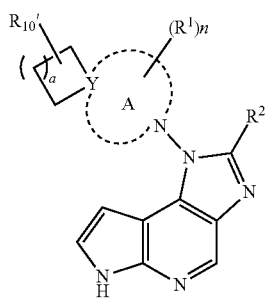

Wherein, the above a is 0, 1, 2, 3;

The above R$_{10}$' is selected from cyano-terminated group.

Further, the present invention provides a cyano-substituted cyclic hydrazine derivative, wherein the structure is as following:

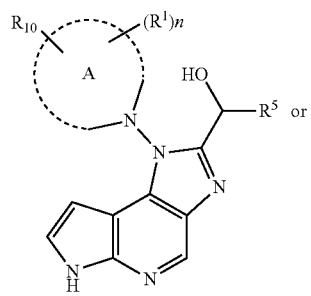

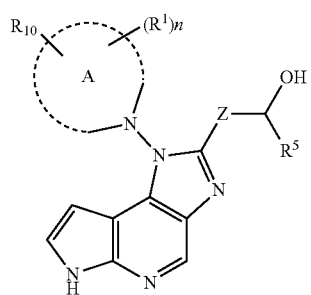

Wherein Z is selected from substituted or unsubstituted alkylene;

R$^5$ is selected from hydrogen, substituted or unsubstituted alkyl and substituted or unsubstituted heteroalkyl.

In addition, the present invention also provides a preparation method of the cyano-substituted cyclic hydrazine derivative, wherein the specific reaction equation is as follows:

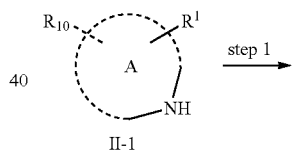

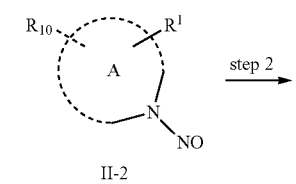

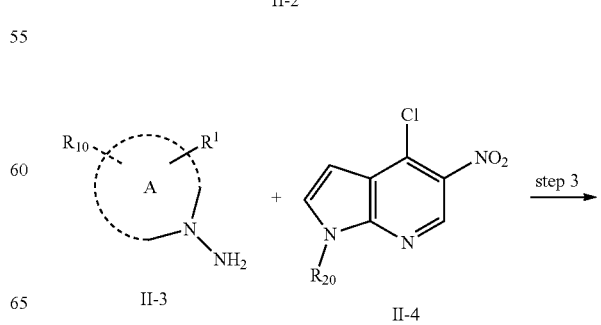

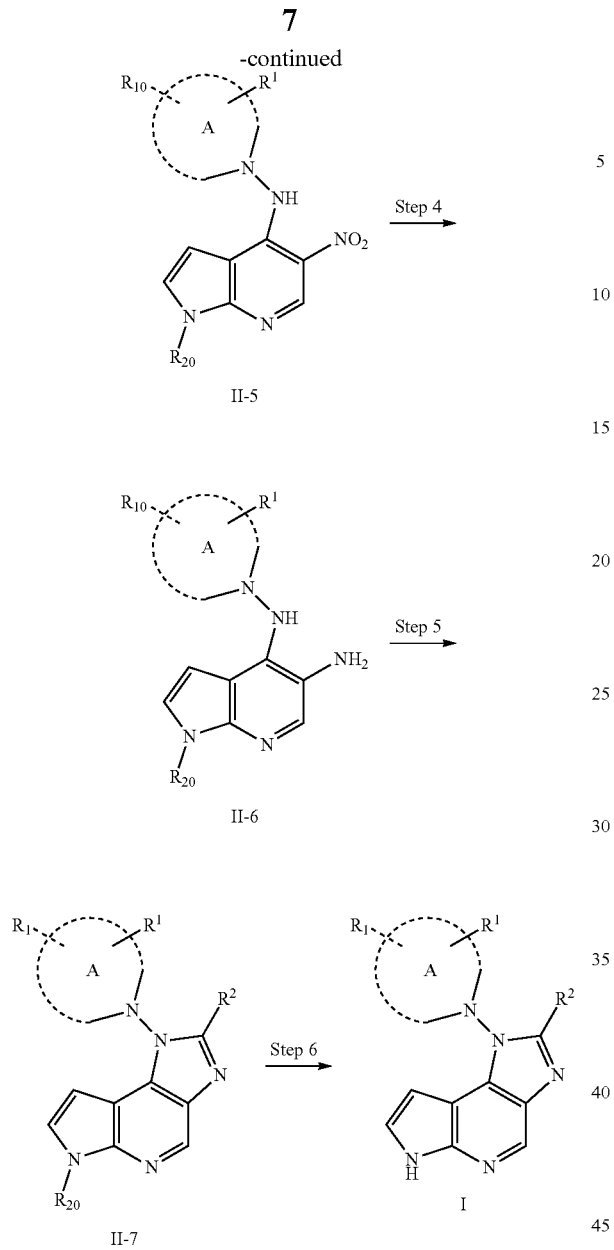

It is specifically manufactured by the following process steps:
S1. taking II-1 as a raw material, and nitrosylating the NH group on it to form nitroso product II-2;
S2. converting the nitroso product II-2 into compound II-3 through a reduction reaction;
S3. reacting compound II-3 with compound II-4 under alkaline conditions to obtain compound II-5;
S4. reducing the nitro in compound II-5 to amino by hydrogenation to obtain compound II-6;
S5. subjecting compound II-6 to a ring-closure reaction to obtain compound II-7;
S6. deprotecting compound II-7 to obtain the target product.

The specific process of the above reaction can be that the compound shown in Formula II-1 can be obtained directly or by known common synthesis methods. Formula II-1 can be nitrosated, $HNO_2$ (obtained by adding acid to $NaNO_2$), or alkyl nitrite (such as butyl nitrite and isoamyl nitrite) to produce "N" nitroso product II-2. Iron powder, or zinc powder, or catalytic hydrogenation can convert intermediate product II-2 to II-3. II-3 and II-4 (Ar is selected from phenyl or benzyl, refer to Kulagowski, J J; et al.; Journal of Medicinal Chemistry (2012) 55, 5901 for the synthesis) react under alkaline conditions (dried $Na_2CO_3$, anhydrous DMF, heated) to obtain compound II-5. The nitro in compound II-5 is reduced to amino by hydrogenation (Pt—C, 1 atmosphere hydrogen) to obtain II-6. Ring-closing reaction can be realized by a variety of known conditions. Common conditions are that II-6 reacts with triester ortho acid ($R^2$ $(OMe)_3$. Such as triethyl orthoacetate) under acidic conditions; Or II-6 and amide are dehydrated by triethyloxytetrafluoroboric acid or other onium salts. Finally, the sodium hydroxide aqueous solution is deprotected to generate the compound shown in Formula I.

In addition, the present invention also provides a pharmaceutical composition comprising at least one of the cyano-substituted cyclic hydrazine derivatives above and pharmaceutically acceptable carriers, excipients, diluents, adjuvants or vehicles;

Wherein, the amount of the cyano-substituted cyclic hydrazine derivative above is 0.01-99.9% of the total mass of the pharmaceutical composition.

Furthermore, the present invention also provides a pharmaceutical composition, wherein the pharmaceutical composition contains additional therapeutic agents;

the additional therapeutic agents are selected from anti-inflammatory drugs, immunomodulators or immunosuppressive agents, neurotrophic factors, active agents for treating cardiovascular diseases, active agents for treating diabetes and active agents for treating autoimmune diseases.

In addition, the compound or pharmaceutical composition provided by the present invention has the following use, wherein it is used for preventing, handling, treating or alleviating autoimmune diseases or proliferative diseases of patients, and/or for inhibiting or regulating the protein kinase activity.

Wherein, autoimmune diseases can be rheumatoid arthritis, psoriasis, type I diabetes, complications caused by organ transplantation, foreign body transplantation, diabetes, cancer, asthma, atopic dermatitis, autoimmune thyroid disease, ulcerative colitis, Crohn's disease, leukemia and lymphoma; lupus, multiple sclerosis, amyotrophic lateral sclerosis,

SPECIFIC EMBODIMENT

Example 1

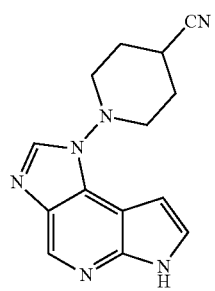 [SMILES: N#CC1CCN(n2cnc3cnc4[nH]ccc4c32)CC1]

1-(imidazo[4,5-d]pyrrolo[2,3-b]pyridine-1(6H)-yl) piperidine-4-carbonitrile

The mode of execution is as follows:

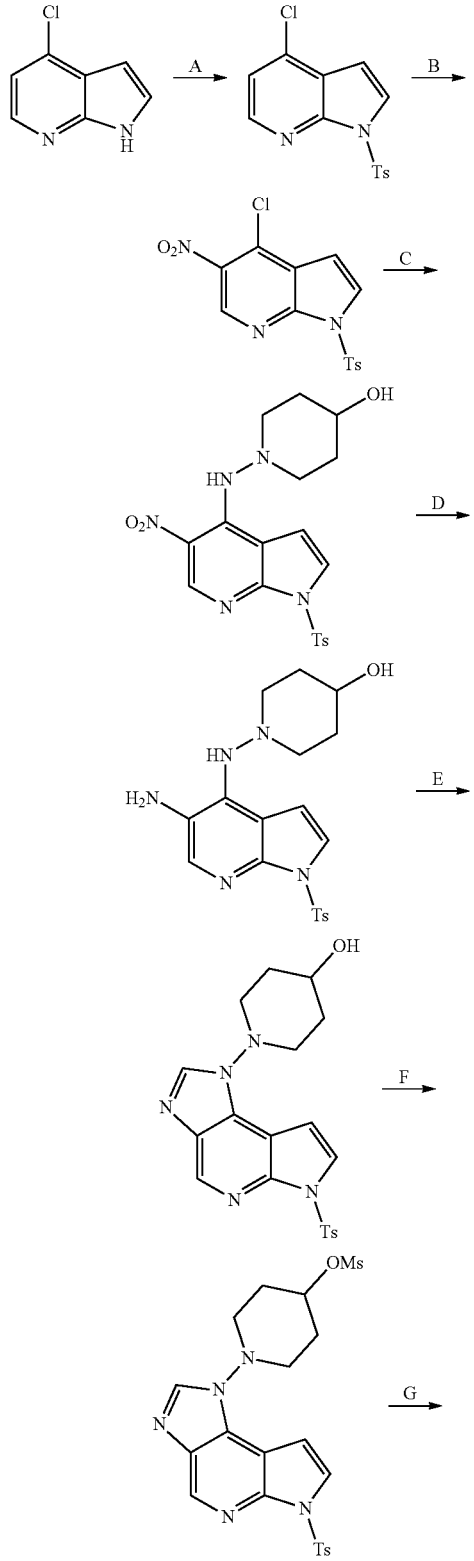

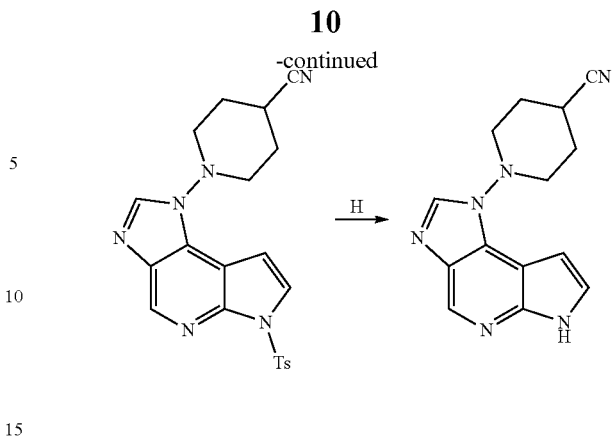

Step A

Dissolve 4-chloro-7-azaindole (50.0 g, 327.8 mmol) in 1 L dichloromethane, and then add triethylamine (66.3 g, 655.6 mmol), p-toluenesulfonyl chloride (64.4 g, 37.6 mmol) and 4-dimethylaminopyridine (0.4 g, 3.3 mmol) at 0° C. respectively. Stir for 16 h at room temperature. After the reaction, add 500 mL water for washing, and separate the organic phase; dry and filter; distill off the solvent under reduced pressure to obtain the compound 4-chloro-1-p-toluenesulfonyl-1H-pyrrolo[2,3-b]pyridine (99.8 g, yield 99%).

Step B

Dissolve compound 4-chloro-1-p-toluenesulfonyl-1H-pyrrolo[2,3-b]pyridine (50.0 g, 163.0 mmol) in 600 mL dichloromethane. Add tetrabutyl ammonium nitrate (74.4 g, 244.5 mmol) and trifluoroacetic anhydride (53.1 g, 252.6 mmol) at 0° C., and then react at room temperature for 20 h under nitrogen protection. After the reaction, add 500 mL saturated sodium bicarbonate aqueous solution for quenching; separate the organic phases, and extract the aqueous phase in twice with 1.2 L dichloromethane. Combine the organic phases and wash with appropriate amount of water and saturated sodium chloride aqueous solution. Dry the organic phase with anhydrous sodium sulfate, filter and treat by rotary evaporation. Slurrying the obtained slurry ultrasonically with 80 mL ethyl acetate, filter and dry the filter cake to obtain compound 4-chloro-5-nitro-1-p-toluenesulfonyl-1H-pyrrolo[2,3-b]pyridine (30.1 g, yield rate 52%). $^1$H NMR (400 MHz, DMSO-$d_6$) δ 9.08 (s, 1H), 8.26 (d, J=4.0 Hz, 1H), 8.05 (d, J=8.4 Hz, 2H), 7.47 (d, J=8.4 Hz, 2H), 7.09 (d, J=4.0 Hz, 1H), 2.37 (s, 3H).

Step C

Add the compound 4-chloro-5-nitro-1-p-toluenesulfonyl-1H-pyrrolo[2,3-b]pyridine (1.58 g, 4.5 mmol), N,N-diisopropyl ethylamine (1.75 g, 13.5 mmol) and 1-amino-4-piperidinol (0.58 g, 5.0 mmol) to 50 mL isopropanol (suspension). Stir the reaction at 95° C. for 16 h. After the reaction, cool it to room temperature; add 50 mL water and extract with ethyl acetate (3*50 mL). Combine the organic phases and dry with anhydrous sodium sulfate. Obtain compound 1-((5-nitro-1-p-toluenesulfonyl-1H-pyrrolo[2,3-b]pyridine-4-yl)amino)piperidine-4-ol (0.91 g, yield rate 47%) by filtration, spin drying and column chromatography purification. LCMS ESI(+) m/z: 432.2 (M+1).

Step D

Add compound 1-((5-nitro-1-p-toluenesulfonyl-1H-pyrrolo[2,3-b]pyridine-4-yl)amino)piperidine-4-ol (0.91 g, 2.1 mmol) to the mixed solution (suspension) of 15 mL ethanol and 5 mL water, and then add ammonium chloride solid (0.45 g, 8.4 mmol) and iron powder (0.59 g, 10.5 mmol) in turn. Heat to 80° C. and stir for 4.5 h. After the reaction, filter the reaction solution and wash the filter residue with appropriate amount of ethyl acetate. Concentrate the filtrate under reduced pressure, and obtain compound 1-((5-amino-1-p-toluenesulfonyl-1H-pyrrolo[2,3-b]pyridine-4-yl)amino)piperidine-4-ol (0.75 g, yield rate 88%) by silica gel column chromatography. LCMS ESI(+) m/z: 402.2 (M+1).

Step E

Dissolve compound 1-((5-amino-1-p-toluenesulfonyl-1H-pyrrolo[2,3-b]pyridine-4-yl)amino)piperidine-4-ol (750 mg, 1.87 mmol) in 10 mL acetic acid, and add triethyl orthoformate (2.77 g, 18.7 mmol). Heat to 116° C. and stir for 0.5 h. After the reaction, concentrate under reduced pressure, and obtain compound 1-(6-p-toluenesulfonyl imidazo[4,5-d]pyrrolo[2,3-b]pyridine-1(6H)-yl)piperidin-4-ol (453 mg, yield rate 59%) by silica gel column chromatography. LCMS ESI(+) m/z: 412.2 (M+1).

Step F

Dissolve compound 1-(6-p-toluenesulfonyl imidazo[4,5-d]pyrrolo[2,3-b]pyridine-1(6H)-yl)piperidin-4-ol (150 mg, 0.36 mmol) in 10 mL dichloromethane, and add methyl sulfonyl chloride (82 mg, 0.72 mmol) and triethylamine (109 mg, 1.08 mmol). Stir at room temperature for 1 h. After the reaction, concentrate under reduced pressure, and obtain compound 1-(6-p-toluenesulfonyl imidazo[4,5-d]pyrrolo[2,3-b]pyridine-1(6H)-yl)piperidin-4-yl methanesulfonate (144 mg, yield rate 82%) by silica gel column chromatography. LCMS ESI(+) m/z: 490.2 (M+1).

Step G

Dissolve compound 1-(6-p-toluenesulfonyl imidazolo[4,5-d]Pyrrolo[2,3-b]Pyridine-1(6H)-yl)piperidin-4-yl methanesulfonate (95 mg, 0.19 mmol) in 5 mL N,N0-dimethylformamide, and add sodium cyanide (82 mg, 1.67 mmol). Heat to 80° C. and stir the reaction for 16 h under nitrogen protection. After the reaction, add appropriate amount of sodium hydroxide aqueous solution, and extract with ethyl acetate (3*20 mL). Combine the organic phases and dry with anhydrous sodium sulfate. After filtration and spin-drying, obtain compound 1-(6-p-toluenesulfonyl imidazo[4,5-d]pyrrolo[2,3-b]pyridine-1(6H)-yl)piperidine-4-carbonitrile (42 mg, yield rate 50%). LCMS ESI(+) m/z: 421.2 (M+1).

Step H

Dissolve compound 1-(6-p-toluenesulfonyl imidazo[4,5-d]pyrrolo[2,3-b]pyridine-1(6H)-yl)piperidine-4-carbonitrile (42 mg, 0.1 mmol) in 8 mL methanol, and add potassium tert-butoxide (56 mg, 0.5 mmol). Stir at room temperature for 6 h. After the reaction, adjust the pH to 7 to 8 with acetic acid, and concentrate under reduced pressure. Prepare compound 1-(imidazo[4,5-d]pyrrolo[2,3-b]pyridine-1(6H)-yl)piperidine-4-carbonitrile (12 mg, yield rate 45%) by HPLC. $^1$H NMR (400 MHz, DMSO-$d_6$) δ 11.86 (s, 1H), 8.56 (s, 1H), 8.49 (s, 1H), 7.46 (t, 1H), 6.84 (dd, J=3.0, 1.8 Hz, 1H), 3.45-3.36 (m, 2H), 3.32-3.28 (m, 2H), 3.24-3.12 (m, 1H), 2.24-2.14 (m, 2H), 2.14-2.03 (m, 2H). LCMS ESI(+) m/z: 267.2 (M+1).

Example 2

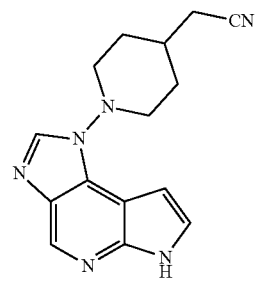 [SMILES: N#CCC1CCN(n2cnc3cnc4[nH]ccc4c32)CC1]

2-(1-(imidazo[4,5-d]pyrrolo[2,3-b]pyridine-1(6H)-yl)piperidin-4-yl)acetonitrile

The mode of execution is as follows:

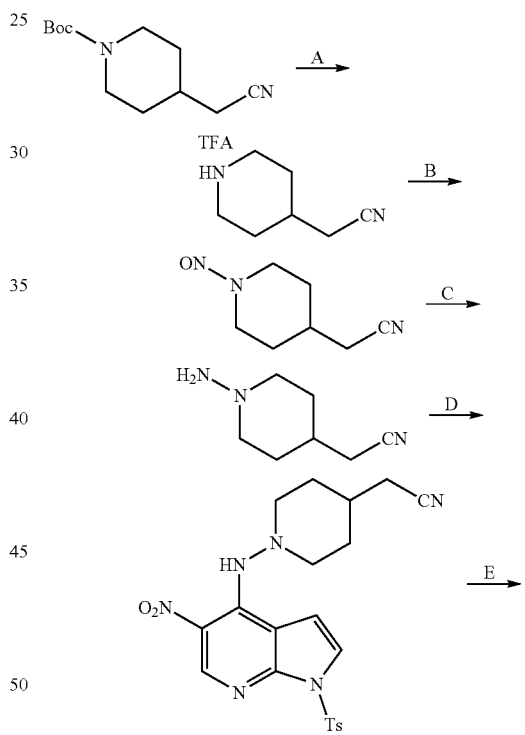

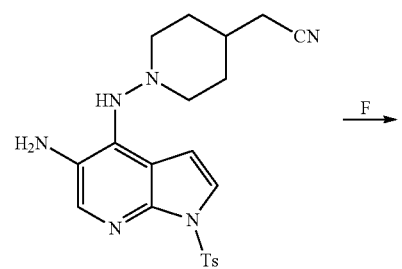

-continued

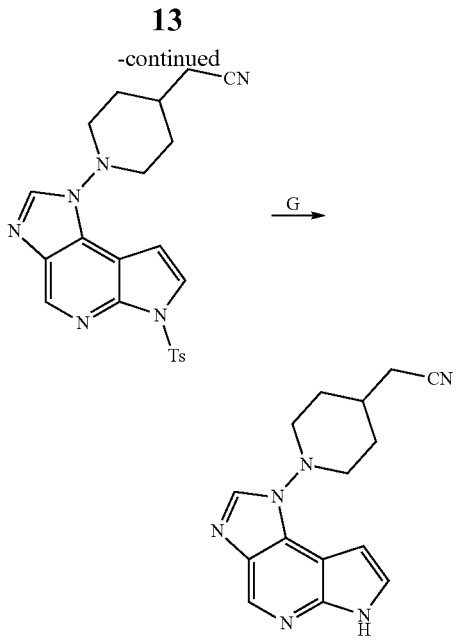

Step A

Dissolve 1-Boc-4-cyanomethylpiperidine (5.0 g, 22.3 mmol) in 20 mL dichloromethane, and add 20 mL trifluoroacetic acid slowly at 0° C. Then stir at room temperature for 2 h. After the reaction, obtain compound 4-cyanomethylpiperidine trifluoroacetate (5.53 g, yield rate 100%) by vacuum concentration.

Step B

Dissolve compound 4-cyanomethylpiperidine trifluoroacetate (5.53 g, 20.0 mmol) and sodium nitrite (2.76 g, 40.0 mmol) in 30 mL water, and slowly drop 5.0 mL acetic acid at ° C. Stir the reaction at 35° C. for 16 h. After the reaction, adjust the pH of the reaction solution to 8 with sodium carbonate and extract in five times with 250 mL ethyl acetate. Combine the organic phases, and dry with anhydrous sodium sulfate; filter, and spin-dry to obtain compound 1-nitroso-4-cyanomethylpiperidine (5.3 g, yield rate 70%). LCMS ESI(+) m/z: 154.1 (M+1).

Step C

Dissolve compound 1-nitroso-4-cyanomethylpiperidine (5.2 g, 20.0 mmol) in 15 mL methanol, add zinc powder (3.92 g, 60.0 mmol), and slowly drop 15 mL acetic acid at 0° C. After the addition, stir the reaction at 30° C. for 3 h. After the reaction, filter the reaction solution, and obtain compound 1-amino-4-cyanomethylpiperidine (5.3 g, yield rate 60%) by rotary evaporation of the filtrate. LCMS ESI(+) m/z: 140.1 (M+1).

Step D

Add compound 4-chloro-5-nitro-1-p-toluenesulfonyl-1H-pyrrolo[2,3-b]pyridine (3.51 g, 10.0 mmol), N,N-diisopropylethylamine (7.75 g, 60.0 mmol) and 1-amino-4-cyanomethyl piperidine (2.09 g, 15.0 mmol) to 200 mL isopropanol (suspension). Stir the reaction at 95° C. for 16 h. After the reaction, cool to room temperature, and add 200 mL water; extract with ethyl acetate (3*250 mL), and combine the organic phases; wash with 300 mL saturated saline solution, and dry with anhydrous sodium sulfate; filter and treat by rotary evaporation; purify by silica gel column chromatography to obtain compound 2-(1-((5-nitro-1-p-toluenesulfonyl-1H-pyrrolo[2,3-b]pyridine-4-yl)amino)piperidine-4-yl)acetonitrile (2.02 g, yield rate 44%). LCMS ESI(+) m/z: 455.1 (M+1).

Step E

Add compound 2-(1-((5-nitro-1-p-toluenesulfonyl-1H-pyrrolo[2,3-b]pyridine-4-yl)amino)piperidine-4-yl)acetonitrile (1.37 g, 3.0 mmol) to the mixed solution (suspension) of 60 mL ethanol and 20 mL water, and then add ammonium chloride solid (0.64 g, 12.0 mmol) and iron powder (0.67 g, 12.0 mmol) in turn. Heat to 80° C. and stir for 2.5 h. After the reaction, filter the reaction solution and wash the filter residue with 50 mL ethyl acetate. Add the filtrate with 50 mL water and extract with ethyl acetate (3*70 mL). Combine the organic phases, wash with 150 mL saturated saline solution and dry with anhydrous sodium sulfate. Filter it by suction, and concentrate the filtrate under reduced pressure to obtain compound 2-(1-((5-amino-1-p-toluenesulfonyl-1H-pyrrolo[2,3-b]pyridine-4-yl)amino)piperidin-4-yl)acetonitrile (1.02 g, yield rate 80%). LCMS ESI(+) m/z: 425.1 (M+1).

Step F

Dissolve compound 2-(1-((5-amino-1-p-toluenesulfonyl-1H-pyrrolo[2,3-b]pyridine-4-yl)amino)piperidine-4-yl acetonitrile (424 mg, 10 mmol) in 10 mL acetic acid, and add triethyl orthoformate (1.48 g, 10 mmol). Heat to 116° C. and stir for 0.5 h. After the reaction, concentrate under reduced pressure, and obtain compound 2-(1-(6-p-toluenesulfonyl imidazo[4,5-d]pyrrolo[2,3-b]pyridine-1(6H)-yl)piperidin-4-yl)acetonitrile (256 mg, yield rate 59%) by silica gel column chromatography. LCMS ESI(+) m/z: 435.2 (M+1).

Step G

Dissolve compound 2-(1-(6-p-toluenesulfonyl imidazo[4,5-d]pyrrolo[2,3-b]pyridine-1(6H)-yl)piperidin-4-yl)acetonitrile (95 mg, 1.0 mmol) in 10 mL tetrahydrofuran, and add 60% sodium hydrogen (40 mg, 1.0 mmol). Stir at room temperature for 1 h. After the reaction, adjust the pH to 7 to 8 with acetic acid, and concentrate under reduced pressure. Prepare compound 2-(1-(imidazo[4,5-d]pyrrolo[2,3-b]pyridine-1(6H)-yl)piperidine-4-yl)acetonitrile (24 mg, yield rate 42%) by silica gel column chromatography and HPLC. $^1$H NMR (400 MHz, CDCl$_3$) δ 10.07 (s, 1H), 8.81 (s, 1H), 8.13 (s, 1H), 7.40 (s, 1H), 6.80 (s, 1H), 3.56-3.19 (m, 4H), 2.48 (d, J=6.4 Hz, 2H), 2.13-2.08 (m, 2H), 2.07-1.94 (m, 1H), 1.91-1.75 (m, 2H). LCMS ESI(+) m/z: 281.2 (M+1).

Example 3

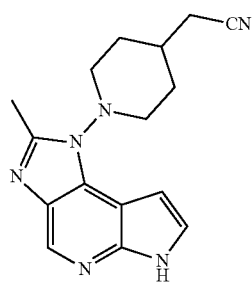 [SMILES: Cc1nc2cnc3[nH]ccc3c2n1N1CCC(CC#N)CC1]

2-(1-(methylimidazo[4,5-d]pyrrolo[2,3-b]pyridine-1 (6H)-yl)piperidin-4-yl)acetonitrile The mode of execution is as follows:

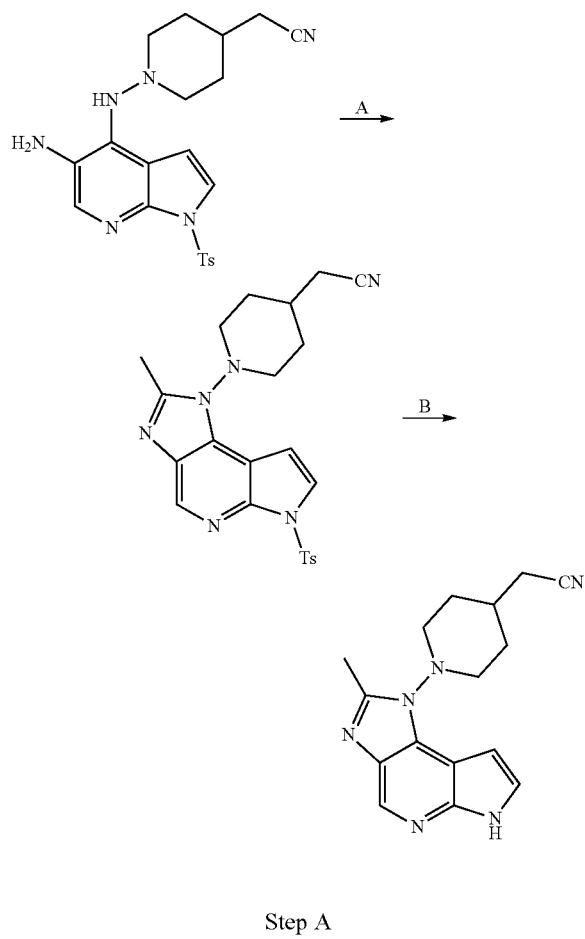

Step A

Dissolve triethyl oxyom boron tetrafluoride (190 mg, 1.0 mmol) and acetamide (59 mg, 1.0 mmol) in 10 mL tetrahydrofuran, and stir at room temperature for 2 h. Concentrate under reduced pressure to obtain the colorless oil, and dissolve it in 5 mL absolute ethanol; add it to 5 mL absolute ethanol to dissolve compound 2-(1-((5-amino-1-p-toluenesulfonyl-1H-pyrrolo[2,3-b]pyridine-4-yl)amino)piperidine-4-yl)acetonitrile (212 mg, 0.5 mmol). Heat to 75° C. and stir the reaction for 1 h. After the reaction, quench with saturated sodium bicarbonate aqueous solution, and add 30 mL water; extract with ethyl acetate (3*30 mL), and combine the organic phases; wash with 50 mL saturated saline solution and dry with anhydrous sodium sulfate. Filter it by suction, and concentrate the filtrate under reduced pressure; obtain compound 2-(1-(2-methyl-6-p-toluenesulfonyl imidazo[4,5-d]pyrrolo[2,3-b]pyridine-1(6H)-yl)piperidin-4-yl)acetonitrile (180 mg, yield rate 80%) by silica gel column chromatography. LCMS ESI(+) m/z: 448.1 (M+1).

Step B

Dissolve compound 2-(1-(2-methyl-6-p-toluenesulfonyl imidazo[4,5-d]pyrrolo[2,3-b]pyridine-1(6H)-yl)piperidin-4-yl)acetonitrile (180 mg, 0.4 mmol) in 9 mL methanol, and add 4 mL 1 N sodium hydroxide. Stir at room temperature for 16 h. After the reaction, adjust the pH to 7 to 8 with acetic acid, and concentrate under reduced pressure; prepare compound 2-(1-(2-methylimidazole[4,5-d]pyrrolo[2,3-b]pyridine-1(6H)-yl)piperidine-4-yl)acetonitrile (70 mg, yield rate 60%) by silica gel column chromatography and HPLC. $^1$H NMR (400 MHz, DMSO-$d_6$) δ 11.86 (s, 1H), 8.46 (s, 1H), 7.48 (t, J=3.0 Hz, 1H), 6.70 (dd, J=3.2 Hz, 1.6 Hz, 1H), 3.57 (t, J=10.2 Hz, 2H), 3.13 (d, J=10.2 Hz, 2H), 2.64 (d, J=6.4 Hz, 2H), 2.52 (s, 3H), 2.15-2.04 (m, 1H), 2.00-1.89 (m, 2H), 1.68-1.56 (m, 2H). LCMS ESI(+) m/z: 295.2 (M+1).

Example 4

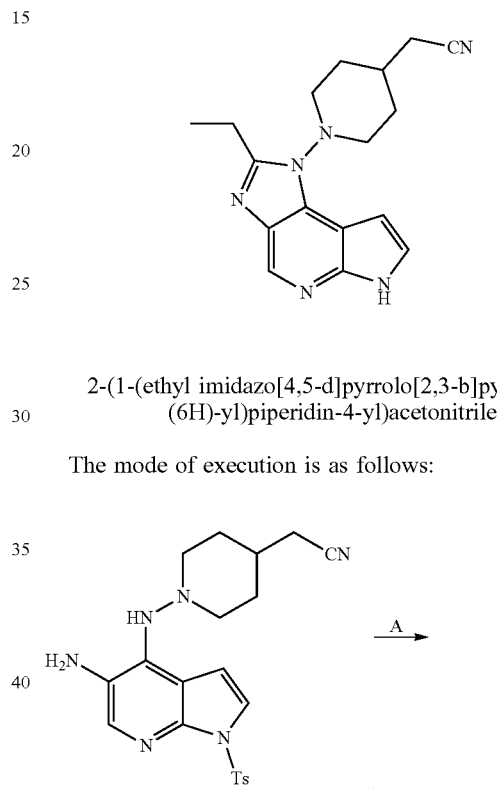

2-(1-(ethyl imidazo[4,5-d]pyrrolo[2,3-b]pyridine-1 (6H)-yl)piperidin-4-yl)acetonitrile The mode of execution is as follows:

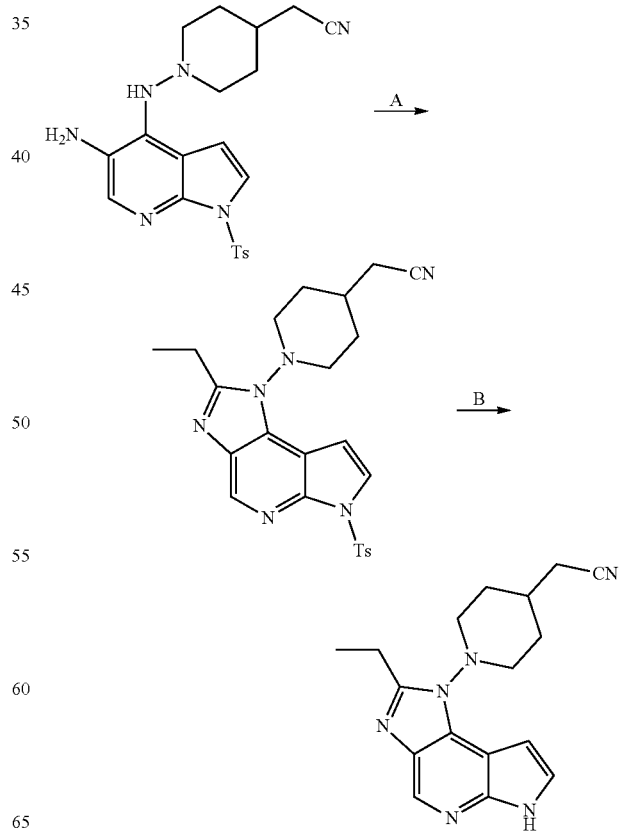

Step A

Dissolve triethyl oxyom boron tetrafluoride (190 mg, 1.0 mmol) and propionamide (73 mg, 1.0 mmol) in 10 mL tetrahydrofuran, and stir at room temperature for 2 h. Concentrate under reduced pressure to obtain the colorless oil, and dissolve it in 5 mL absolute ethanol; add it to 5 mL absolute ethanol to dissolve compound 2-(1-((5-amino-1-p-toluenesulfonyl-1H-pyrrolo[2,3-b]pyridine-4-yl)amino)piperidine-4-yl)acetonitrile (212 mg, 0.5 mmol). Heat to 75° C. and stir the reaction for 1 h. After the reaction, quench with saturated sodium bicarbonate aqueous solution, and add 30 mL water; extract with ethyl acetate (3*30 mL), and combine the organic phases; wash with 50 mL saturated saline solution and dry with anhydrous sodium sulfate. Filter it by suction, and concentrate the filtrate under reduced pressure; obtain compound 2-(1-(2-ethyl-6-p-toluenesulfonyl imidazo[4,5-d]pyrrolo[2,3-b]pyridine-1(6H)-yl)piperidin-4-yl)acetonitrile (180 mg, yield rate 78%) by silica gel column chromatography. LCMS ESI(+) m/z: 462.1 (M+1).

Step B

Dissolve compound 2-(1-(2-ethyl-6-p-toluenesulfonyl imidazo[4,5-d]pyrrolo[2,3-b]pyridine-1(6H)-yl)piperidin-4-yl)acetonitrile (180 mg, 0.39 mmol) in 9 mL methanol, and add 4 mL 1 N sodium hydroxide. Stir at room temperature for 16 h. After the reaction, adjust the pH to 7 to 8 with acetic acid, and concentrate under reduced pressure; prepare compound 2-(1-(2-ethylimidazole[4,5-d]pyrrolo[2,3-b]pyridine-1(6H)-yl)piperidine-4-yl)acetonitrile (75 mg, yield rate 62%) by silica gel column chromatography and HPLC. $^1$H NMR (400 MHz, DMSO-$d_6$) δ 11.86 (s, 1H), 8.49 (s, 1H), 7.48 (t, J=3.0 Hz, 1H), 6.71 (dd, J=3.2 Hz, 1.6 Hz, 1H), 3.59 (t, J=10.2 Hz, 2H), 3.12 (d, J=10.2 Hz, 2H), 2.92 (q, J=7.5 Hz, 2H), 2.65 (d, J=6.4 Hz, 2H), 2.16-2.05 (m, 1H), 2.00-1.91 (m, 2H), 1.68-1.56 (m, 2H), 1.31 (t, J=7.5 Hz, 3H). LCMS ESI(+) m/z: 309.2 (M+1).

Example 5

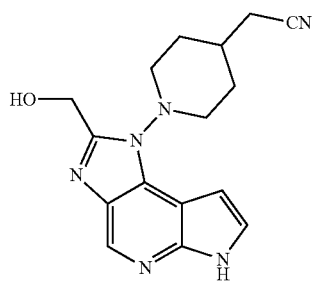 [SMILES: N#CCC1CCN(n2c(CO)nc3cnc4[nH]ccc4c32)CC1]

2-(1-(2-(hydroxymethyl)imidazo[4,5-d]pyrrolo[2,3-b]pyridine-1(6H)-yl)piperidin-4-yl)acetonitrile The mode of execution is as follows:

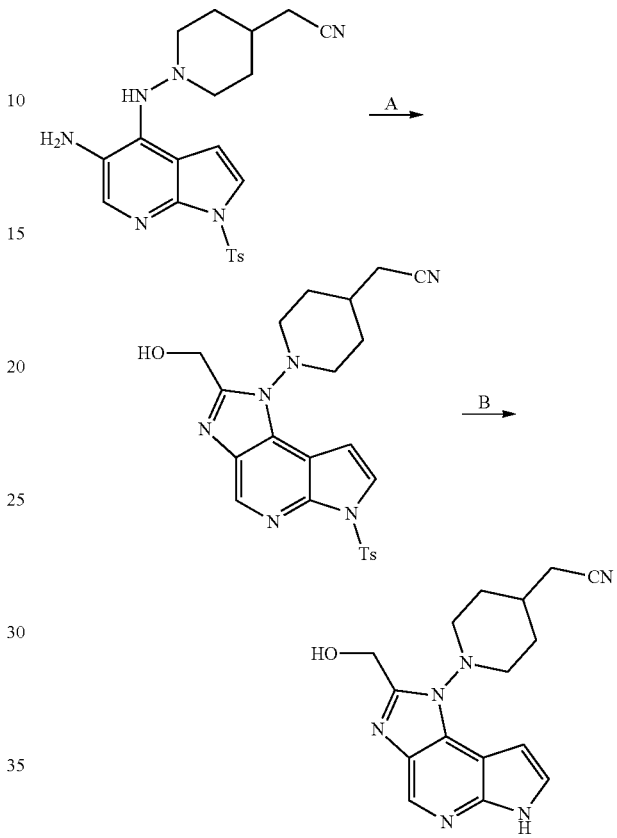

Step A

Dissolve triethyl oxyom boron tetrafluoride (135 mg, 0.71 mmol) and hydroxyacetamide (53 mg, 0.71 mmol) in 10 mL tetrahydrofuran, and stir at room temperature for 2 h. Concentrate under reduced pressure to obtain the colorless oil, and dissolve it in 5 mL absolute ethanol; add it to 5 mL absolute ethanol to dissolve compound 2-(1-((5-amino-1-p-toluenesulfonyl-1H-pyrrolo[2,3-b]pyridine-4-yl)amino)piperidine-4-yl)acetonitrile (100 mg, 0.24 mmol). Heat to 75° C. and stir the reaction for 1 h. After the reaction, quench with saturated sodium bicarbonate aqueous solution, and add 30 mL water; extract with ethyl acetate (3*30 mL), and combine the organic phases; wash with 50 mL saturated saline solution and dry with anhydrous sodium sulfate. Filter it by suction, and concentrate the filtrate under reduced pressure; obtain compound 2-(1-(2-(hydroxymethyl)-6-p-toluenesulfonyl imidazo[4,5-d]pyrrolo[2,3-b]pyridine-1(6H)-yl)piperidin-4-yl)acetonitrile (80 mg, yield rate 72%) by silica gel column chromatography. LCMS ESI(+) m/z: 465.1 (M+1).

Step B

Dissolve compound 2-(1-(2-(hydroxymethyl)-6-p-toluenesulfonyl imidazo[4,5-d]pyrrolo[2,3-b]pyridine-1(6H)-yl)piperidin-4-yl)acetonitrile (80 mg, 0.17 mmol) in 9 mL methanol, and add 3 mL 1 N sodium hydroxide. Stir at room temperature for 16 h. After the reaction, adjust the pH to 7 to 8 with acetic acid, and concentrate under reduced pressure; prepare compound 2-(1-(2-(hydroxymethyl)imidazo[4,5-d]pyrrolo[2,3-b]pyridine-1(6H)-yl)piperidine-4-yl)acetonitrile (20 mg, yield rate 38%) by silica gel column chromatography and HPLC. $^1$H NMR (400 MHz, DMSO-$d_6$) δ 11.92 (s, 1H), 8.54 (s, 1H), 7.50 (t, J=3.0 Hz, 1H), 6.73 (dd, J=3.2, 1.8 Hz, 1H), 5.31 (t, J=6.0 Hz, 1H), 5.16 (q, J=6.6 Hz, 1H), 4.70 (d, J=6.0 Hz, 2H), 3.57 (t, J=10.2 Hz, 2H), 3.15 (dd, J=10.2 Hz, 2H), 2.64 (d, J=6.4 Hz, 2H), 2.15-2.04 (m, 1H), 1.98-1.89 (m, 2H), 1.72-1.60 (m, 2H). LCMS ESI(+) m/z: 311.2 (M+1).

Example 6

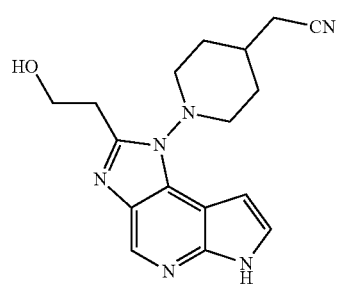 [SMILES: N#CCC1CCN(n2c(CCO)nc3cnc4[nH]ccc4c32)CC1]

2-(1-(2-(2-hydroxyethyl)imidazo[4,5-d]pyrrolo[2,3-b]pyridine-1(6H)-yl)piperidin-4-yl)acetonitrile The mode of execution is as follows:

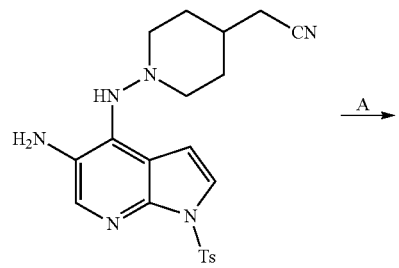

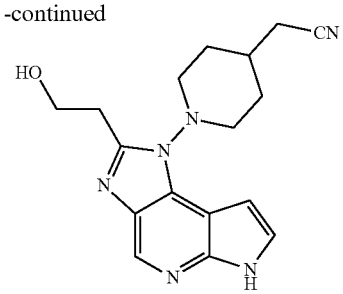

Step A

Dissolve triethyl oxyom boron tetrafluoride (135 mg, 0.71 mmol) and 3-hydroxypropanamide (64 mg, 0.71 mmol) in 10 mL tetrahydrofuran, and stir at room temperature for 2 h. Concentrate under reduced pressure to obtain the colorless oil, and dissolve it in 5 mL absolute ethanol; add it to 5 mL absolute ethanol to dissolve compound 2-(1-((5-amino-1-p-toluenesulfonyl-1H-pyrrolo[2,3-b]pyridine-4-yl)amino)piperidine-4-yl)acetonitrile (100 mg, 0.24 mmol). Heat to 75° C. and stir the reaction for 1 h. After the reaction, quench with saturated sodium bicarbonate aqueous solution, and add 30 mL water; extract with ethyl acetate (3*30 mL), and combine the organic phases; wash with 50 mL saturated saline solution and dry with anhydrous sodium sulfate. Filter it by suction, and concentrate the filtrate under reduced pressure; obtain compound 2-(1-(2-(hydroxyethyl)-6-p-toluenesulfonyl imidazo[4,5-d]pyrrolo[2,3-b]pyridine-1(6H)-yl)piperidin-4-yl)acetonitrile (60 mg, yield rate 52%) by silica gel column chromatography. LCMS ESI(+) m/z: 479.1 (M+1).

Step B

Dissolve compound 2-(1-(2-(hydroxyethyl)-6-p-toluenesulfonyl imidazo[4,5-d]pyrrolo[2,3-b]pyridine-1(6H)-yl)piperidin-4-yl)acetonitrile (60 mg, 0.13 mmol) in 9 mL methanol, and add 3 mL 1 N sodium hydroxide. Stir at room temperature for 16 h. After the reaction, adjust the pH to 7 to 8 with acetic acid, and concentrate under reduced pressure; prepare compound 2-(1-(2-(hydroxyethyl)imidazo[4,5-d]pyrrolo[2,3-b]pyridine-1(6H)-yl)piperidine-4-yl)acetonitrile (20 mg, yield rate 48%) by silica gel column chromatography and HPLC. $^1$H NMR (400 MHz, DMSO-$d_6$) δ 11.87 (s, 1H), 8.49 (s, 1H), 7.48 (d, J=3.4 Hz, 1H), 6.71 (d, J=3.4, 1.8 Hz, 1H), 4.80 (brs, 1H), 3.84 (t, J=7.0 Hz, 2H), 3.59 (t, J=10.4 Hz, 2H), 3.16-3.06 (m, 4H), 2.65 (d, J=6.4 Hz, 2H), 2.15-2.04 (m, 1H), 1.98-1.89 (m, 2H), 1.72-1.60 (m, 2H). LCMS ESI(+) m/z: 325.1 (M+1).

Example 7

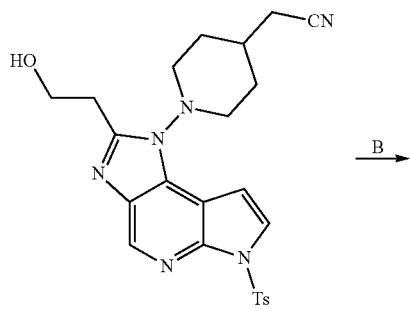

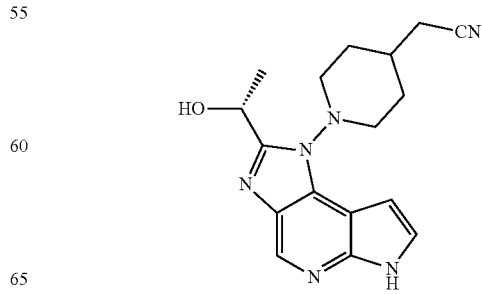

(R)-2-(1-(2-(1-hydroxyethyl)imidazo[4,5-d]pyrrolo[2,3-b]pyridine-1(6H)-yl)piperidin-4-yl)acetonitrile The mode of execution is as follows:

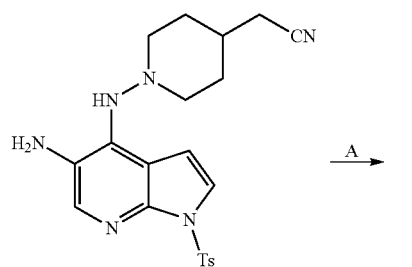

A →

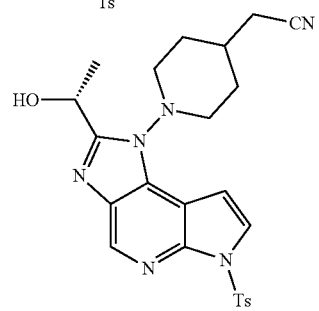

B →

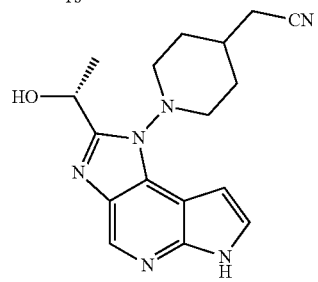

Step A

Dissolve triethyl oxyom boron tetrafluoride (251 mg, 1.32 mmol) and R-lactoamide (118 mg, 1.32 mmol) in 8 mL tetrahydrofuran, and stir the reaction at room temperature for 2 h. Concentrate under reduced pressure to obtain the colorless oil, and dissolve it in 5 mL absolute ethanol; add it to 5 mL absolute ethanol to dissolve compound 2-(1-((5-amino-1-p-toluenesulfonyl-1H-pyrrolo[2,3-b]pyridine-4-yl)amino)piperidine-4-yl)acetonitrile (189 mg, 0.44 mmol). Heat to 75° C. and stir the reaction for 1 h. After the reaction, quench with sodium bicarbonate aqueous solution, and add 30 mL water; extract with ethyl acetate (3*30 mL), and combine the organic phases; wash with 50 mL saturated saline solution and dry with anhydrous sodium sulfate. Filter it by suction, and concentrate the filtrate under reduced pressure; obtain compound (R)-2-(1-(2-(1-hydroxyethyl)-6-p-toluenesulfonyl imidazo[4,5-d]pyrrolo[2,3-b]pyridine-1(6H)-yl)piperidin-4-yl)acetonitrile (110 mg, yield rate 52%) by silica gel column chromatography. LCMS ESI(+) m/z: 479.1 (M+1).

Step B

Dissolve compound (R)-2-(1-(2-(1-hydroxyethyl)-6-p-toluenesulfonyl imidazo[4,5-d]pyrrolo[2,3-b]pyridine-1(6H)-yl)piperidin-4-yl)acetonitrile (110 mg, 0.23 mmol) in 9 mL methanol, and add 3 mL 1 N sodium hydroxide. Stir at room temperature for 16 h. After the reaction, adjust the pH to 7 to 8 with acetic acid, and concentrate under reduced pressure; prepare compound (R)-2-(1-(2-(1-hydroxyethyl)-imidazo[4,5-d]pyrrolo[2,3-b]pyridine-1(6H)-yl)piperidin-4-yl)acetonitrile (30 mg, yield rate 40%) by silica gel column chromatography and HPLC. $^1$H NMR (400 MHz, DMSO-$d_6$) δ 11.92 (s, 1H), 8.55 (s, 1H), 7.50 (d, J=3.4 Hz, 1H), 6.73 (d, J=3.4 Hz, 1H), 5.31 (s, 1H), 5.16 (q, J=6.6 Hz, 1H), 3.65-3.53 (m, 2H), 3.15 (dd, J=30.2, 10.0 Hz, 2H), 2.64 (d, J=6.4 Hz, 2H), 2.17-2.04 (m, 1H), 1.98-1.89 (m, 2H), 1.72-1.60 (m, 2H), 1.56 (d, J=6.6 Hz, 3H). LCMS ESI(+) m/z: 325.0 (M+1).

Example 8

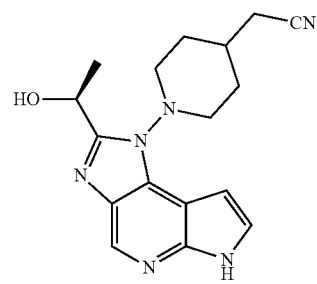 [SMILES: C[C@H](O)c1nc2cnc3[nH]ccc3c2n1N1CCC(CC#N)CC1]

(S)-2-(1-(2-(1-hydroxyethyl)imidazo[4,5-d]pyrrolo[2,3-b]pyridine-1(6H)-yl)piperidin-4-yl)acetonitrile The mode of execution is as follows:

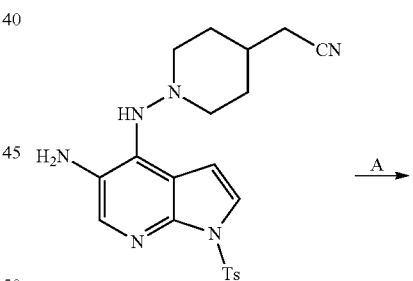

A →

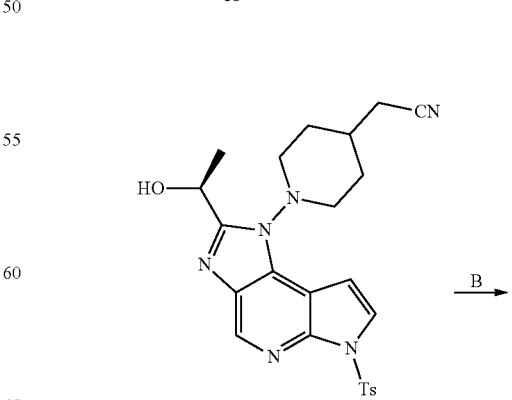

B →

23
-continued

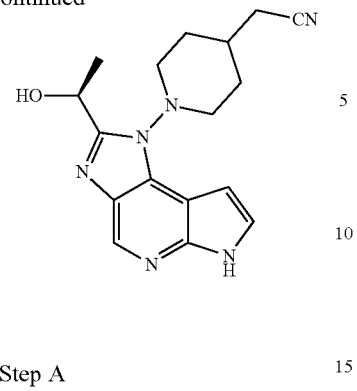

Step A

Dissolve triethyl oxyom boron tetrafluoride (298 mg, 1.56 mmol) and S-lactoamide (140 mg, 1.56 mmol) in 10 mL tetrahydrofuran, and stir the reaction at room temperature for 2 h. Concentrate under reduced pressure to obtain the colorless oil, and dissolve it in 5 mL absolute ethanol; add it to 5 mL absolute ethanol to dissolve compound 2-(1-((5-amino-1-p-toluenesulfonyl-1H-pyrrolo[2,3-b]pyridine-4-yl)amino)piperidine-4-yl)acetonitrile (222 mg, 0.52 mmol). Heat to 75° C. and stir the reaction for 1 h. After the reaction, quench with saturated sodium bicarbonate aqueous solution, and add 30 mL water; extract with ethyl acetate (3*30 mL), and combine the organic phases; wash with 50 mL saturated saline solution and dry with anhydrous sodium sulfate. Filter it by suction, and concentrate the filtrate under reduced pressure; obtain compound (S)-2-(1-(2-(1-hydroxyethyl)-6-p-toluenesulfonyl imidazo[4,5-d]pyrrolo[2,3-b]pyridine-1 (6H)-yl)piperidin-4-yl)acetonitrile (160 mg, yield rate 64%) by silica gel column chromatography. LCMS ESI(+) m/z: 479.1 (M+1).

Step B

Dissolve compound (S)-2-(1-(2-(1-hydroxyethyl)-6-p-toluenesulfonyl imidazo[4,5-d]pyrrolo[2,3-b]pyridine-1 (6H)-yl)piperidin-4-yl)acetonitrile (160 mg) in 9 mL methanol, and add 3 mL 1 N sodium hydroxide. Stir at room temperature for 16 h. After the reaction, adjust the pH to 7 to 8 with acetic acid, and concentrate under reduced pressure; prepare compound (S)-2-(1-(2-(1-hydroxyethyl)-imidazo[4,5-d]pyrrolo[2,3-b]pyridine-1(6H)-yl)piperidin-4-yl) acetonitrile (44.6 mg, yield rate 41%) by silica gel column chromatography and HPLC. $^1$H NMR (400 MHz, DMSO-d$_6$) δ 11.92 (s, 1H), 8.55 (s, 1H), 7.50 (d, J=3.4 Hz, 1H), 6.73 (d, J=3.4 Hz, 1H), 5.31 (s, 1H), 5.16 (q, J=6.6 Hz, 1H), 3.65-3.53 (m, 2H), 3.15 (dd, J=30.2, 10.0 Hz, 2H), 2.64 (d, J=6.4 Hz, 2H), 2.17-2.04 (m, 1H), 1.98-1.89 (m, 2H), 1.72-1.60 (m, 2H), 1.56 (d, J=6.6 Hz, 3H). LCMS ESI(+) m/z: 325.0 (M+1).

24
Example 9

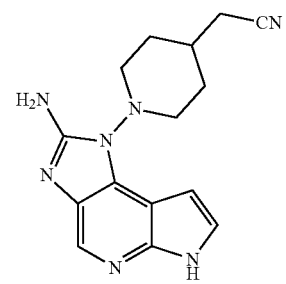 [SMILES: N#CCC1CCN(n2c(N)nc3cnc4[nH]ccc4c32)CC1]

2-(1-(2-aminoimidazo[4,5-d]pyrrolo[2,3-b]pyridine-1(6H)-yl)piperidin-4-yl)acetonitrile The mode of execution is as follows:

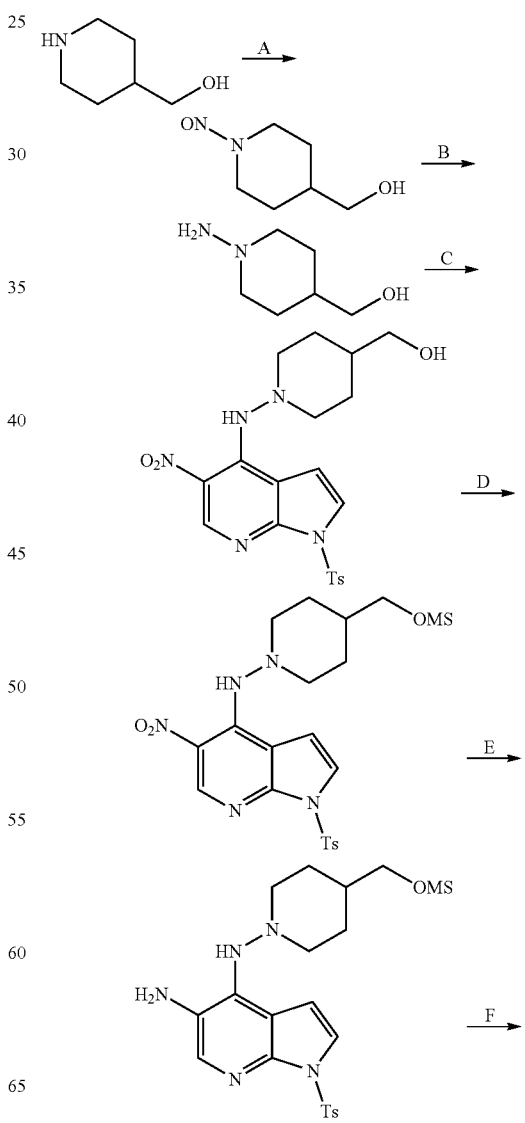

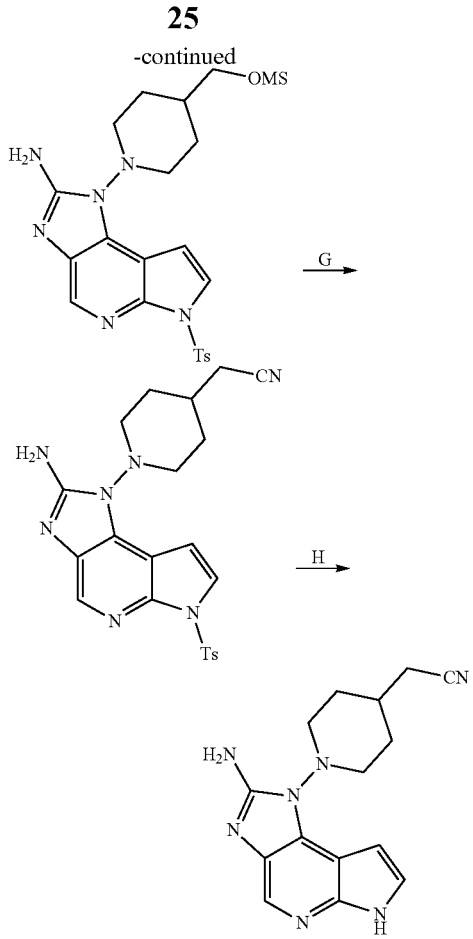

Step A

Dissolve 4-hydroxymethylpiperidine (3.01 g, 26.1 mmol) and sodium nitrite (2.76 g, 40.0 mmol) in 30 mL water, and slowly drop 4.0 mL acetic acid at 0° C. Stir the reaction at 30° C. for 16 h. Adjust the pH of the reaction solution to 8 with saturated sodium bicarbonate aqueous solution and extract in five times with 250 mL ethyl acetate. Combine the organic phases, and dry with anhydrous sodium sulfate; filter, and obtain compound 1-nitroso-4-hydroxymethylpiperidine (2.87 g, yield rate 76%) by rotary evaporation. LCMS ESI(+) m/z: 145.1 (M+1).

Step B

Dissolve compound 1-nitroso-4-hydroxymethylpiperidine (2.87 g, 20.0 mmol) in 15 mL methanol, add zinc powder (5.23 g, 80.0 mmol), and slowly drop 15 mL acetic acid at 0° C. After the addition, stir the reaction at room temperature for 16 h. Filter the reaction solution, and obtain crude compound 1-amino-4-hydroxymethylpiperidine (3.02 g, yield rate 65%) by rotary evaporation of the filtrate. LCMS ESI(+) m/z: 131.1 (M+1).

Step C

Add compound 4-chloro-5-nitro-1-p-toluenesulfonyl-1H-pyrrolo[2,3-b]pyridine (2.32 g, 6.6 mmol), N,N-diisopropylethylamine (3.41 g, 26.4 mmol) and 1-amino-4-hydroxymethylpiperidine (1.03 g, 7.9 mmol) to 60 mL isopropanol (suspension). Stir the reaction at 95° C. for 16 h. After the reaction, cool to room temperature, and add 100 mL water; extract with ethyl acetate (3*100 mL), and combine the organic phases; dry with anhydrous sodium sulfate, and obtain compound (1-((5-nitro-1-p-toluenesulfonyl-1H-pyrrolo[2,3-b]pyridine-4-yl)amino)piperidine-4-yl)methanol (2.11 g, yield rate 71%) by filtration, spin drying and column chromatography purification. LCMS ESI(+) m/z: 446.2 (M+1).

Step D

Dissolve compound (1-((5-nitro-1-p-toluenesulfonyl-1H-pyrrolo[2,3-b]pyridine-4-yl)amino)piperidine-4-yl)methanol (1.02 g, 3.37 mmol) in 30 mL anhydrous dichloromethane, and add triethylamine (1.02 g, 10.1 mmol) at 0° C.; add methanesulfonyl chloride (465 mg, 4.06 mmol) dropwise, and react at room temperature for 18 h under nitrogen protection. After the reaction, add water to quench at 0° C., and extract with dichloromethane (3*80 mL); combine the organic phases, and dry with anhydrous sodium sulfate; obtain compound (1-((5-nitro-1-p-toluenesulfonyl-1H-pyrrolo[2,3-b]pyridine-4-yl)amino)piperidine-4-yl)methyl methanesulfonate (1.6 g, yield rate 91%) by filtration, spin drying and column chromatography purification. LCMS ESI(+) m/z: 524.1 (M+1).

Step E

Suspend compound (1-((5-nitro-1-p-toluenesulfonyl-1H-pyrrolo[2,3-b]pyridine-4-yl)amino)piperidin-4-yl methyl methanesulfonate (300 mg, 0.57 mmol), iron powder (193 mg, 3.44 mmol) and ammonium chloride (61 mg, 1.15 mmol) in a mixture of 9 mL ethanol and 3 mL water and stir at 75° C. under nitrogen protection for 2 h. After the reaction, obtain product (1-((5-amino-1-p-toluenesulfonyl-1H-pyrrolo[2,3-b]pyridine-4-yl)amino)piperidin-4-yl) methyl methanesulfonate (85 mg, yield rate 30%) by filtration, spin drying and purification. LCMS ESI(+) m/z: 494.1 (M+1).

Step F

Dissolve compound (1-((5-amino-1-p-toluenesulfonyl-1H-pyrrolo[2,3-b]pyridine-4-yl)amino)piperidin-4-yl) methyl methanesulfonate (80 mg, 0.16 mmol) and hydrogen bromide (0.08 mL) in 10 mL methanol. Add into a sealed tube and stir at 30° C. for 20 h. After the reaction, obtain product (1-(2-amino-6-p-toluenesulfonyl imidazo[4,5-d]pyrrolo[2,3-b]pyridine-1(6H)-yl)piperidin-4-yl)methyl methanesulfonate (90 mg, yield rate 100%) by spin drying and column chromatography purification. LCMS ESI(+) m/z: 519.1 (M+1).

Step G

Dissolve compound (1-(2-amino-6-p-toluenesulfonyl imidazo[4,5-d]pyrrolo[2,3-b]pyridine-1(6H)-yl)piperidin-4-yl))methyl methanesulfonate (80 mg, 0.31 mmol), trimethylcyanosilane (31 mg, 0.31 mmol) and potassium carbonate in 10 m L N,N-dimethylformamide and stir at room temperature under nitrogen protection for 20 h. After the reaction, add 20 mL water, and extract with ethyl acetate (3*20 mL); combine the organic phases, and dry with anhydrous sodium sulfate, and obtain compound 2-(1-(2-amino-6-p-toluenesulfonyl imidazo[4,5-d]pyrrolo[2,3-b]pyridine-1(6H)-yl)piperidin-4-yl)acetonitrile (60 mg, yield rate 87%)

by filtration, spin drying and column chromatography purification. LCMS ESI(+) m/z: 450.1 (M+1).

Step H

Dissolve compound 2-(1-(2-amino-6-p-toluenesulfonyl imidazo[4,5-d]pyrrolo[2,3-b]pyridine-1(6H)-yl)piperidin-4-yl)acetonitrile (60 mg, 0.13 mmol) in the mixed solution of dichloromethane (10 mL) and methanol (10 mL), and add potassium carbonate (301 mg, 2.18 mmol); stir at room temperature for 18 h under nitrogen protection. After the reaction, filter, and add 20 mL water; extract with ethyl acetate (5*50 mL), and combine the organic phases; dry with anhydrous sodium sulfate, and obtain compound 2-(1-(2-aminoimidazo[4,5-d]pyrrolo[2,3-b]pyridine-1(6H)-yl)piperidin-4-yl)acetonitrile (20 mg, yield rate 51%) by filtration, spin drying and column chromatography purification. $^1$H NMR (400 MHz, DMSO-$d_6$) δ 11.50 (s, 1H), 8.11 (s, 1H), 7.37 (t, J=3.2 Hz, 1H), 6.54 (dd, J=3.2, 2.0 Hz, 1H), 6.24 (s, 1H), 3.49 (t, J=10.2 Hz, 2H), 3.04 (d, J=10.2 Hz, 2H), 2.61 (d, J=6.8 Hz, 1H), 2.03-1.96 (m, 1H), 1.91-1.88 (m, 2H), 1.72-1.68 (m, 2H). LCMS ESI(+) m/z: 296.1 (M+1).

Example 10

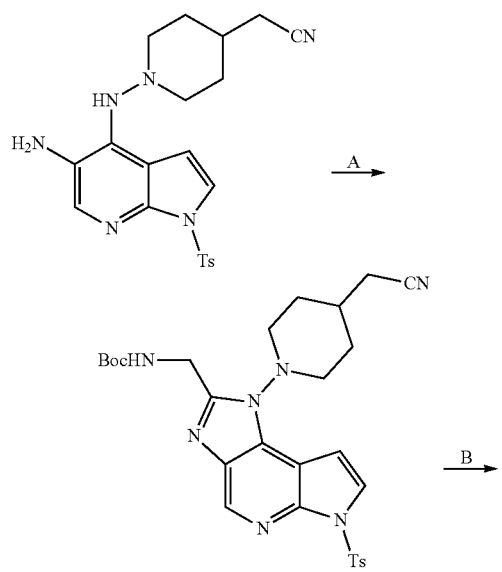

N-((1-(4-(cyanomethyl)piperidin-1-yl)-1,6-dihydroimidazole[4,5-d]pyrrolo[2,3-b]pyridine-2-yl)methyl)methanesulfonamide The mode of execution is as follows:

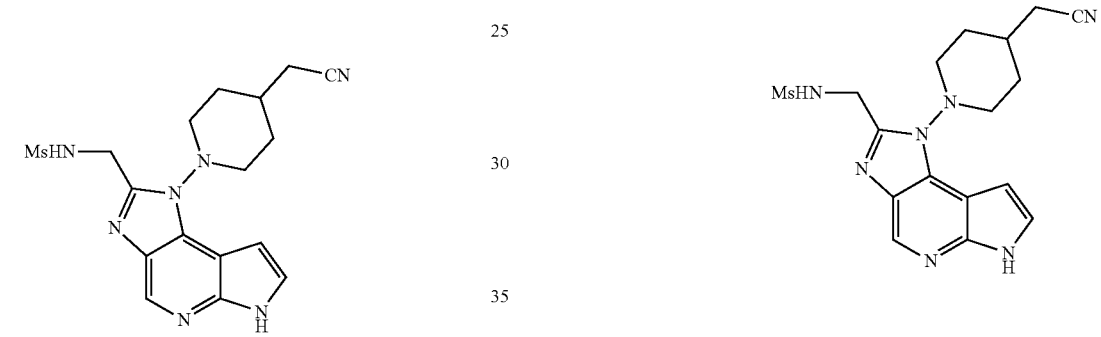

Step A add Boc-glycinamide (328 mg, 1.88 mmol) and triethyloxyonium tetrafluoroboric acid (358 mg, 1.88 mmol) into 15 mL anhydrous tetrahydrofuran under nitrogen, and stir at 30° C. for 2 h. Concentrate the reaction solution under reduced pressure. Dissolve the residue in 15 mL ethanol, and add compound 2-(1-((5-amino-1-p-toluenesulfonyl-1H-pyrrolo[2,3-b]pyridine-4-yl)amino)piperidine-4-yl)acetonitrile (160 mg, 0.38 mmol) under nitrogen; stir at 75° C. for 1 h. Concentrate the reaction solution under reduced pressure. Add saturated sodium bicarbonate solution (10 mL) and ethyl acetate (15 mL) and stir for 5 min. Separate the organic phases and extract the aqueous phase with 45 mL ethyl acetate for 3 times. Combine the organic phases, and wash with 10 mL water; wash with 10 mL saturated salt, and dry with anhydrous sodium sulfate; concentrate under reduced pressure, and obtain compound tert-butyl-((1-(4-(cyanomethyl)piperidine-1-yl)-6-p-toluenesulfonyl-1,6-dihydroimidazole[4,5-d]pyrrolo[2,3-b]pyridine-2-yl)methyl)carbamate (200 mg, yield 90%) by silica gel column chromatography. LCMS ESI(+) m/z: 564.2 (M+1).

Step B

Dissolve compound tert-butyl-((1-(4-(cyanomethyl)piperidin-1-yl)-6-p-toluenesulfonyl-1,6-dihydroimidazole[4,5-d]pyrrolo[2,3-b]pyridine-2-yl)methyl) carbamate (100 mg, 0.18 mmol) in 3 mL dichloromethane, and add trifluoroacetic acid (1 mL) dropwise under ice bath. Heat to room temperature and stir for 4 h under nitrogen protection. Concentrate the reaction solution under reduced pressure. Add 5 mL saturated sodium bicarbonate solution and stir for 5 min. Extract with 15 mL dichloromethane for 3 times. Combine the organic phases, wash with 5 mL saturated saline solution and dry with anhydrous sodium sulfate. Filter it by suction, and concentrate the filtrate under reduced pressure to obtain compound 2-(1-(2-(aminomethyl)-6-p-toluenesulfonyl imidazole[4,5-d]pyrrolo[2,3-b]pyridine-1(6H)-yl)piperidin-4-yl)acetonitrile (82 mg, yield rate 100%). LCMS ESI(+) m/z: 464.1 (M+1).

Step C

Compound 2-(1-(2-(aminomethyl)-6-p-toluenesulfonyl imidazole[4,5-d]pyrrolo[2,3-b]pyridine-1(6H)-yl)piperidin-4-yl)acetonitrile (82 mg, 0.53 mmol) dissolve in 3 mL dichloromethane, and add triethylamine (54 mg, 0.53 mmol) and methanesulfonyl chloride (30 mg, 0.27 mmol) under ice bath and nitrogen protection. Stir for 2 h under ice bath. Add saturated sodium bicarbonate solution (10 mL) and stir at room temperature for 30 min. Extract with 15 mL dichloromethane for 3 times, and combine the organic phases; wash with 3 mL saturated saline, and dry with anhydrous sodium sulfate; concentrate under reduced pressure, and obtain compound N-((1-(4-(cyanomethyl)piperidine-1-yl)-6-p-toluenesulfonyl-1,6-dihydroimidazole[4,5-d]pyrrolo[2,3-b]pyridine-2-yl)methyl)methanesulfonamide (30 mg, yield rate 71%) by silica gel column chromatography. LCMS ESI(+) m/z: 542.1 (M+1).

Step D

Dissolve compound N-((1-(4-(cyanomethyl)piperidin-1-yl)-6-p-toluenesulfonyl-1,6-dihydroimidazole[4,5-d]pyrrolo[2,3-b]pyridine-2-yl)methyl)methanesulfonamide (16 mg, 0.03 mmol) in 3 mL methanol, and add 1 N sodium hydroxide solution (1 mL, 1.0 mmol). Stir at 35° C. for 6 h. Dilute the reaction solution with 9 mL water, and distilled off methanol under reduced pressure. Extract the residue for 3 times with 15 mL ethyl acetate. Combine the organic phases, and dry with anhydrous sodium sulfate; filter it by suction, and evaporate the solvent under reduced pressure. Prepare compound N-((1-(4-(cyanomethyl)piperidin-1-yl)-1,6-dihydroimidazole[4,5-d]pyrrolo[2,3-b]pyridine-2-yl)methyl)methanesulfonamide (48 mg, yield rate 51%) from the residue by HPLC. $^1$H NMR (400 MHz, DMSO-$d_6$) δ 11.96 (s, 1H), 8.57 (s, 1H), 7.60 (s, 1H), 7.52 (t, J=2.6 Hz, 1H), 6.75 (d, J=2.6 Hz, 1H), 4.52 (s, 2H), 3.57 (t, J=10.2 Hz, 2H), 3.23-3.19 (m, 2H), 2.99 (s, 3H), 2.63 (d, J=6.5 Hz, 2H), 2.15-2.06 (m, 1H), 1.98-1.91 (m, 2H), 1.74-1.62 (m, 2H). LCMS ESI(+) m/z: 388.1 (M+1).

Example 11

2-(1-(imidazo[4,5-d]pyrrolo[2,3-b]pyridine-1(6H)-yl)piperidine-4-yl)propionitrile The mode of execution is as follows:

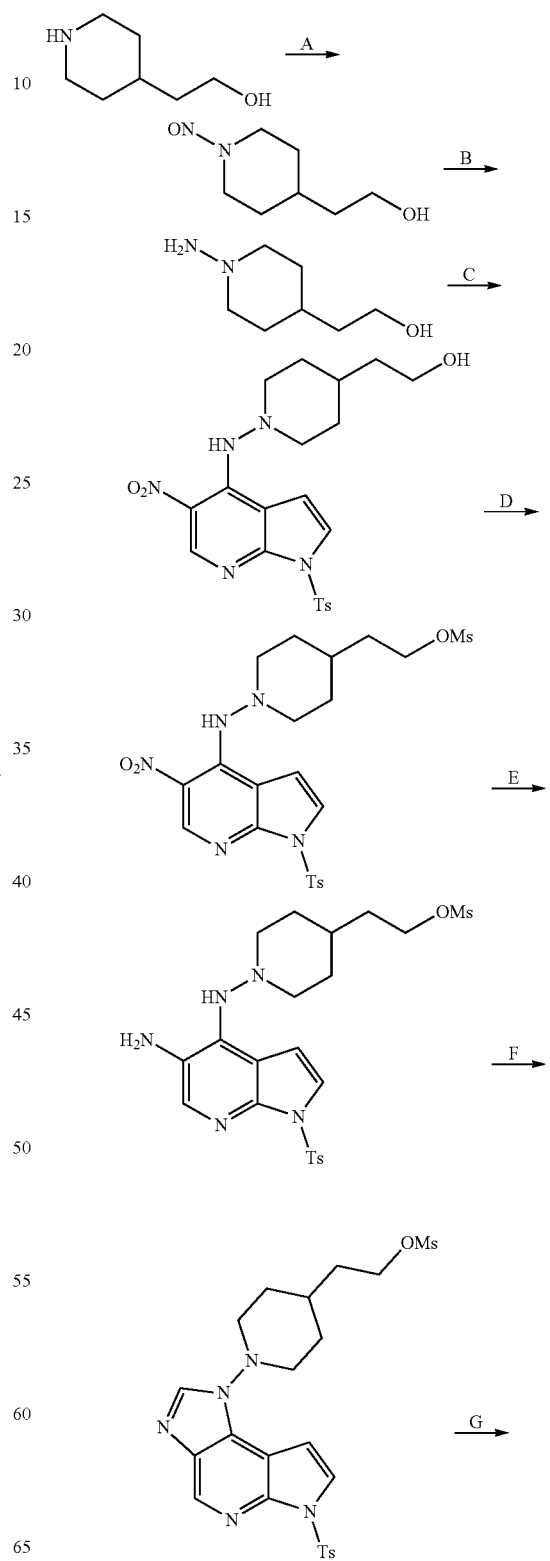

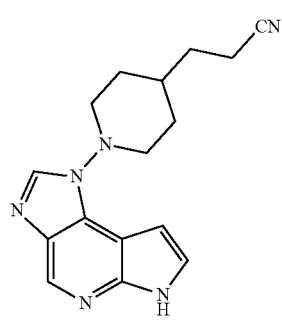 [SMILES: N#CCCC1CCN(n2cnc3cnc4[nH]ccc4c32)CC1]

-continued

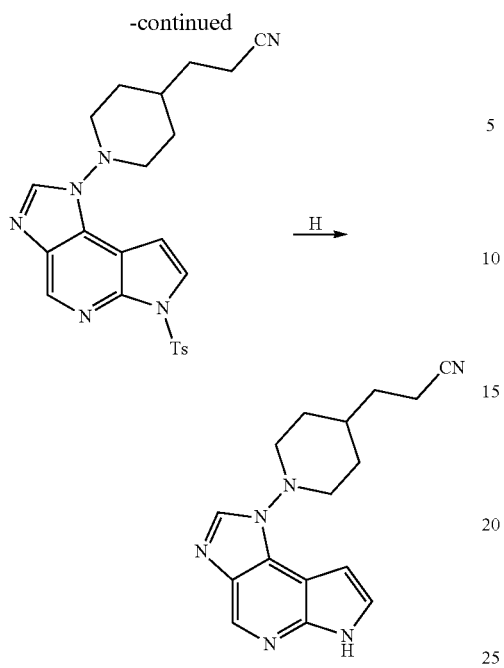

Step A

Dissolve 4-piperidine ethanol (21.1 g, 100 mmol) in 200 mL water and 90 mL acetic acid, and dissolve sodium nitrite (41.4 g, 600 mmol) in 200 mL water. At 0° C., slowly drop sodium nitrite aqueous solution into the reaction system and react at room temperature for 16 h. After the reaction, extract with 150 mL ethyl acetate for three times. Combine the organic phases, and dry with anhydrous sodium sulfate; filter, and concentrate under reduced pressure; obtain compound 1-nitroso-4-piperidine ethanol (9.5 g, yield rate 60%) by silica gel column chromatography. LCMS ESI(+) m/z: 159.1 (M+1).

Step B

Dissolve compound 1-nitroso-4-piperidine ethanol (8.0 g, 50.1 mmol) in 40 mL methanol, and add zinc powder (3.14 g, 48.0 mmol); add 8 mL acetic acid dropwise at room temperature. After the addition, stir the mixture at 30° C. for 15 min. After the reaction, filter the reaction solution, and obtain crude compound 1-amino-4-piperidine ethanol (4.37 g, yield rate 60%) by rotary evaporation of the filtrate. LCMS ESI(+) m/z: 145.1 (M+1).

Step C

Add compound 4-chloro-5-nitro-1-p-toluenesulfonyl-1H-pyrrolo[2,3-b]pyridine (2.46 g, 7.0 mmol), N,N-diisopropylethylamine (4.5 g, 35.0 mmol) and 1-amino-4-piperidine ethanol (2.20 g, 2.20 g) to 200 mL isopropanol (suspension). Stir the reaction at 95° C. for 16 h. After the reaction, cool to room temperature, and add 300 mL water; extract with ethyl acetate (3*250 mL), and combine the organic phases; dry with anhydrous sodium sulfate, and obtain compound (1-((5-nitro-1-p-toluenesulfonyl-1H-pyrrolo[2,3-b]pyridine-4-yl)amino)piperidine-4-yl)ethanol (1.97 g, yield rate 61%) by filtration, spin drying and column chromatography purification. LCMS ESI(+) m/z: 460.2 (M+1).

Step D

Dissolve compound 2-(1-((5-nitro-1-p-toluenesulfonyl-1H-pyrrolo[2,3-b]pyridine-4-yl)amino)piperidine-4-yl) ethanol (1.17 g, 2.55 mmol) in 50 mL dichloromethane, and add methanesulfonyl chloride (876 mg, 7.65 mmol) and triethylamine (1.28 g, 12.75 mmol), and stir at room temperature for 2 h. After the reaction, obtain crude compound 2-(1-((5-nitro-1-p-toluenesulfonyl-1H-pyrrolo[2,3-b]pyridine-4-yl)amino)piperidin-4-yl)ethyl methanesulfonate (1.37 g, yield rate 100%) by vacuum concentration. LCMS ESI(+) m/z: 518.2 (M+1).

Step E

Add compound 2-(1-((5-nitro-1-p-toluenesulfonyl-1H-pyrrolo[2,3-b]pyridine-4-yl)amino)piperidine-4-yl)ethyl methanesulfonate (1.37 g, 3.0 mmol) to the mixed solution (suspension) of 45 mL ethanol and 15 mL water, and then add ammonium chloride solid (0.64 g, 12.0 mmol) and iron powder (0.67 g, 12.0 mmol) in turn. Heat to 80° C. and stir for 3 h. After the reaction, filter the reaction solution and wash the filter residue with appropriate amount of ethyl acetate. Add 50 mL water to the filtrate, and extract with ethyl acetate (3*50 mL); combine the organic phases, and dry with anhydrous sodium sulfate; obtain compound 2-(1-(5-amino-1-p-toluenesulfonyl-1H-pyrrolo[2,3-b]pyridine-4-yl)amino)piperidine-4-yl)ethyl methanesulfonate (1.26 g, yield rate 97%) by filtration, spin drying and column chromatography purification. LCMS ESI(+) m/z: 430.2 (M+1).

Step F

Dissolve compound 2-(1-((5-amino-1-p-toluenesulfonyl-1H-pyrrolo[2,3-b]pyridine-4-yl)amino)piperidine-4-yl ethyl methanesulfonate (582 mg, 1.35 mmol) in 25 mL acetic acid, and add triethyl orthoformate (1.00 g, 6.75 mmol). Heat to 116° C. and stir the reaction for 1 h. After the reaction, concentrate under reduced pressure, and obtain compound 2-(1-(6-p-toluenesulfonyl imidazo[4,5-d]pyrrolo[2,3-b]pyridine-1(6H)-yl)piperidin-4-yl)ethyl methanesulfonate (253 mg, yield rate 42%) by silica gel column chromatography. LCMS ESI(+) m/z: 440.2 (M+1).

Step H

Dissolve compound 2-(1-(6-p-toluenesulfonyl imidazo[4,5-d]pyrrolo[2,3-b]pyridine-1(6H)-yl)piperidin-4-yl)ethyl methanesulfonate (253 mg, 1.35 mmol) in 16 mL N,N-dimethylformamide, and add potassium carbonate (187 mg, 1.35 mmol) and trimethylcyanosilane (134 mg, 1.35 mmol) respectively. Heat to 100° C., and stir the reaction for 20 h under nitrogen protection. After the reaction, add appropriate amount of sodium hydroxide aqueous solution, and extract with ethyl acetate (3*100 mL); combine the organic phases, and dry with anhydrous sodium sulfate; obtain compound 3-(1-(6-p-toluenesulfonyl imidazo[4,5-d]pyrrolo[2,3-b]pyridine-1(6H)-yl)piperidin-4-yl)propionitrile (97 mg, yield rate 48%) by filtration, spin drying and column chromatography purification. LCMS ESI(+) m/z: 449.2 (M+1).

Step H

Dissolve compound 3-(1-(6-p-toluenesulfonyl imidazo[4,5-d]pyrrolo[2,3-b]pyridine-1(6H)-yl)piperidin-4-yl)propionitrile (97 mg, 0.22 mmol) in 9 mL methanol, and add 3 mL 1 N sodium hydroxide aqueous solution; stir the reaction at room temperature for 16 h. After the reaction, adjust the pH to 7 to 8 with acetic acid, and concentrate under reduced pressure. Prepare compound 2-(1-(imidazo[4,5-d]pyrrolo[2,3-b]pyridine-1(6H)-yl)piperidine-4-yl)propionitrile (30 mg, yield rate 48%) by silica gel column chromatography and HPLC. $^1$H NMR (400 MHz, DMSO-$d_6$) δ 11.82 (s, 1H), 8.58 (s, 1H), 8.55 (s, 1H), 7.44 (t, J=2.8 Hz, 1H), 6.73 (dd, J=3.1, 1.9 Hz, 1H), 3.36-3.33 (m, 1H), 3.31-3.26 (m, 3H), 2.61 (t, J=7.0 Hz, 2H), 1.96-1.90 (m, 2H), 1.71-1.46 (m, 5H). LCMS ESI(+) m/z: 295.2 (M+1).

Example 12

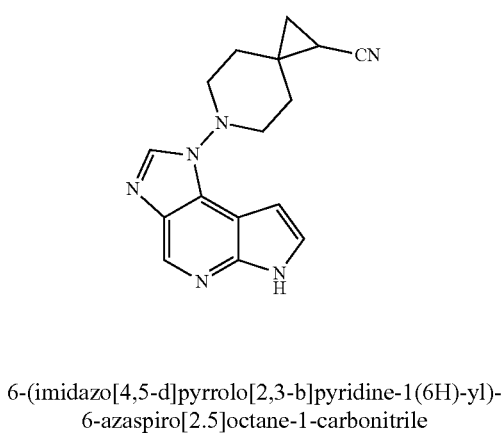

6-(imidazo[4,5-d]pyrrolo[2,3-b]pyridine-1(6H)-yl)-6-azaspiro[2.5]octane-1-carbonitrile The mode of execution is as follows:

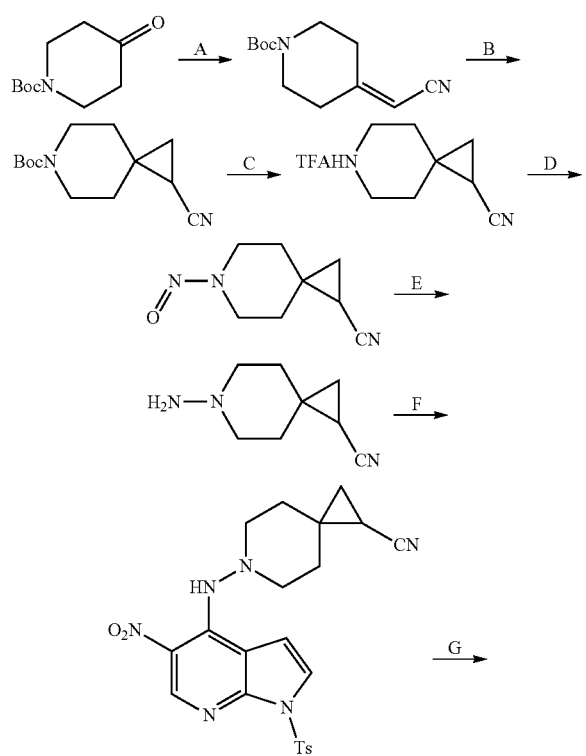

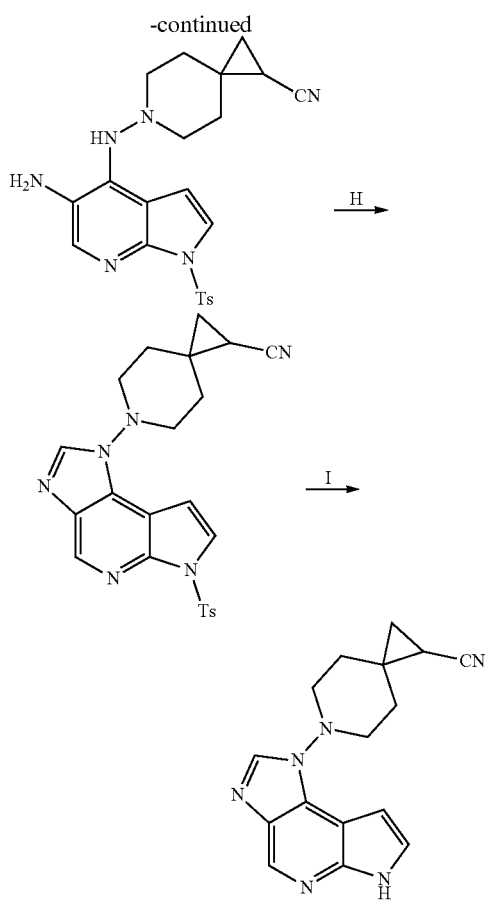

Step A

Dissolve diethyl (cyanomethyl)phosphonate (3.72 g, 21.0 mmol) in 30 mL anhydrous tetrahydrofuran, and add 60% sodium hydride (0.84 g, 21 mmol) at 0° C.; react at this temperature for half an hour, and then drop in lithium aluminum tetrahydro solution (10 mL) containing tert-butyl 4-oxopiperidine-1-carboxylate (2.09 g, 10.5 mmol); react at room temperature for 3 h under nitrogen protection. After the reaction, add water at 0° C. to quench, and extract with ethyl acetate (240 mL) for three times; obtain product 4-(cyanomethylene)piperidine-1-carboxylic acid tert-butyl ester (2.2 g, yield rate 94%) by drying, spin drying and purification. $^1$H NMR (400 MHz, CDCl$_3$) δ 5.19 (s, 1H), 3.54-3.48 (m, 4H), 2.56 (t, J=6.0 Hz, 1H), 2.33 (t, J=6.0 Hz, 1H).

Step B

Dissolve potassium tert-butoxide (1.11 g, 9.9 mmol) in 20 mL dimethyl sulfoxide, and slowly add trimethyl sulfoxide iodide (2.18 g, 9.9 mmol); react at room temperature for 1.5 h, and add dimethyl sulfoxide solution containing 4-(cyanomethylene)piperidine-1-carboxylic acid tert-butyl ester (2.0 g, 9.0 mmol) into this reaction solution; heat to 45° C. under nitrogen protection and stir for 16 h. After the reaction, quench with ammonium chloride aqueous solution, and extract with ethyl acetate (240 mL) for three times; obtain product 1-cyano-6-azaspiro[2,4]octane-6-carboxylic acid tert-butyl ester (1.8 g, yield rate 85%) by drying, spin drying and purification. LCMS ESI(+) m/z: 237.1 (M+1).

Step C

Dissolve compound 1-cyano-6-azaspiro[2,4]octane-6-carboxylic acid tert-butyl ester (1.8 g, 7.6 mmol) in 20 mL dichloromethane, and add trifluoroacetic acid (2 mL) dropwise under ice bath; heat to 75° C. and stir for 18 h. After the reaction, obtain crude product 6-aza-spiro[2.5]octane-1-carbonitrile trifluoroacetate (1.0 g, yield rate 97%) by spin drying. LCMS ESI(+) m/z: 137.1 (M+1).

Step D

Dissolve compound 6-aza-spiro[2.5]octane-1-carbonitrile trifluoroacetate (1.0 g, 7.4 mmol) in 10 mL water and 1 mL glacial acetic acid, and add the aqueous solution containing sodium nitrite (1.0 g, 14.7 mmol) dropwise under ice bath; stir at room temperature for 20 h. After the reaction, quench with sodium bicarbonate aqueous solution, and extract with ethyl acetate (240 mL) for three times; obtain compound 6-nitroso-6-aza-spiro[2.5]octane-1-carbonitrile (0.6 g, yield rate 50%) by spin drying and purification. LCMS ESI(+) m/z: 166.1.

Step E

Suspend 6-nitroso-6-aza-spiro[2.5]octane-1-carbonitrile (0.3 g, 1.8 mmol) and zinc powder (1.17 g, 18 mmol) in methanol (5 mL) and acetic acid (0.5 mL), and stir at room temperature for 2 h under nitrogen protection. After the reaction, obtain product 6-amino-6-azaspiro[2.5]octane-1-carbonitrile (274 mg, yield rate 100%) by filtration and spin-drying. LCMS ESI(+) m/z: 152.1 (M+1)

Step F

Add compound 4-chloro-5-nitro-1-p-toluenesulfonyl-1H-pyrrolo[2,3-b]pyridine (634 mg, 1.8 mmol), N,N-diisopropylethylamine (2.32 g, 18 mmol) and 6-amino-6-azaspiro[2.5]octane-1-methylonitrile (274 mg, 1.8 mmol) to 10 mL isopropyl alcohol (suspension). Stir the reaction at 95° C. for 18 h. After the reaction, cool to room temperature, and add 100 mL water; extract with ethyl acetate (3*100 mL), and combine organic phases; dry with anhydrous sodium sulfate, and obtain compound 6-((5-nitro-1-p-toluenesulfonyl-1H-pyrrolo[2,3-b]pyridine-4-yl) by filtration, spin drying and column chromatography purification. LCMS ESI(+) m/z: 467.1 (M+1).

Step G

Add compound 6-((5-nitro-1-p-toluenesulfonyl-1H-pyrrolo[2,3-b]pyridine-4-yl)amino)-6-azaspiro[2.5]octane-1-carbonitrile (430 mg, 0.92 mmol) to the mixed solution (suspension) of 20 mL ethanol and 4 mL water, and then add ammonium chloride solid (99 mg, 1.84 mmol) and iron powder (300 mg, 5.54 mmol) in turn. Heat to 80° C. and stir for 3 h. After the reaction, filter the reaction solution and wash the filter residue with appropriate amount of ethyl acetate. Add 20 mL water to the filtrate, and extract with ethyl acetate (3*20 mL); combine the organic phases, and dry with anhydrous sodium sulfate; obtain compound 6-((5-amino-1-p-toluenesulfonyl-1H-pyrrolo[2,3-b]pyridine-4-yl)amino)-6-azaspiro[2.5]octane-1-carbonitrile (347 mg, yield rate 62%) by filtration, spin drying and column chromatography purification. LCMS ESI(+) m/z: 437.1 (M+1).

Step H

Dissolve compound 6-((5-amino-1-p-toluenesulfonyl-1H-pyrrolo[2,3-b]pyridine-4-yl)amino)-6-azaspiro[2.5]octane-1-carbonitrile (230 mg, 2.65 mmol) in 5 mL acetic acid, and add triethylorthoformate (392 mg, 2.65 mmol). Heat to 116° C. and stir the reaction for 1 h. After the reaction, concentrate under reduced pressure, and obtain compound 6-(6-p-toluenesulfonyl imidazo[4,5-d]pyrrolo[2,3-b]pyridine-1(6H)-yl)-6-azaspiro[2.5]octane-1-carbonitrile (120 mg, yield rate 51%) by silica gel column chromatography. LCMS ESI(+) m/z: 446.1 (M+1).

Step I

Dissolve compound 6-(6-p-toluenesulfonyl imidazo[4,5-d]pyrrolo[2,3-b]pyridine-1(6H)-yl)-6-azaspiro[2.5]octane-1-carbonitrile (110 mg, 0.25 mmol) in the mixed solution of 10 mL methanol and 10 mL dichloromethane, and add potassium carbonate (681 mg, 4.9 mmol); stir at room temperature for 18 h under nitrogen protection. After the reaction, filter, and add 20 mL water; extract with ethyl acetate (5*50 mL), and combine the organic phases; dry with anhydrous sodium sulfate, and filter; spin-dry, and prepare compound 6-(imidazo[4,5-d]pyrrolo[2,3-b]pyridine-1(6H)-yl)-6-azaspiro[2.5]octane-1-carbonitrile (20 mg, yield rate 28%) by HPLC. $^1$H NMR (400 MHz, DMSO-$d_6$) δ 11.86 (s, 1H), 8.59 (s, 1H), 8.57 (s, 1H), 7.47 (t, J=3.0 Hz, 1H), 6.77 (dd, J=3.2, 2.0 Hz, 1H), 3.41-3.32 (m, 4H), 2.09-1.78 (m, 5H), 1.27-1.19 (m, 2H). LCMS ESI(+) m/z: 293.1 (M+1).

Example 13

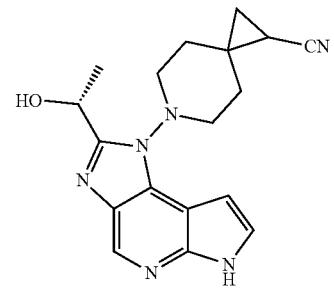 [SMILES: C[C@@H](O)c1nc2cnc3[nH]ccc3c2n1N1CCC2(CC1)CC2C#N]

6-(2-((R)-1-hydroxyethyl)imidazo[4,5-d]pyrrolo[2,3-b]pyridine-1(6H)-yl)-6-azaspiro[2.5]octane-1-carbonitrile The mode of execution is as follows:

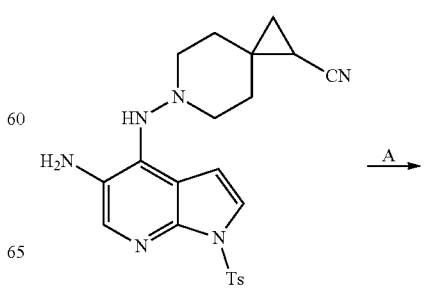

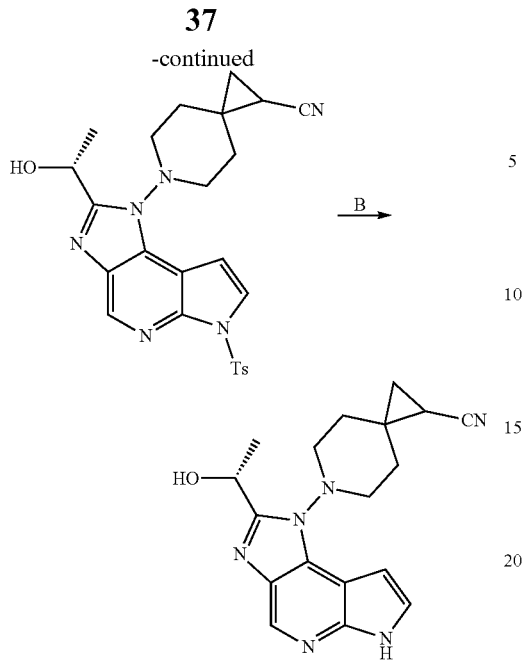

Step A

Dissolve triethyl oxyom boron tetrafluoride (1.31 g, 6.9 mmol) and R-lactoamide (612 mg, 6.9 mmol) in 20 mL tetrahydrofuran, and stir the reaction at room temperature for 2 h. Concentrate under reduced pressure to obtain the colorless oil, and dissolve it in 10 mL absolute ethyl alcohol; add to 10 mL absolute ethanol to dissolve compound 6-((5-amino-1-p-toluenesulfonyl-1H-pyrrolo[2,3-b]pyridine-4-yl) amino)-6-azaspiro[2.5]octane-1-carbonitrile (504 mg, 1.11 mmol). Heat to 75° C. and stir the reaction for 1 h. After the reaction, quench with sodium bicarbonate aqueous solution, and add 30 mL water; extract with ethyl acetate (3*100 mL), and combine the organic phases; wash with 200 mL saturated saline solution and dry with anhydrous sodium sulfate. Filter it by suction, and concentrate the filtrate under reduced pressure; obtain compound 6-(2-((R)-1-hydroxyethyl) 6-p-toluenesulfonyl imidazo[4,5-d]pyrrolo[2,3-b]pyridine-1 (6H)-yl)-6-azaspiro[2.5]octane-1-carbonitrile (590 mg, yield rate 52%) by silica gel column chromatography. LCMS ESI(+) m/z: 490.1 (M+1).

Step B

Dissolve compound 6-(2-((R)-1-hydroxyethyl) 6-p-toluenesulfonyl imidazo[4,5-d]pyrrolo[2,3-b]pyridine-1(6H)-yl)-6-azaspiro[2.5]octane-1-carbonitrile (290 mg, 0.59 mmol) in 15 mL methanol, and add 5 mL 1 N sodium hydroxide aqueous solution; stir the reaction at 30° C. for 6 h. After the reaction, adjust the pH to 7 to 8 with acetic acid, and concentrate under reduced pressure; prepare compound 6-(2-((R)-1-hydroxyethyl)imidazo[4,5-d]pyrrolo[2,3-b] pyridine-1(6H)-yl)-6-azaspiro[2.5] octane-1-carbonitrile (80 mg, yield rate 28%) by silica gel column chromatography and HPLC. $^1$H NMR (400 MHz, DMSO-$d_6$) δ 12.18 (s, 1H), 8.64 (s, 1H), 7.64 (t, J=2.8 Hz, 1H), 7.47 (d, J=8.0 Hz, 1H), 6.68 (dd, J=3.3, 1.8 Hz, 1H), 5.26 (q, J=6.4 Hz, 1H), 3.78-3.62 (m, 2H), 3.33-3.16 (m, 2H), 2.43-2.22 (m, 2H), 1.60 (d, J=6.6 Hz, 3H), 1.49 (d, J=13.8 Hz, 1H), 1.40-1.21 (m, 4H). LCMS ESI(+) m/z: 337.1 (M+1).

Example 14

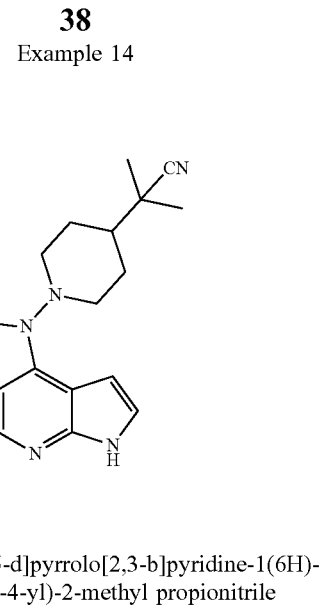

2-(1-(imidazo[4,5-d]pyrrolo[2,3-b]pyridine-1(6H)-yl)piperidine-4-yl)-2-methyl propionitrile The mode of execution is as follows:

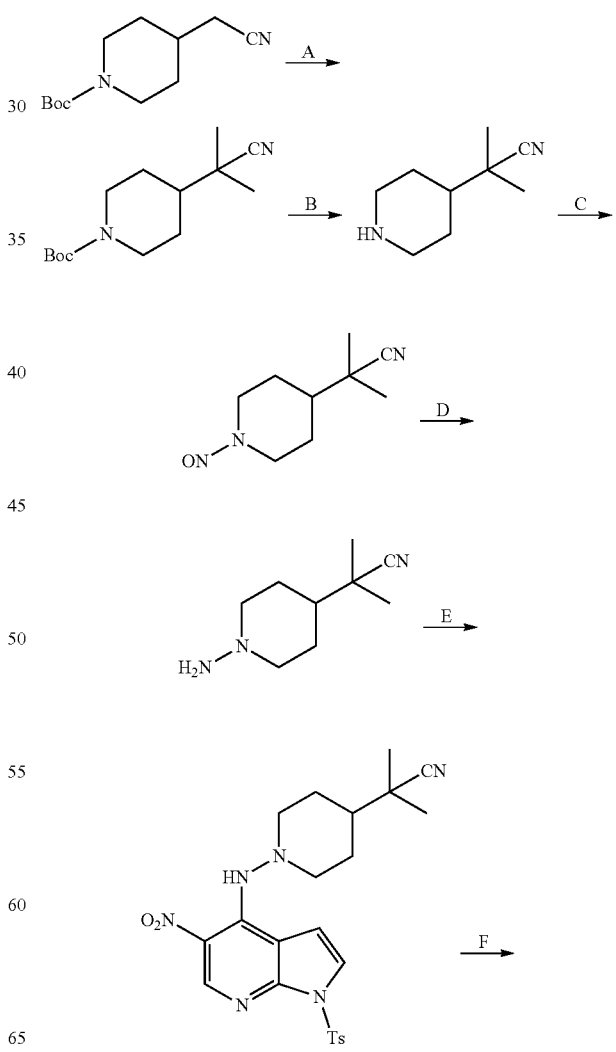

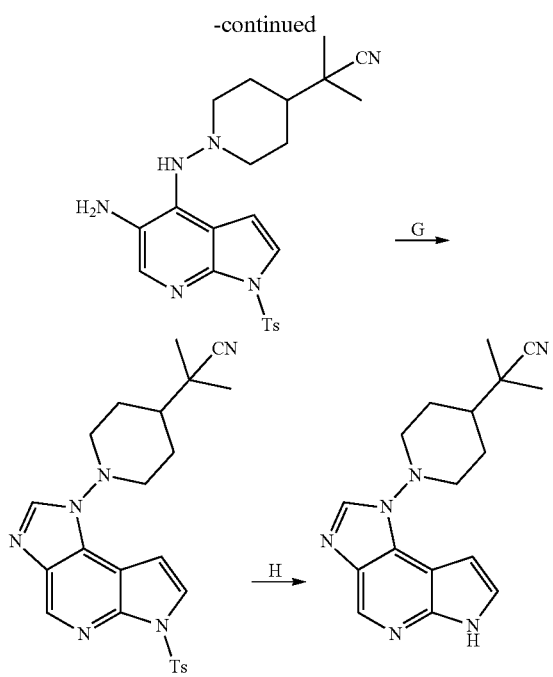

Step A

Dissolve 1-Boc-4-cyanomethylpiperidine (4.5 g, 20.0 mmol) in 130 mL anhydrous tetrahydrofuran, and drop in tetrahydrofuran solution of bis (trimethylsilyl)amino sodium (2 M, 30 mL, 60.0 mmol) under ice bath and nitrogen protection. After the addition is completed, stir for 10 min in ice bath, and dilute methyl iodide (6.53 g, 46.0 mmol) with 20 mL anhydrous tetrahydrofuran and slowly drop into the reaction solution. After the addition is completed, stir the reaction for 16 h under nitrogen protection at room temperature. Quench the reaction solution with appropriate amount of saturated ammonium chloride solution, and add 150 mL water; extract with 600 mL ethyl acetate for three times. Combine the organic phases, and dry with anhydrous sodium sulfate; filter, and concentrate under reduced pressure to obtain crude compound 4-(2-cyanopropyl-2-yl)piperidine-1-carboxylic acid tert-butyl ester (4.02 g, yield rate 79%).

Step B

Dissolve compound 4-(2-cyanopropyl-2-yl)piperidine-1-carboxylic acid tert-butyl ester (4.02 g, 15.0 mmol) in 30 mL dichloromethane, and slowly add 15 mL trifluoroacetic acid at 0° C. Stir at room temperature for 4 h. Concentrate under reduced pressure to obtain compound 2-methyl-2-(piperidin-4-yl)propionitrile trifluoroacetate (3.79 g, yield rate 100%).

Step C

Dissolve compound 2-methyl-2-(piperidin-4-yl)propionitrile trifluoroacetate (3.79 g, crude product, 15.0 mmol) and sodium nitrite (1.55 g, 22.5 mmol) in 50 mL water, and slowly drop 2.6 mL acetic acid at 0° C. Stir the reaction at 35° C. for 16 h. Adjust the pH of the reaction solution to 8 with sodium carbonate and extract in five times with 250 mL ethyl acetate. Combine the organic phases, and dry with anhydrous sodium sulfate; filter, and obtain compound 2-(1-nitrosopiperidine-4-yl)-2-methyl propionitrile (2.01 g, yield rate 74%) by rotary evaporation. LCMS ESI(+) m/z: 182.1 (M+1).

Step D

Dissolve compound 2-(1-nitrosopiperidine-4-yl)-2-methyl propionitrile (1.00 g, 5.0 mmol) in 30 mL methanol, and add zinc powder (4.71 g, 88.0 mmol) and 6 mL acetic acid respectively; stir at 30° C. for 25 min. After the reaction, filter the reaction solution, and concentrate the filtrate under reduced pressure to obtain the compound 2-(1-aminopiperidine-4-yl)-2-methyl propionitrile (4.73 g, yield rate 80%). LCMS ESI(+) m/z: 168.2 (M+1).

Step E

Add compound 4-chloro-5-nitro-1-p-toluenesulfonyl-1H-pyrrolo[2,3-b]pyridine (2.11 g, 6.0 mmol), N,N-diisopropylethylamine (3.88 g, 30.0 mmol) and 2-(1-aminopiperidine-4-yl)-2-methyl propionitrile (1.01 g, 6.0 mmol) to 150 mL isopropanol (suspension). Stir the reaction at 95° C. for 16 h. After the reaction, cool to room temperature, and add 250 mL water; extract with ethyl acetate (3*250 mL), and combine the organic phases; wash with 300 mL saturated saline solution, and dry with anhydrous sodium sulfate; filter and treat by rotary evaporation; purify by silica gel column chromatography to obtain compound 2-methyl-2-(1-((5-nitro-1-p-toluenesulfonyl-1H-pyrrolo[2,3-b]pyridine-4-yl)amino)piperidine-4-yl)propionitrile (1.47 g, yield rate 50%). LCMS ESI(+) m/z: 483.1 (M+1).

Step F

Add compound 2-methyl-2-(1-((5-nitro-1-p-toluenesulfonyl-1H-pyrrolo[2,3-b]pyridine-4-yl)amino)piperidine-4-yl)propionitrile (1.47 g, 3.0 mmol) to the mixed solution (suspension) of 75 mL ethanol and 25 mL water, and then add ammonium chloride solid (0.64 g, 12.0 mmol) and iron powder (0.67 g, 12.0 mmol) in turn. Heat to 80° C. and stir for 2 h. After the reaction, filter the reaction solution and wash the filter residue with 50 mL ethyl acetate. Add 50 mL water to the filtrate, and extract with ethyl acetate (3*150 mL); combine the organic phases, and wash with 150 mL saturated saline solution; dry with anhydrous sodium sulfate. Filter it by suction, and concentrate the filtrate under reduced pressure to obtain crude compound 2-methyl-2-(1-((5-amino-1-p-toluenesulfonyl-1H-pyrrolo[2,3-b]pyridine-4-yl)amino) piperidine-4-yl)propionitrile (1.74 g). LCMS ESI(+) m/z: 453.1 (M+1).

Step G

Dissolve compound 2-methyl-2-(1-((5-amino-1-p-toluenesulfonyl-1H-pyrrolo[2,3-b]pyridine-4-yl)amino) piperidine-4-yl)propionitrile (540 mg, 1.2 mmol) in 30 mL acetic acid, and add triethyl orthoformate (890 mg, 6.00 mmol). Heat to 116° C. and stir the reaction for 45 min. After the reaction, concentrate under reduced pressure, and obtain compound 2-methyl-2-(1-(6-p-toluenesulfonyl imidazo[4,5-d]pyrrolo[2,3-b]pyridine-1(6H)-yl)piperidin-4-yl)propionitrile (301 mg, yield rate 54%) by silica gel column chromatography. LCMS ESI(+) m/z: 463.1 (M+1).

Step H

Dissolve compound 2-methyl-2-(1-(6-p-toluenesulfonyl imidazo[4,5-d]pyrrolo[2,3-b]pyridine-1(6H)-yl)piperidin-4- yl)propionitrile (301 mg, 0.65 mmol) in 12 mL methanol and 6 mL tetrahydrofuran, and add 4 mL 1 N sodium hydroxide aqueous solution; stir the reaction at 35° C. for 6 h. After the reaction, adjust the pH to 7 to 8 with acetic acid, and concentrate under reduced pressure. Prepare compound 2-(1-(imidazo[4,5-d]pyrrolo[2,3-b]pyridine-1(6H)-yl)piperidine-4-yl)-2-methyl propionitrile (71 mg, yield rate 35%) by silica gel column chromatography and HPLC. $^1$H NMR (400 MHz, DMSO-$d_6$) δ 11.85 (s, 1H), 8.56 (s, 1H), 8.53 (s, 1H), 7.46 (t, J=2.9 Hz, 1H), 6.74 (dd, J=3.3, 1.9 Hz, 1H), 3.40-3.33 (m, 4H), 2.09-1.99 (m, 2H), 1.76-1.60 (m, 3H), 1.38 (s, 6H). LCMS ESI(+) m/z: 309.0 (M+1).

Example 15

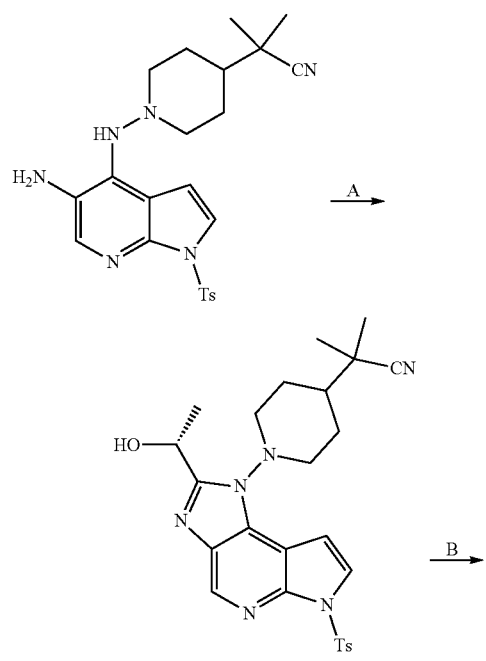

(R)-2-(1-(2-(1-hydroxyethyl)imidazo[4,5-d]pyrrolo[2,3-b]pyridine-1(6H)-yl)piperidine-4-yl)-2-methyl propionitrile The mode of execution is as follows:

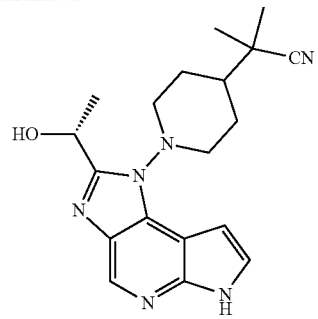 [SMILES: C[C@@H](O)c1nc2cnc3[nH]ccc3c2n1N1CCC(C(C)(C)C#N)CC1]

Step A

Dissolve triethyl oxyom boron tetrafluoride (633 mg, 3.33 mmol) and R-lactoamide (297 mg, 3.33 mmol) in 10 mL tetrahydrofuran, and stir the reaction at room temperature for 2 h. Concentrate under reduced pressure to obtain the colorless oil, and dissolve it in 5 mL absolute ethanol; add it to 10 mL absolute ethanol to dissolve compound 2-methyl-2-(1-((5-amino-1-p-toluenesulfonyl-1H-pyrrolo[2,3 C]pyridine-4-yl)amino)piperidine-4-yl)propionitrile (504 mg, 1.11 mmol). Heat to 75° C. and stir the reaction for 1 h. After the reaction, quench with sodium bicarbonate aqueous solution, and add 50 mL water; extract with ethyl acetate (3*50 mL), and combine the organic phases; wash with 100 mL saturated saline solution and dry with anhydrous sodium sulfate. Filter it by suction, and concentrate the filtrate under reduced pressure; obtain compound (R)-2-(1-(2-(1-hydroxyethyl)-6-p-toluenesulfonyl imidazo[4,5-d]pyrrolo[2,3-b]pyridine-1(6H)-yl)piperidin-4-yl)-2-methyl propionitrile (289 mg, yield rate 57%) by silica gel column chromatography. LCMS ESI(+) m/z: 507.2 (M+1).

Step D

Dissolve compound (R)-2-(1-(2-(1-hydroxyethyl)-6-p-toluenesulfonyl imidazo[4,5-d]pyrrolo[2,3-b]pyridine-1(6H)-yl)piperidin-4-yl)-2-methyl propionitrile (289 mg, 0.57 mmol) in 15 mL methanol, and add 5 mL 1 N sodium hydroxide. Stir the reaction at 30° C. for 6 h. After the reaction, adjust the pH to 7 to 8 with acetic acid, and concentrate under reduced pressure; prepare compound (R)-2-(1-(2-(1-hydroxyethyl)imidazo[4,5-d]pyrrolo[2,3-b]pyridine-1(6H)-yl)piperidin-4-yl)-2-methyl propionitrile (110 mg, yield rate 54%) by silica gel column chromatography and HPLC. $^1$H NMR (400 MHz, DMSO-$d_6$) δ 11.92 (s, 1H), 8.55 (s, 1H), 7.50 (t, J=3.0 Hz, 1H), 6.74 (dd, J=3.3, 1.8 Hz, 1H), 5.30 (d, J=6.3 Hz, 1H), 5.21-5.13 (m, 1H), 3.66-3.51 (m, 2H), 3.20 (dd, J=30.4, 10.2 Hz, 2H), 2.02 (d, J=10.7 Hz, 2H), 1.88 (t, J=12.0 Hz, 1H), 1.74-1.61 (m, 2H), 1.57 (d, J=6.6 Hz, 3H), 1.40 (s, 6H). LCMS ESI(+) m/z: 353.2 (M+1).

Example 16

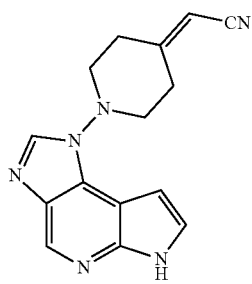 [SMILES: N#CC=C1CCN(n2cnc3cnc4[nH]ccc4c32)CC1]

2-(1-(imidazo[4,5-d]pyrrolo[2,3-b]pyridin-1(6H)-yl)
piperidin-4-ylidene)acetonitrile The mode of execution is as follows:

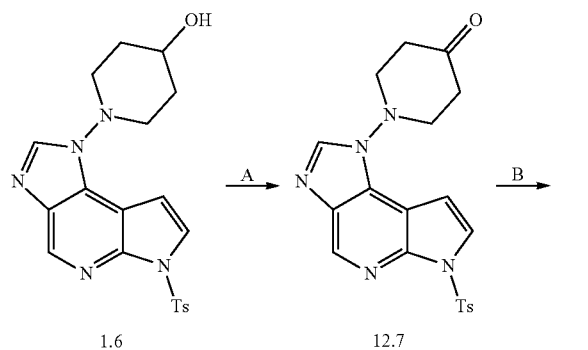

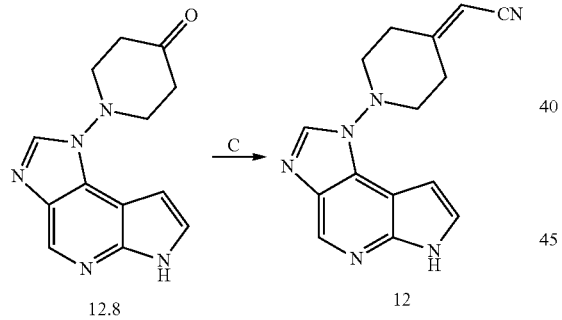

Step A

Suspend Deiss-Martin (2.5 g, 6 mmol) in 50 mL dichloromethane, and add compound 1-(6-p-toluenesulfonyl imidazo[4,5-d]pyrrolo[2,3-b]pyridine-1(6H)-yl)piperidin-4-ol (1.2 g, 3 mmol). Stir at room temperature for 3 h under nitrogen protection. After the reaction, obtain compound 1-(6-p-toluenesulfonyl imidazo[4,5-d]pyrrolo[2,3-b]pyridine-1(6H)-yl)piperidin-4-one (550 mg, yield rate 45%) by spin drying and column chromatography purification. LCMS ESI(+) m/z: 410.1 (M+1).

Step B

Dissolve compound 1-(6-p-toluenesulfonyl imidazo[4,5-d]pyrrolo[2,3-b]pyridine-1(6H)-yl)piperidine-4-one (110 mg, 0.27 mmol) in 12 mL methanol, and add sodium hydroxide aqueous solution (2 N, 3 mL) at 0° C.; stir at room temperature for 16 h under nitrogen protection. After the reaction, add 20 mL water, and extract with dichloromethane (5*50 mL); combine the organic phases, and dry with anhydrous sodium sulfate; obtain compound 1-(imidazo[4,5-d]pyrrolo[2,3-b]pyridine-1(6H)-yl)piperidine-4-one (50 mg, yield rate 73%) by filtration, spin drying and purification. $^1$H NMR (400 MHz, DMSO-$d_6$) δ 11.86 (s, 1H), 8.62 (s, 1H), 8.56 (s, 1H), 7.47 (t, J=3.0 Hz, 1H), 6.92 (dd, J=3.6, 2.0 Hz, 1H), 3.64-3.26 (m, 4H), 2.72-1.88 (m, 4H). LCMS ESI(+) m/z: 256.1 (M+1).

Step C

Dissolve ethyl cyanomethyl phosphate (53 mg, 0.3 mmol) in 2 mL anhydrous tetrahydrofuran, and add 60% sodium hydrogen (24 mg, 0.6 mmol) at 0° C. under nitrogen protection; stir for 30 min. Dissolve compound 1-(imidazo[4,5-d]pyrrolo[2,3-b]pyridine-1(6H)-yl)piperidine-4-one (37 mg, 0.15 mmol) in 1 mL anhydrous tetrahydrofuran and add to the reaction solution; stir the reaction at room temperature for 3 h under nitrogen protection. After the reaction, add appropriate amount of saturated ammonium chloride aqueous solution, and extract with ethyl acetate (3*10 mL); combine the organic phases, and dry with anhydrous sodium sulfate; obtain compound 2-(1-(imidazo[4,5-d]pyrrolo[2,3-b]pyridin-1(6H)-yl)piperidin-4-ylidene)acetonitrile (15 mg, yield rate 39%) by filtration, spin drying and purification. $^1$H NMR (400 MHz, DMSO-$d_6$) δ 11.84 (s, 1H), 8.60 (s, 1H), 8.56 (s, 1H), 7.45 (d, J=3.2 Hz, 1H), 6.79 (d, J=3.2 Hz, 1H), 5.74 (s, 1H), 3.42-3.33 (m, 4H), 2.86-2.83 (m, 2H), 2.74-2.71 (m, 2H). LCMS ESI(+) m/z: 279.1 (M+1).

Example 17

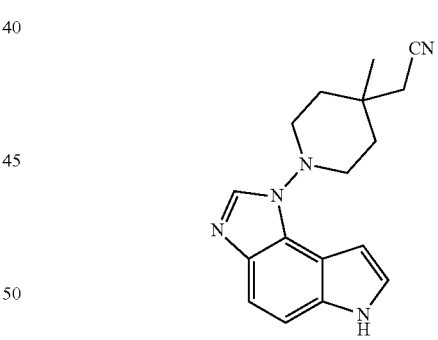

2-(1-(imidazo[4,5-d]pyrrolo[2,3-b]pyridine-1(6H)-yl)-4-methylpiperidine-4-yl)acetonitrile The mode of execution is as follows:

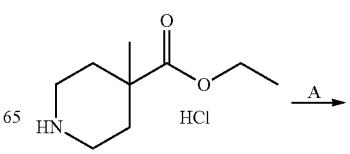

-continued

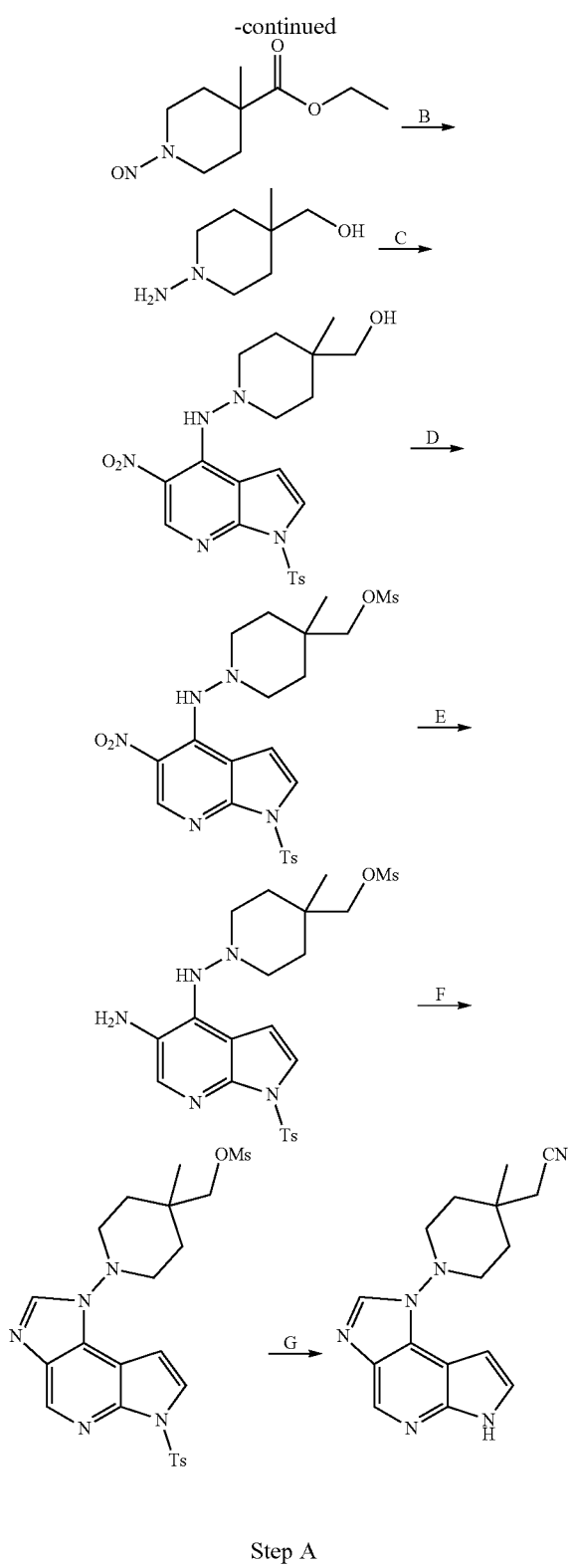

Step A

Dissolve compound 4-methyl-4-piperidinecarboxylate hydrochloride (2.0 g, 9.6 mmol) in 10 mL water. At 0° C., add sodium nitrite (1.66 g, 24.1 mmol), and drop acetic acid (1.16 g, 19.2 mmol). Then stir at 30° C. overnight. After the reaction, cool the reaction solution to 0° C., and then adjust the pH of the solution to 7 to 8 with sodium bicarbonate; extract with ethyl acetate (2*20 mL), and combine the organic phases; wash with brine (40 mL) and dry with anhydrous sodium sulfate. Filter, spin-dry, and obtain yellow oily compound 1-nitroso-4-methyl-4-piperidinecarboxylate (1.91 g, yield rate 99%). LCMS ESI(+) m/z: 201.1 (M+1).

Step B

Dissolve compound 1-nitroso-4-methyl-4-piperidinecarboxylate (1.91 g, 9.5 mmol) in 50 mL tetrahydrofuran. At 0° C., slowly add 2.5 M lithium aluminum tetrahydro solution (11.4 mL, 28.6 mmol). Stir at room temperature for 3 h under nitrogen atmosphere. After the reaction, cool the reaction solution to 0° C., and slowly add water (1.1 mL); add 15% sodium hydroxide (1.1 mL) and water (3.3 mL), and stir at room temperature for 15 min; obtain compound 1-amino-4-methyl-4-hydroxymethylpiperidine (1.15 g, yield rate 80%) by filtration, spin drying and column chromatography purification. LCMS ESI(+) m/z: 145.1 (M+1).

Step C

Dissolve compound 1-amino-4-methyl-4-hydroxymethylpiperidine (806 mg, 5.6 mmol), compound 4-chloro-5-nitro-1-p-toluenesulfonyl-1H-pyrrolo[2,3-b]pyridine (966 mg, 2.8 mmol) and N,N-diisopropylethylamine (2.13 g, 16.5 mmol) in 50 mL isopropanol, and stir the reaction solution at 88° C. overnight. After the reaction, spin-dry the reaction solution and obtain the yellow solid compound (4-methyl-1-((5-nitro-1-p-toluenesulfonyl-1H-pyrrolo[2,3-b]pyridine-4-yl)amino)piperidine-4-yl)methanol (787 mg, yield rate 62%) by column chromatography purification. LCMS ESI (+) m/z: 460.1 (M+1).

Step D

Dissolve compound (4-methyl-1-((5-nitro-1-p-toluenesulfonyl-1H-pyrrolo[2,3-b]pyridine-4-yl)amino)piperidine-4-yl)methanol (2.69 g, 5.9 mmol) in 30 mL dichloromethane, and then add triethylamine (1.19 g, 11.7 mmol) and methanesulfonyl chloride (805 mg, 7.0 mmol); stir at room temperature for 4 h. After the reaction, spin-dry the reaction solution and obtain the yellow solid compound (4-methyl-1-((5-nitro-1-p-toluenesulfonyl-1H-pyrrolo[2,3-b]pyridine-4-yl)amino)piperidine-4-yl)methyl methanesulfonate (3.06 g, yield rate 97%) by column chromatography purification. LCMS ESI(+) m/z: 538.0 (M+1).

Step E

Dissolve compound (4-methyl-1-((5-nitro-1-p-toluenesulfonyl-1H-pyrrolo[2,3-b]pyridine-4-yl)amino)piperidin-4-yl)methyl methanesulfonate (2.96 g, 5.5 mmol) in 90 mL ethanol, and then add iron powder (2.46 g, 44.1 mmol) and ammonium chloride (2.36 g, 44.1 mmol) dissolved in water (30 mL), and stir at 80° C. for 2 h. After the reaction, filter the reaction solution, and obtain the solid compound (4-methyl-1-((5-amino-1-p-toluenesulfonyl-1H-pyrrolo[2,3-b]pyridine-4-yl)amino)piperidine-4-yl)methyl methanesulfonate (2.14 g, yield rate 77%) by spin drying and column chromatography purification. LC-MS: m/z 508.1 (M+1).

Step F

Dissolve compound (4-methyl-1-((5-amino-1-p-toluenesulfonyl-1H-pyrrolo[2,3-b]pyridine-4-yl)amino)piperidin-4-yl)methyl methanesulfonate (1.3 g, 2.5 mmol) in 40 mL acetic acid, and add triethyl orthoformate (1.85 g, 12.5 mmol); heat to 116° C. and stir for 45 min. After the reaction, spin-dry the reaction solution and obtain the solid compound (4-methyl-1-(6-p-toluenesulfonyl imidazo[4,5-d]pyrrolo[2,3-b]pyridine-1(6H)-yl)piperidin-4-yl)methyl methanesulfonate (1.24 g, yield rate 94%) by column chromatography purification. LCMS ESI(+) m/z: 518.0 (M+1).

Step G

Dissolve compound (4-methyl-1-(6-p-toluenesulfonyl imidazo[4,5-d]pyrrolo[2,3-b]pyridine-1(6H)-yl)piperidin-4-yl)methyl methanesulfonate (100 mg, 0.97 mmol) in 5 mL N,N-dimethylformamide, and add sodium cyanide (47 mg, 0.97 mmol). Stir for 16 h at 120° C. After the reaction, spin-dry the reaction solution and obtain compound 2-(1-(imidazo[4,5-d]pyrrolo[2,3-b]pyridine-1(6H)-yl)-4-methylpiperidine-4-yl)acetonitrile (28 mg, yield rate 49%) by column chromatography purification. $^1$H NMR (400 MHz, CDCl$_3$) δ 9.72 (s, 1H), 8.80 (s, 1H), 8.17 (s, 1H), 7.38 (t, J=2.8 Hz, 1H), 6.82 (dd, J=3.1, 2.1 Hz, 1H), 3.52-3.36 (m, 2H), 3.36-3.24 (m, 2H), 2.49 (s, 2H), 2.04-1.98 (m, 2H), 1.90-1.82 (m, 2H), 1.37 (s, 3H). LCMS ESI(+) m/z: 295.1 (M+1).

Example 18

(R)-2-(1-(2-(1-hydroxyethyl)imidazo[4,5-d]pyrrolo[2,3-b]pyridine-1(6H)-yl)-4-methylpiperidine-4-yl)acetonitrile The mode of execution is as follows:

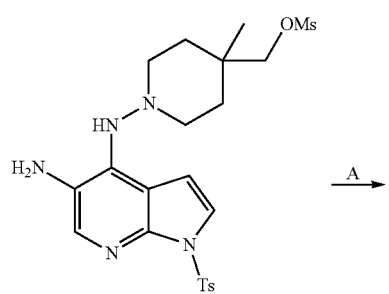

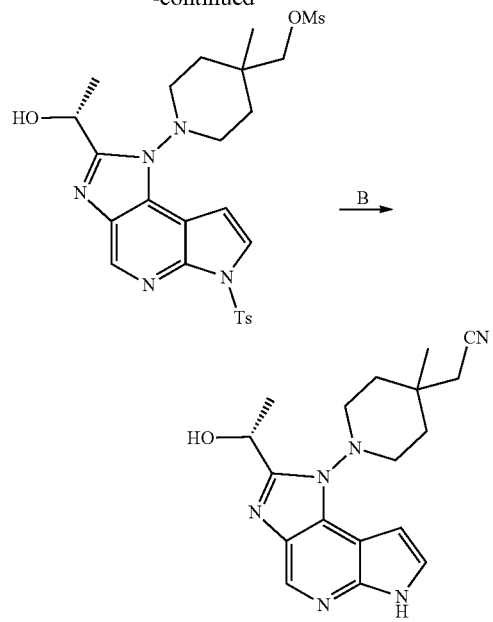

Step A

Dissolve R-lactoamide (263 mg, 2.96 mmol) and triethyloxonium tetrafluoroboric acid (561 mg, 2.96 mmol) in 10 mL tetrahydrofuran, and stir at 28° C. for 2 h. Dissolve the dried oil and the compound (4-methyl-1-((5-amino-1-p-toluenesulfonyl-1H-pyrrolo[2,3-b]pyridine-4-yl)amino)piperidine-4-yl)methyl methanesulfonate (500 mg, 0.99 mmol) in ethanol (30 mL), and stir at 75° C. for 2 h. After the reaction, spin-dry the reaction solution and obtain the solid compound (R)-(1-(2-(1-hydroxyethyl)-6-p-toluenesulfonyl imidazo[4,5-d]pyrrolo[2,3-b]pyridine-1(6H)-yl)-4-methylpiperidine-4-yl)methyl methanesulfonate (337 g, yield rate 60%) by column chromatography purification. LCMS ESI(+) m/z: 548.0 (M+1).

Step B

Dissolve compound (R)-(1-(2-(1-hydroxyethyl)-6-p-toluenesulfonyl imidazo[4,5-d]pyrrolo[2,3-b]pyridine-1(6H)-yl)-4-methylpiperidine-4-yl)methyl methanesulfonate (200 mg, 0.36 mmol), trimethylcyanosilane (106 mg, 1.07 mmol) and potassium carbonate (148 mg, 1.07 mmol) in 10 mL N,N-dimethylformamide, and stir the reaction solution at 120° C. for 72 h. After the reaction, add 30 mL water, and extract with dichloromethane (3*30 mL); combine the organic phases, and wash the organic phases with saline solution (100 mL); dry with anhydrous sodium sulfate. Prepare compound (R)-2-(1-(2-(1-hydroxyethyl)imidazo[4,5-d]pyrrolo[2,3-b]pyridine-1(6H)-yl)-4-methylpiperidine-4-yl)acetonitrile (48 mg, yield rate 40%) by filtration and spin drying. $^1$H NMR (400 MHz, DMSO-d$_6$) δ 11.95 (s, 1H), 8.55 (s, 1H), 7.55 (t, J=3.0 Hz, 1H), 6.64 (dd, J=3.2, 2.0 Hz, 1H), 5.28 (d, J=6.0 Hz, 1H), 5.20-5.14 (m, 1H), 3.65-3.60 (m, 2H), 3.60-3.55 (m, 2H), 2.68 (s, 2H), 1.96-1.94 (m, 2H), 1.88-1.80 (m, 2H), 1.35 (s, 3H). LCMS ESI(+) m/z: 339.1 (M+1).

Example 19

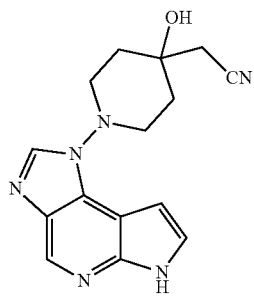 [SMILES: N#CCC1(O)CCN(n2cnc3cnc4[nH]ccc4c32)CC1]

2-(4-hydroxy-1-(imidazo[4,5-d]pyrrolo[2,3-b]pyridine-1(6H)-yl)-piperidine-4-yl)acetonitrile The mode of execution is as follows:

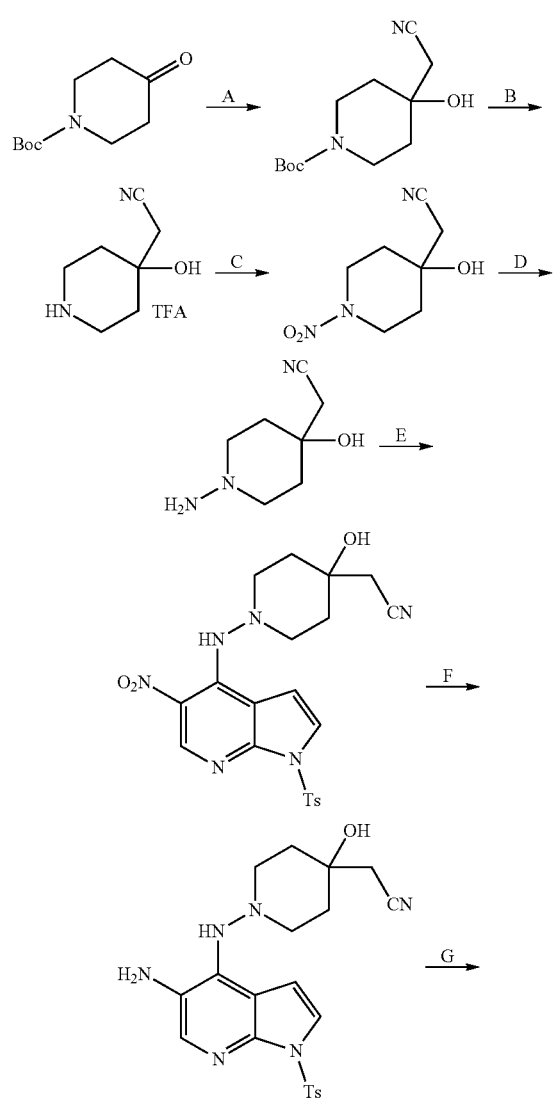

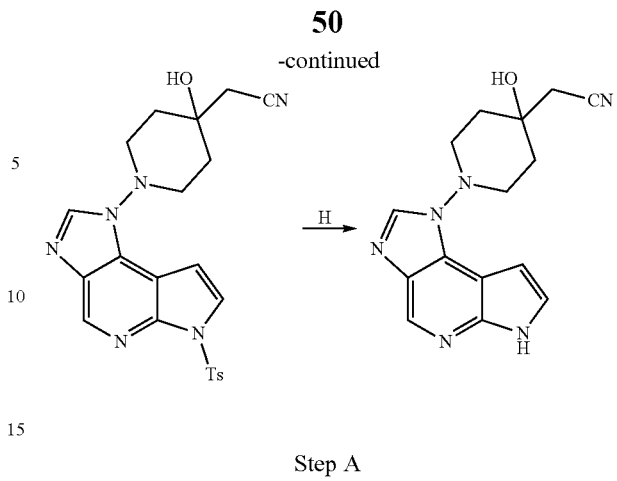

Step A

Add diisopropylamino lithium (2 M, 50 mL, 100.0 mmol) into 150 mL tetrahydrofuran, and add acetonitrile (4.10 g, 100.0 mmol) under nitrogen protection at −78° C.; stir for 1 h at −78° C. Then, dissolve N-Boc-4-piperidone (10.0 g, 50.0 mmol) in 50 mL tetrahydrofuran and drop into the reaction system. After the addition is completed, slowly heat to room temperature and keep the reaction for 1 h. After the reaction, quench with appropriate amount of saturated ammonium chloride aqueous solution, and add 150 mL water; extract with 600 mL ethyl acetate for three times. Combine the organic phases, wash with 300 mL saturated saline solution and dry with anhydrous sodium sulfate. Filter it by suction, and concentrate the filtrate under reduced pressure; obtain compound N-Boc-4-cyanomethyl-4-hydroxypiperidine (6.2 g, yield rate 52%) by silica gel column chromatography. LCMS ESI(+) m/z: 241.2 (M+1).

Step B

Dissolve compound N-Boc-4-cyanomethyl-4-hydroxypiperidine (6.2 g, 25.8 mmol) in 60 mL dichloromethane, and add 15 mL trifluoroacetic acid at 0° C. After the addition is completed, stir the reaction at room temperature for 5 h. After the reaction, concentrate the reaction solution under reduced pressure to obtain compound 4-(cyanomethyl)-4-hydroxypiperidine trifluoroacetate (5.12 g, yield rate 97%). LCMS ESI(+) m/z: 141.1 (M+1).

Step C

Dissolve compound 4-(cyanomethyl)-4-hydroxypiperidine trifluoroacetate (5.12 g, 25.0 mmol) in 30 mL water and 50 mL acetic acid, and dissolve sodium nitrite (2.59 g, 37.5 mmol) in 15 mL water. At 0° C., slowly drop sodium nitrite aqueous solution into the reaction system, and stir the reaction at room temperature for 16 h. After the reaction, concentrate the reaction solution under reduced pressure, and obtain compound 1-nitroso-4-(cyanomethyl)-4-hydroxypiperidine (2.60 g, yield rate 61%) by silica gel column chromatography. LCMS ESI(+) m/z: 170.1 (M+1).

Step D

Dissolve compound 1-nitroso-4-(cyanomethyl)-4-hydroxypiperidine (2.30 g, 13.5 mmol) in 100 mL methanol, and add zinc powder (17.8 g, 272.0 mmol); add 20 mL acetic acid dropwise at room temperature. After the addition, stir the mixture at 30° C. for 15 min. After the reaction, filter the reaction solution, and obtain crude compound 1-amino-4-

(cyanomethyl)-4-hydroxypiperidine (1.78 g, yield rate 85%) by rotary evaporation of the filtrate. LCMS ESI(+) m/z: 156.1 (M+1).

Step E

Add compound 4-chloro-5-nitro-1-p-toluenesulfonyl-1H-pyrrolo[2,3-b]pyridine (4.02 g, 11.4 mmol), N,N-diisopropylethylamine (5.89 g, 45.6 mmol) and 1-amino-4-(cyanomethyl)-4-hydroxypiperidine (1.78 g, 11.4 mmol) to 150 mL isopropanol (suspension). At 95° C. (oil bath temperature), stir the reaction for 16 h. After the reaction, cool it to room temperature, and add 200 mL water; extract with 600 mL ethyl acetate for three times. Combine the organic phases, and dry with anhydrous sodium sulfate; filter, and obtain compound 2-(4-hydroxy-1-(5-nitro-1-p-toluenesulfonyl-1H-pyrrolo[2,3-b]pyridine-4-yl)amino)piperidin-4-yl)acetonitrile (3.25 g, yield rate 60%) by rotary evaporation and purification. LCMS ESI(+) m/z: 471.2 (M+1).

Step F

Add compound 2-(4-hydroxy-1-((5-nitro-1-p-toluenesulfonyl-1H-pyrrolo[2,3-b]pyridine-4-yl)amino) piperidine-4-yl)acetonitrile (3.25 g, 3.9 mmol) to the mixed solution (suspension) of 90 mL ethanol and 30 mL water, and then add ammonium chloride solid (0.88 g, 16.55 mmol) and iron powder (0.92 g, 16.55 mmol) in turn. Heat to 80° C. and stir for 2.5 h. After the reaction, filter the reaction solution and wash the filter residue with 50 mL ethyl acetate. Add 50 mL water in the filtrate and extract with 240 mL ethyl acetate for three times. Combine the organic phases, wash with 100 mL saturated saline solution and dry with anhydrous sodium sulfate. Filter it by suction, and concentrate the filtrate under reduced pressure; obtain compound 2-(1-((5-amino-1-p-toluenesulfonyl-1H-pyrrolo[2,3-b]pyridine-4-yl)amino) 4-hydroxypiperidine-4-yl)acetonitrile (1.88 g, 62%) by silica gel column chromatography. LCMS ESI(+) m/z: 441.2 (M+1).

Step G

Dissolve compound 2-(1-((5-amino-1-p-toluenesulfonyl-1H-pyrrolo[2,3-b]pyridine-4-yl)amino)4-hydroxypiperidine-4-yl)acetonitrile (562 mg, 1.28 mmol) in 25 mL acetic acid, and add triethyl orthoformate (948 mg, 6.40 mmol). Heat to 116° C. and stir for 1 h. Cool to room temperature, and concentrate under reduced pressure; obtain compound 2-(4-hydroxy-1-(6-p-toluenesulfonyl imidazo[4,5-d]pyrrolo[2,3-b]pyridine-1(6H)-yl)-piperidine-4-yl)acetonitrile (360 mg, yield rate 62%) by silica gel column chromatography. LCMS ESI(+) m/z: 426.2 (M+1).

Step H

Dissolve 2-(4-hydroxy-1-(6-p-toluenesulfonyl imidazo[4,5-d]pyrrolo[2,3-b]pyridine-1(6H)-yl)-piperidine-4-yl)acetonitrile (360 mg, 0.80 mmol) in 15 mL methanol and 5 mL tetrahydrofuran. Add 5 mL 2 N sodium hydroxide aqueous solution, and stir the reaction for 16 h at room temperature. Adjust the reaction solution to pH 8 to 9 with acetic acid, and concentrate under reduced pressure; obtain compound 2-(4-hydroxy-1-(imidazo[4,5-d]pyrrolo[2,3-b]pyridine-1(6H)-yl)-piperidine-4-yl)acetonitrile (60 mg, yield rate 26%) by silica gel column chromatography purification. $^1$H NMR (400 MHz, DMSO-$d_6$) δ 11.86 (s, 1H), 8.76-8.16 (m, 2H), 7.48 (s, 1H), 6.90 (s, 1H), 5.45 (s, 1H), 3.85-3.54 (m, 2H), 3.08 (d, J=9.9 Hz, 2H), 2.81 (s, 2H), 2.03-1.91 (m, 2H), 1.86 (d, J=12.2 Hz, 2H). LCMS ESI(+) m/z: 297.1 (M+1).

Example 20

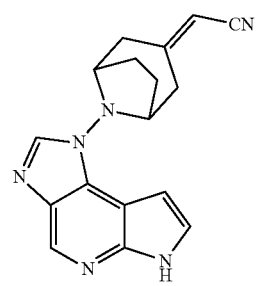 [SMILES: N#CC=C1CC2CCC(C1)N2n1cnc2cnc3[nH]ccc3c21]

2-(8-(imidazo[4,5-d]pyrrolo[2,3-b]pyridin-1(6H)-yl)-8-azabicyclo[3.2.1]octan-3-ylidene)acetonitrile The specific implementation methods are as follows:

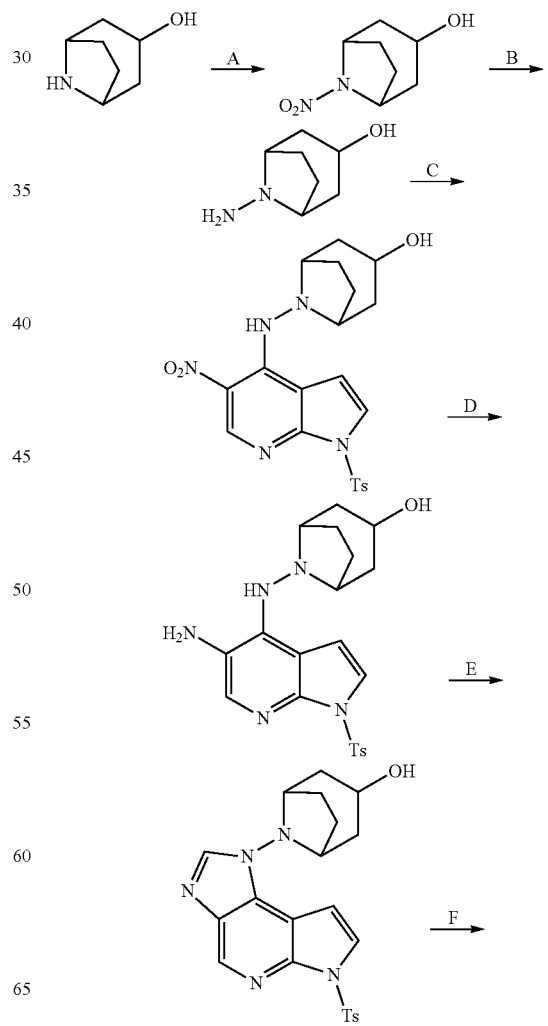

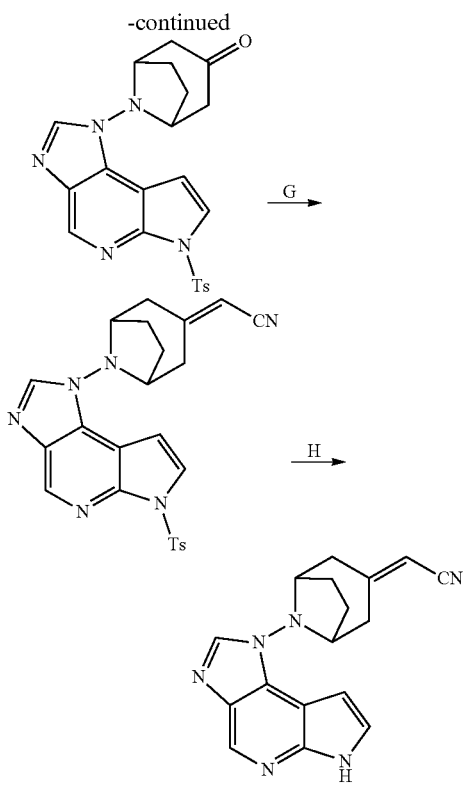

Step A

Dissolve nortropine (3.01 g, 26.13 mmol) in 80 mL water. Besides, add 80 mL concentrated hydrochloric acid at 0° C., and add sodium nitrite (43.5 g, 630.2 mmol) in batches at 30° C. Then, continue to stir at 30° C. and react for 16 h. After the reaction, conduct the extraction for times with 600 mL ethyl acetate. Merge the organic phase, dry with anhydrous sodium sulfate, filter, rotate and evaporate the filtrate. In addition, the compound 8-nitroso-8-azabicyclo[3.2.1]octane-3-ol (8.62 g, yield 70%) is obtained by silica column chromatography purification. LCMS ESI(+) m/z: 157.1 (M+1).

Step B

Dissolve compound 8-nitroso-8-azabicyclo[3.2.1]octane-3-ol (7.0 g, 44.8 mmol) in 150 mL methanol, add zinc powder (29.3 g, 448.0 mmol) and drip 30 mL acetic acid at 0° C. After the dripping, stir at 30° C. and react for 20 min. Then, filter the reaction liquid. Rotate and evaporate the filtrate to obtain the crude compound 8-amino-8-azabicyclo[3.2.1]octan-3-ol (3.43 g, yield 54%). LCMS ESI(+) m/z: 143.1 (M+1).

Step C

Add compound 4-chloro-5-nitro-1-p-toluene sulfonyl-1H-pyrrolo[2,3-b]pyridine (3.52 g, 10.0 mmol), N,N-diisopropylethylamine (5.17 g, 40.0 mmol), and 8-amino-8-azabicyclo[3.2.1]octane-3-ol (1.72 g, 12.0 mmol) to 150 mL isopropyl alcohol (suspension). Stir at 95° C. and react for 16 h. After the reaction, cool to the room temperature, add 300 mL water, extract with ethyl acetate (3*250 mL), merge organic phase, dry with anhydrous sodium sulfate, filter and spin dry. Column chromatography purification is conducted to obtain the compound 8-((5-nitro-1-p-toluene-1H-pyrrolo[2,3-b]pyridine-4-base)amino)8-azabicyclo[3.2.1]octane-3-ol (3.17 g, yield 70%). LCMS ESI(+) m/z: 458.2 (M+1).

Step D

Add compound 8-((5-nitro-1-p-toluene sulfonyl-1H-pyrrolo[2,3-b]pyridine-4-base)amino)8-azabicyclo[3.2.1]octane-3-ol (3.17 g, 7.0 mmol) to a mixed solution with 120 mL ethanol and 40 mL water (suspension), followed by the addition of ammonium chloride solid (1.50 g, 28.0 mmol) and iron powder (1.56 g, 28.0 mmol). Then, heat to 80° C. and stir for 2 h. After the reaction, filter the reaction liquid with appropriate amount of ethyl acetate washing the filter residue. In addition, add 200 mL water in the filtrate and conduct the extraction with ethyl acetate (3*250 mL). Then, merge the organic phase, dry with anhydrous sodium sulfate, filter and spin dry. Column chromatography purification is conducted to obtain the compound 8-((5-nitro-1-p-toluene-1H-pyrrolo[2,3-b]pyridine-4-base)amino)8-nitrogen azabicyclo[3.2.1]octane-3-alcohol yield ratio (3.02 g, 100%). LCMS ESI(+) m/z: 428.2 (M+1).

Step E

Dissolve compound 8-((5-amino-1-p-toluene sulfonyl-1H-pyrrolo[2,3-b]pyridine-4-yl)amino)8-azabicyclo[3.2.1]octane-3-ol (2.95 g, 6.9 mmol) in 80 mL of acetic acid and add triethyl orthoformate (5.11 g, 34.5 mmol). When the temperature rises to 116° C., stir and react for 1 h. After the reaction, conduct the concentration and decompression. Then, the compound 8-(6-p-toluene sulfonyl imidazo[4,5-d]pyrrolo[2,3-b]pyridine-1(6H)-yl)-8-azabicyclo[3.2.1]octane-3-ol (2.31 g, yield 77%) is obtained by silica column chromatography. LCMS ESI(+) m/z: 438.2 (M+1).

Step F

Dissolve Dess-Martin Periodinane (3.01 g, 7.1 mmol) in 80 mL of dichloromethane. Dissolve compound 8-(6-p-toluene sulfonyl imidazo[4,5-d]pyrrolo[2,3-b]]pyridine-1(6H)-yl)-8-azabicyclo[3.2.1]octane-3-ol (2.05 g, 4.7 mmol) in 20 mL of dichloromethane and add it to the reaction solution. Stir at room temperature for 2 h. After the reaction, wash the reaction solution with 60 mL saturated aqueous sodium bicarbonate solution and 60 mL saturated aqueous sodium chloride solution, respectively. Then, obtain the compound 8-(6-toluene sulfonyl imidazo[4,5-d] pyrrolo[2,3-b]pyridine-1(6H)-yl)-8-azabicyclo[3.2.1]octane-3-ketone (1.3 g, yield 64%) by the way of drying with anhydrous sodium sulfate, filtering, concentrating and decompressing and through silica column chromatography. LCMS ESI(+) m/z: 436.2 (M+1).

Step G

Dissolve Diethyl cyanomethyl phosphate (798 mg, 4.5 mmol) in 30 mL anhydrous tetrahydrofuran with the protection of nitrogen. Then, add 60% sodium hydrogen (180 mg, 4.5 mmol) at 0° C. and stir for 30 min. Dissolve the compound 8-(6-toluene sulfonyl imidazolio[4,5-d] pyrrolo[2,3-b]pyridine-1(6H)-yl)-8-azabicyclo[3.2.1]octane-3-ketone (1.31 g, 3.0 mmol) in 15 mL anhydrous tetrahydrofuran, add it in the reaction solution and then stir for 2 h under nitrogen protection at room temperature. After the reaction, add an appropriate amount of saturated aqueous ammonium chloride solution, extract with ethyl acetate (3*50 mL), and merge the organic phases. After that, obtain the compound 2-(8-(6-p-toluene sulfonyl imidazo[4,5-d]pyrrolo[2,3-b]pyridin-1(6H)-yl)-8-azabicyclo[3.2.1]octan-3-ylidene)acetonitrile (879 mg, yield 64%) by the way of drying with anhydrous sodium sulfate, filtering, spinning dry and through silica column chromatography purification. LCMS ESI(+) m/z: 459.2 (M+1).

Step H

Dissolve 2-(8-(6-p-toluene sulfonyl imidazo[4,5-d]pyrrolo[2,3-b]pyridin-1(6H)-yl)-8-azabicyclo[3.2.1]octan-3-ylidene)acetonitrile in 24 mL of methanol and 8 mL tetrahydrofuran and then add 8 mL of 1 N sodium hydroxide aqueous solution. Stir at 35° C. and react for 16 h. After the reaction, adjust the pH to 8-9 with acetic acid, concentrate and decompress as well as conduct the silica column chromatography to obtain the compound 2-(8-(imidazo[4,5-d]pyrrolo[2,3-b]pyridin-1(6H)-yl)-8-azabicyclo[3.2.1]octan-3-ylidene)acetonitrile (302 mg, yield 55%). 1H NMR (400 MHz, DMSO-$d_6$) δ 11.81 (s, 1H), 8.55 (s, 1H), 8.26 (s, 1H), 7.43 (t, J=2.9 Hz, 1H), 6.90 (dd, J=3.2, 1.9 Hz, 1H), 5.76 (s, J=2.0 Hz, 1H), 3.98 (d, J=20.5 Hz, 2H), 3.00 (d, J=14.7 Hz, 2H), 2.79 (d, J=15.0 Hz, 1H), 2.57 (d, J=15.2 Hz, 1H), 2.36-2.22 (m, 2H), 1.83-1.64 (m, 2H). LCMS ESI(+) m/z: 305.2 (M+1).

Example 21

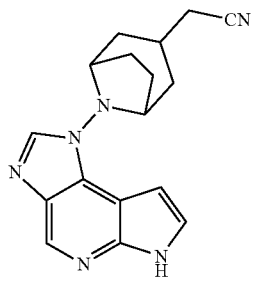 [SMILES: N#CCC1CC2CCC(C1)N2n1cnc2cnc3[nH]ccc3c21]

2-(8-(imidazo[4,5-d]pyrrolo[2,3-b]pyridin-1(6H)-yl)-8-azabicyclo[3.2.1]octan-3-yl)acetonitrile The specific implementation methods are as follows:

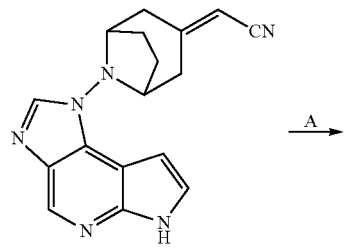

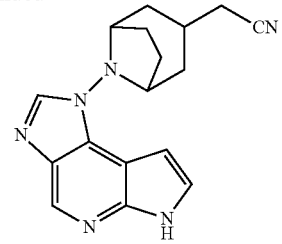

Step A

Dissolve the compound 2-(8-(imidazo[4,5-d]pyrrolo[2,3-b]pyridin-1(6H)-yl)-8-azabicyclo[3.2.1]octan-3-ylidene)acetonitrile (100 mg, 0.33 mmol) in 10 mL methanol and add palladium on carbon (106 mg, 0.10 mmol). Then, stir under hydrogen condition at room temperature and react for 16 h. After that, filter the reaction solution, wash the filter residue with proper amount of methanol, then concentrate and decompress the filtrate, conduct the high-performance liquid chromatography, which helps prepare the compound 2-(8-(imidazo[4,5-d]pyrrolo[2,3-b]pyridin-1(6H)-yl)-8-azabicyclo[3.2.1]octan-3-yl)acetonitrile (Diastereoisomer mixture, 35 mg, yield 40%). 1H NMR (400 MHz, DMSO-d6) δ 11.80 (s, 1H), 8.53 (s, 1H), 8.24 (s, 0.38H), 8.20 (s, 0.62H), 7.45-7.42 (m, 1H), 6.89 (dd, J=3.2, 2.0 Hz, 0.38H), 6.81 (dd, J=3.2, 2.0 Hz, 0.62H), 3.82 (s, 2H), 2.75 (d, J=8.1 Hz, 1.24H), 2.63 (d, J=8.1 Hz, 0.76H), 2.59-2.57 (m, 0.38H), 2.41-2.34 (m, 0.62H), 2.34-2.10 (m, 3H), 1.98-1.84 (m, 3H), 1.84-1.70 (m, 0.76H), 1.64-1.58 (m, 1.24H). LCMS ESI(+) m/z: 307.2 (M+1).

Example 22

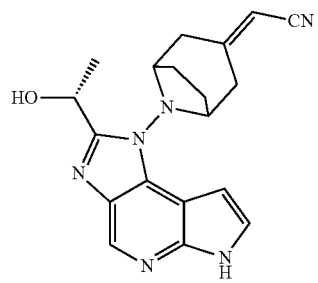 [SMILES: C[C@@H](O)c1nc2cnc3[nH]ccc3c2n1N1C2CCC1CC(=CC#N)C2]

2-(8-(2-((R)-1-hydroxyethyl)imidazo[4,5-d]pyrrolo[2,3-b]pyridin-1(6H)-yl)-8-azabicyclo[3.2.1]octan-3-ylidene)acetonitrile The specific implementation methods are as follows:

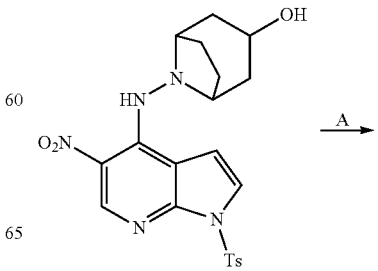

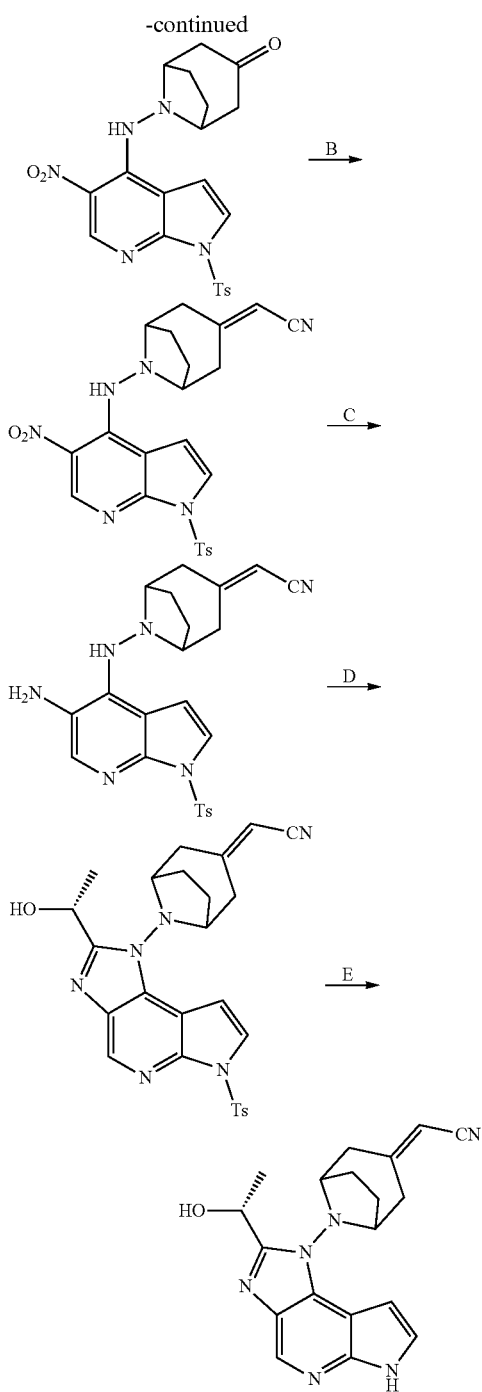

Step A

Dissolve Dess-Martin periodinane (7.30 g, 17.1 mmol) in 70 mL dichloromethane and dissolve the compound 8-((5-nitro-1-p-toluene sulfonyl-[2,3-b] pyrrolo and pyridine-4-base)amino) 8-azabicyclo[3.2.1]octane-3-alcohol (5.20 g, 11.4 mmol) in 50 mL dichloromethane and drip it into the reaction solution. Then, stir and react at room temperature for 3 h. After the reaction, add proper amount of saturated aqueous ammonium chloride solution, extract with dichloromethane (3*250 mL). Then, merge the organic phase, and wash with 500 mL saturated aqueous sodium chloride solution. Dry with anhydrous sodium sulfate, filter, concentrate and decompress the filtrate, and purify by silica column chromatography to obtain the compound 8-((5-nitro-1-p-toluene sulfonyl-1H-pyrrolo[2,3-b]pyridine-4-yl)amino)8-azabicyclo[3.2.1]octane-3-ketone (5.6 g, yield 72%). LCMS ESI(+) m/z: 456.2 (M+1).

Step B

Dissolve diethyl cyanomethylphosphate (3.27 g, 18.5 mmol) in 100 mL anhydrous tetrahydrofuran protected by nitrogen. Add 60% sodium hydrogen (738 mg, 60%, 18.5 mmol) at 0° C. and stir for 30 min. Dissolve compound 8-((5-nitro-1-p-toluene sulfonyl-1H-pyrrolo[2,3-b] pyrrole and pyridine-4-yl)amino)8-azabicyclo[3.2.1]octane-3-ketone (5.6 g, 12.3 mmol) in 100 mL anhydrous tetrahydrofuran and then add in reaction solution. Stir and react under nitrogen protection at room temperature for 3 h. After the reaction, add saturated aqueous ammonium chloride solution and extract with ethyl acetate (3*250 mL), merge the organic phase. Dry with anhydrous sodium sulfate, filter, concentrate by rotary evaporation, and conduct silica column chromatography to obtain compound 2-(8-(((5-nitro-1-p-toluene sulfonyl-1H-pyrrolo[2,3-b])pyridine-4-yl)amino) 8-azabicyclo[3.2.1]octane-3-ylidene) acetonitrile (4.37 g, yield 74%). LCMS ESI(+) m/z: 479.2 (M+1).

Step C

Add compound 2-(8-((5-nitro-1-p-toluenesulfonyl-1H-pyrrolo[2,3-b]pyridine-4-yl)amino) 8-azabicyclo[3.2.1]octane-3-ylidene) acetonitrile (2.37 mg, 5.0 mmol) to the mixed solvent with 120 mL ethyl alcohol and 40 mL water (suspension). Afterwards, add ammonium chloride solid (1.32 g, 24.8 mmol) and iron powder (1.38 g, 24.8 mmol) successively. Heat to 80° C. and stir for 2 h. After the reaction, filter the reaction solution, and wash the filter residue with an appropriate amount of ethyl acetate. Then, add 200 mL water to the filtrate, extract with ethyl acetate (3*250 mL), and merge the organic phase. Dry the filtrate with anhydrous sodium sulfate, filter, concentrate and decompress and conduct silica gel column chromatography to obtain compound 2-(8-((5-amino-1-p-toluenesulfonyl-1H-pyrrolo[2,3-b]pyridine-4-yl)amino)8-azabicyclo[3.2.1]octane-3-ylidene)acetonitrile (1.58 g, yield 65%). LCMS ESI(+) m/z: 449.2 (M+1).

Step D

Dissolve triethyloxyboron tetrafluoride (661 mg, 3.48 mmol) and R-lactamide (310 mg, 3.48 mmol) in 20 mL of tetrahydrofuran, stir and react at room temperature for 2 h. Then, obtain the colorless oily substance by decompression and concentration. After that, dissolve the substance in 15 mL absolute ethyl alcohol which is used to dissolve the compound 2-(8-((5-amino-1-p-toluenesulfonyl-1H-pyrrolo[2,3-b]pyridine-4-yl)amino)8-azabicyclo[3.2.1]octane-3-ylidene) acetonitrile (520 mg, 1.16 mmol). Heat to 75° C., stir and react for 1 h. After the reaction, quench with sodium bicarbonate aqueous solution, add 50 mL water, extract with ethyl acetate (3*50 mL), merge organic phase, wash with 100 mL saturated salt water, dry with anhydrous sodium sulfate. Afterwards, conduct suction filtration, decompress and concentrate the filtrate, and conduct silica column chromatography to obtain the compound 2-(8-(2-((R)-1-hydroxyethyl-6-p-toluenesulfonyl imidazole[4,5-d] pyrrolo

[2,3-b]pyridine-1(6H)-yl)-8-azabicyclo[3.2.1]octane-3-ylidene) acetonitrile (480 mg, yield 82%). LCMS ESI(+) M/z: 503.2 (m+1).

Step F

Dissolve the compound 2-(8-(2-((R)-1-hydroxyethyl-6-p-toluenesulfonyl imidazole(4,5-d] pyrrolo and [2,3-b]pyridine-1(6H)-yl)-8-azabicyclo[3.2.1]octane-3-ylidene) acetonitrile (360 mg, 0.71 mmol) in 9 mL methanol. Add 3 mL 1 N sodium hydroxide solution and stir at 35° C. and react for 8 h. After the reaction, adjust the pH to 8-9 with acetic acid, and decompress the concentration. Then conduct the silica column chromatography to obtain the compound 2-(8-(2-((R)-1-hydroxyethyl)imidazo[4,5-d]pyrrolo[2,3-b]pyridin-1(6H)-yl)-8-azabicyclo[3.2.1]octan-3-ylidene)acetonitrile (32 mg, yield 12%). 1H NMR (400 MHz, DMSO-d6) δ 11.77 (d, J=26.3 Hz, 1H), 8.49 (d, J=5.7 Hz, 1H), 7.46-7.30 (m, 1H), 6.95 (dd, J=115.2, 2.4 Hz, 1H), 5.47 (s, 1H), 4.98-4.80 (m, 1H), 4.31-3.72 (m, 2H), 2.73 (d, J=7.0 Hz, 1H), 2.70-2.54 (m, 3H), 2.38-1.73 (m, 6H), 1.64 (d, J=6.2 Hz, 3H), 1.57-1.44 (m, 1H). LCMS ESI(+) m/z: 326.2 (M+1).

Example 23

2-(8-(2-((R)-1-hydroxyethyl)imidazo[4,5-d]pyrrolo[2,3-b]pyridin-1(6H)-yl)-8-azabicyclo[3.2.1]octan-3-yl)acetonitrile The specific implementation methods are as follows:

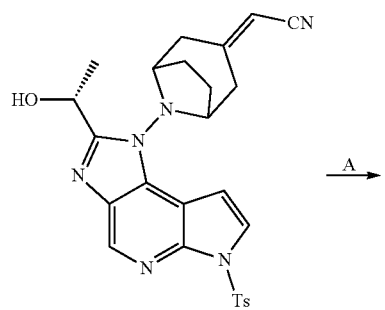

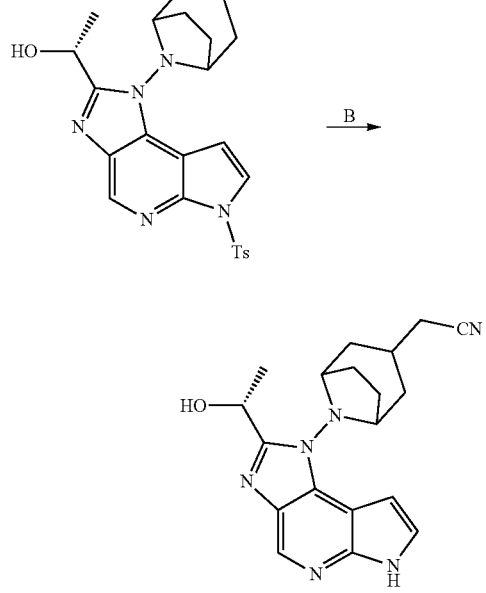

Step A

Dissolve the compound 2-(8-(2-((R)-1-hydroxyethyl-6-p-toluenesulfonyl imidazole[4,5-d] pyrrolo[2,3-b]pyridin-1(6H)-yl)-8-azabicyclo[3.2.1]octane-3-ylidene) acetonitrile (480 mg, 0.96 mmol) in 35 mL methanol. Add palladium on carbon (202 mg, 0.19 mmol), and stir at room temperature for 16 h under hydrogen condition. Filter the reaction solution, wash the filter residue with an appropriate amount of methanol, concentrate and decompress to obtain the crude compound 2-(8-(2-((R)-1-hydroxyethyl-6-p-toluenesulfonyl imidazole[4,5-d]pyrrolo[2,3-b]pyridin-1(6H)-yl)-8-azabicyclo[3.2.1]octane-3-yl)acetonitrile (360 mg, yield 74%). LCMS ESI(+) m/z: 505.2 (M+1).

Step B

Dissolve the compound 2-(8-(2-((R)-1-hydroxyethyl-6-p-toluenesulfonyl imidazole(4,5-d]pyrrolo[2,3-b] pyridin-1 (6H)-yl)-8-azabicyclo[3.2.1]octane-3-yl)acetonitrile (360 mg, 0.71 mmol) in 9 mL methanol. Add 3 mL 1 N aqueous sodium hydroxide solution, stir at 35° C. and react for 8 h. After the reaction, adjust the pH to 8-9 with acetic acid, concentrate and decompress, and conduct silica column chromatography to obtain the compound 2-(8-(2-((R)-1-hydroxyethyl)imidazo[4,5-d]pyrrolo[2,3-b]pyridine-1(6H)-yl)-8-azabicyclo[3.2.1]octane-3-yl)acetonitrile (diastereoisomer, 32 mg, yield 12%). 1H NMR (400 MHz, DMSO-d6) δ 11.80 (s, 1H), 11.73 (s, 1H), 8.49 (s, 1H), 8.48 (s, 1H), 7.43 (t, J=2.4 Hz, 1H), 7.35 (t, J=2.5 Hz, 1H), 7.09 (d, J=2.1 Hz, 1H), 6.80 (d, J=2.7 Hz, 1H), 5.55-5.45 (m, 1H), 5.45-5.35 (m, 1H), 4.98-4.88 (m, 1H), 4.88-4.78 (m, 1H), 4.25 (t, J=6.4 Hz, 1H), 4.05-4.00 (m, 1H), 3.84 (t, J=6.4 Hz, 1H), 3.80-3.75 (m, 1H), 2.73 (d, J=7.0 Hz, 2H), 2.66 (d, J=5.8 Hz, 2H), 2.64-2.52 (m, 4H), 2.38-1.73 (m, 12H), 1.65 (s, 3H), 1.64 (s, 3H), 1.56-1.50 (m, 1H), 1.50-1.44 (m, 1H). LCMS ESI(+) m/z: 326.2 (M+1).

Example 24

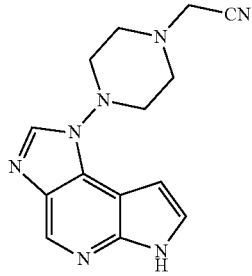 [SMILES: N#CCN1CCN(n2cnc3cnc4[nH]ccc4c32)CC1]

3-(4-(imidazo[4,5-d]pyrrolo[2,3-b]pyridin-1(6H)-yl)piperazin-1-yl)acetonitrile

The specific implementation methods are as follows:

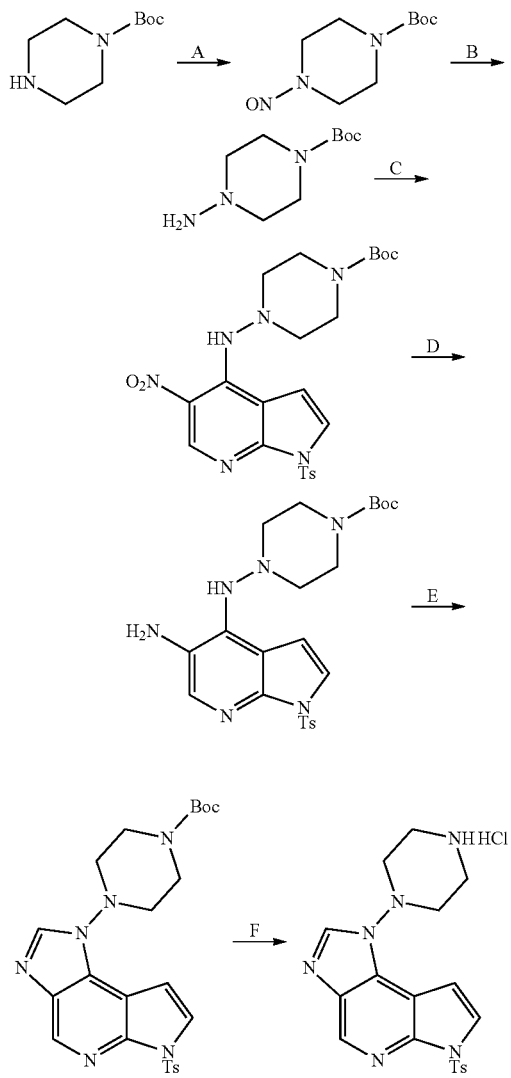

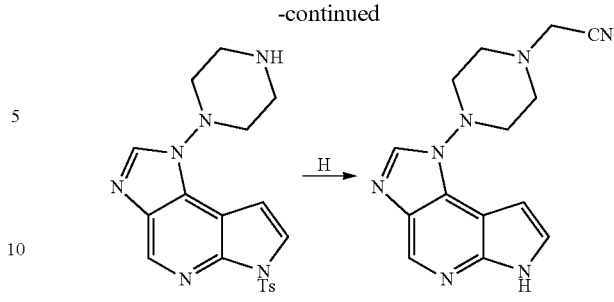

Step A

Dissolve 1-Boc-piperazine (1.86 g, 10.0 mmol) in 20 mL water and 9 mL acetic acid, and dissolve sodium nitrite (4.14 g, 60.0 mmol) in 20 mL water. Slowly drip aqueous solution of sodium nitrite to the reaction system at 0° C., then stir and react at room temperature for 16 h. After the reaction, apply 150 mL ethyl acetate for extraction three times. Afterwards, merge the organic the organic phase, dry with anhydrous sodium sulfate, filter, concentrated and decompress, and finally conduct silica column chromatography to obtain the compound 1-Boc-4-nitrosopiperazine (1.46 g, yield 68%). LCMS ESI(+) m/z: 159.1 (M+1).

Step B: 1-Boc-4-aminopiperazine

Dissolve 1-Boc-4-nitrosopiperazine (1.46 g, 6.8 mmol) in 10 mL methanol at room temperature, add zinc powder (2.20 g, 33.8 mmol), cool to 0° C., and slowly drip acetic acid (20 mL). Afterwards, then warm to room temperature and stir for 2 h under nitrogen protection. After the reaction, conduct filtration and adjust pH to 9-10 with saturated aqueous sodium bicarbonate solution. Then, add 40 mL water, extract three times with 180 mL dichloromethane, merge the organic phases. In addition, dry with anhydrous sodium sulfate, filter, spinning dry and purify to obtain compound 1-Boc-4-Aminopiperazine (1.18 g, yield 86%).

Step C

Add compound 4-chlorine-5-nitro-1-p-toluene sulfonyl-1H-pyrrolo [2,3-b] pyridine (1.18 g, 5.87 mmol), N,N-diisopropylethylamine (7.10 mg, 55 mmol) and 1-Boc-4-aminopiperazine (1.18 g, 5.87 mmol) to 60 mL isopropyl alcohol (suspension). Stir at 100° C. for 16 h under nitrogen protection. After the reaction, cool to room temperature and add ethyl ether, which will precipitate a large amount of yellow solid. Then, filter the solution, collect the solid and dry it to obtain the product 1-Boc-4-((5-nitro-1-p-toluene sulfonyl-1H-pyrrolo[2,3-b] pyridine-4-yl) amino) piperazine (2.16 g, 76% yield). LCMS ESI(+) m/z: 517.1 (M+1).

Step D

Dissolve the compound 1-Boc-4-((5-nitro-1-p-toluene sulfonyl-1H-pyrrolo[2,3-b] pyridine-4-yl) amino) piperazine (1.8 g, 3.49 mmol) in 45 mL ethyl alcohol. Successively add iron powder (1.17 g, 20.9 mmol), ammonium chloride (0.37 g, 6.98 mmol) and 15 mL water, and then raise the temperature to 75° C. and stir for 2 h. After the reaction, filter, spin dry and conduct Column chromatography purification to obtain the compound 1-Boc-4-((5-amino-1-p-toluene sulfonyl-1H-pyrrorolo [2,3-b] pyridine-4-yl) amino) piperazine (930 mg, yield 54%). LCMS ESI(+) M/z: 487.1 (m+1).

Step E

Dissolve 1-Boc-4-((5-amino-1-p-toluene sulfonyl-1H-pyrrorolo [2,3-b] pyridine-4-yl) amino) piperazine in 30 mL methylbenzene. Then, successively add triethyl orthoformate (2 mL) and pyridine hydrochloride (23 mg, 0.2 mmol). Later, raise the temperature to 115° C. under nitrogen protection and stir for 3 h. After the reaction, spin dry and purify by column chromatography to obtain the product 1-Boc-4-(6-p-toluene sulfonyl imidazo[4,5-d] pyrrolo [2,3-b] pyridine-1(6H)-yl) piperazine (760 mg, yield 80%). LCMS ESI(+) m/z: 497.1.

Step F

Dissolve compound 1-Boc-4-(6-p-toluene sulfonyl imidazo[4,5-d] pyrrolo [2,3-b] pyridine-1(6H)-yl) piperazine (200 mg, 0.4 mmol) in 5 mL 1,4-dioxane. Under the ice bath, add 1,4-dioxane solution (4 N, 2 mL) of hydrogen chloride, and stir the mixture at room temperature for 16 h under nitrogen protection. After the reaction, spin dry the reaction solution to obtain compound 4-(6-p-toluene sulfonyl imidazo[4,5-d] pyrrolo [2,3-b] pyridine-1(6H)-yl) piperazine hydrochloride (180 mg, 100% yield). LCMS ESI(+) m/z: 397.1 (M+1).

Step G

Dissolve compound 4-(6-p-toluene sulfonyl imidazo[4,5-d] pyrrolo [2,3-b] pyridine-1(6H)-yl) piperazine hydrochloride (200 mg, 0.51 mmol) in 10 mL methanol. Add aqueous sodium hydroxide solution (2 N, 3 mL) at 0° C. and stir at room temperature for 16 h under nitrogen protection. After the reaction, add 20 mL water, extract with dichloromethane (3*80 mL), merge the organic phases, dry it with anhydrous sodium sulfate, filter, spin dry and purify by column chromatography to obtain the compound 1-(piperazine-1-yl)-1,6-dihydroimidazo[4,5-d] pyrrolo[2,3-b]pyridine (120 mg, 97% yield). LCMS ESI(+) m/z: 243.1 (M+1).

Step H

Dissolve compound 1-(piperazine-1-yl)-1,6-dihydroimidazole[4,5-d]pyrrolo[2,3-b]pyridine (48 mg, 0.2 mmol), bromoacetonitrile (31 mg, 0.26 mmol) and triethylamine (61 mg, 0.6 mmol) in 5 mL N,N-dimethylformamide and stir them at room temperature for 16 h under nitrogen protection. After the reaction, 40 add 40 mL water, extract with ethyl acetate (3*40 mL), combine the organic phases, dry with anhydrous sodium sulfate, filter, spin-dry, and finally apply HPLC to prepare the compound 3-(4-(imidazo[4,5-d]pyrrolo[2,3-b]pyridine-1(6H)-yl)piperazine-1-yl)acetonitrile (8 mg, yield 16%). 1H NMR (400 MHz, DMSO-d6) δ 12.18 (s, 1H), 8.93 (s, 1H), 8.74 (s, 1H), 7.57 (t, J=3.2 Hz, 1H), 6.81 (dd, J=3.2 Hz, 2.0 Hz, 1H), 3.91 (s, 2H), 3.41-3.39 (m, 4H), 2.87-2.81 (m, 4H). LCMS ESI(+) m/z: 282.1 (M+1.

Example 25

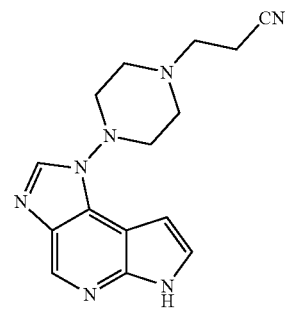

3-(4-(imidazo[4,5-d]pyrrolo[2,3-b]pyridin-1(6H)-yl)piperazin-1-yl)propanenitrile The specific implementation methods are as follows:

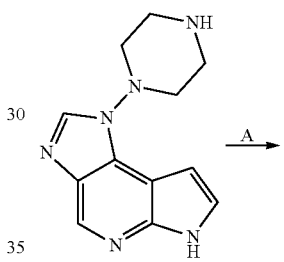

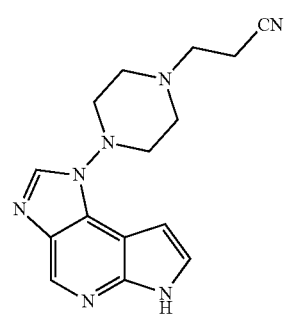 [SMILES: N#CCCN1CCN(n2cnc3cnc4[nH]ccc4c32)CC1]

Step A

Dissolve compound 1-(piperazine-1-yl)-1,6-dihydroimidazole[4,5-d]pyrrolo[2,3-b]pyridine (52 mg, 0.22 mmol), triethylamine (108 mg, 1.1 mmol) in 3 mL 3-allylonitrile. Stir at 100° C. for 1 h under nitrogen protection. After the reaction, filter, add 20 mL water, extract with ethyl acetate (5*40 mL), combine the organic phases, dry with anhydrous sodium sulfate, filter, spin dry, and prepare by HPLC to obtain the compound 3-(4-(imidazo[4,5-d]pyrrolo[2,3-b] pyridine-1(6H)-yl)piperazine-1-yl)propionitrile (32 mg, yield 48%). 1H NMR (400 MHz, DMSO-d6) δ 11.84 (s, 1H), 8.61 (s, 1H), 8.56 (s, 1H), 7.45 (s, 1H), 6.74 (d, J=2.4 Hz, 1H), 3.34 (s, 4H), 2.78-2.71 (m, 8H). LCMS ESI(+) m/z: 296.1 (M+1).

Example 26

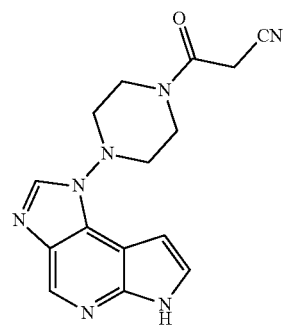 [SMILES: N#CCC(=O)N1CCN(n2cnc3cnc4[nH]ccc4c32)CC1]

3-(4-(imidazo[4,5-d]pyrrorolo[2,3-b]pyridin-1(6H)-yl)piperazin-1-yl)oxypropionitrile The specific implementation methods are as follows:

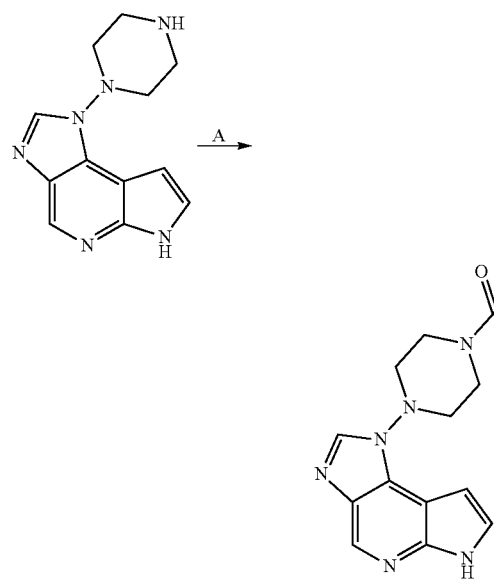

Step A

Dissolve compound 1-(piperazine-1-yl)-1,6-dihydroimidazole[4,5-d]pyrrolo[2,3-b]pyridine (70 mg, 0.29 mmol), HATU (165 mg, 0.43 mmol), 2-cyanoacetic acid (30 mg, 0.35 mmol) and N,N-diisopropylethylamine (112 mg, 0.87 mmol) in 5 mL N,N-dimethylformamide. Then, stir for 16 h at room temperature under the nitrogen protection. After the reaction, add 20 mL water, extract with ethyl acetate (3*60 mL), merge the organic phases, dry with anhydrous sodium sulfate, filter, spin dry and purify to obtain compound 3-(4-(imidazo[4,5-d]pyrrolo[2,3-b]pyridine-1(6H)-yl)piperazine-1-yl)oxopropionitrile (30 mg, 33% yield). 1H NMR (400 MHz, DMSO-d6) δ 11.85 (s, 1H), 8.57 (s, 1H), 8.56 (s, 1H), 7.45 (t, J=2.8 Hz, 1H), 6.78 (dd, J=3.2, 2.0 Hz, 1H), 4.19 (s, 2H), 3.85-3.70 (m, 4H), 3.33-3.30 (m, 4H). LCMS ESI(+) m/z: 310.1 (M+1).

Example 27

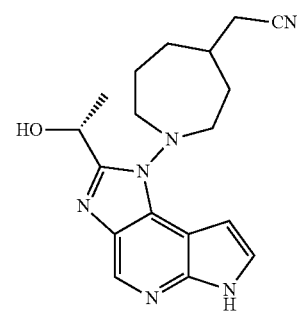 [SMILES: C[C@@H](O)c1nc2cnc3[nH]ccc3c2n1N1CCCC(CC#N)CC1]

2-(1-(2-((R)-1-hydroxyethyl)imidazo[4,5-d]pyrrolo[2,3-b]pyridin-1(6H)-yl)-6-azepan-4-yl)acetonitrile The specific implementation methods are as follow:

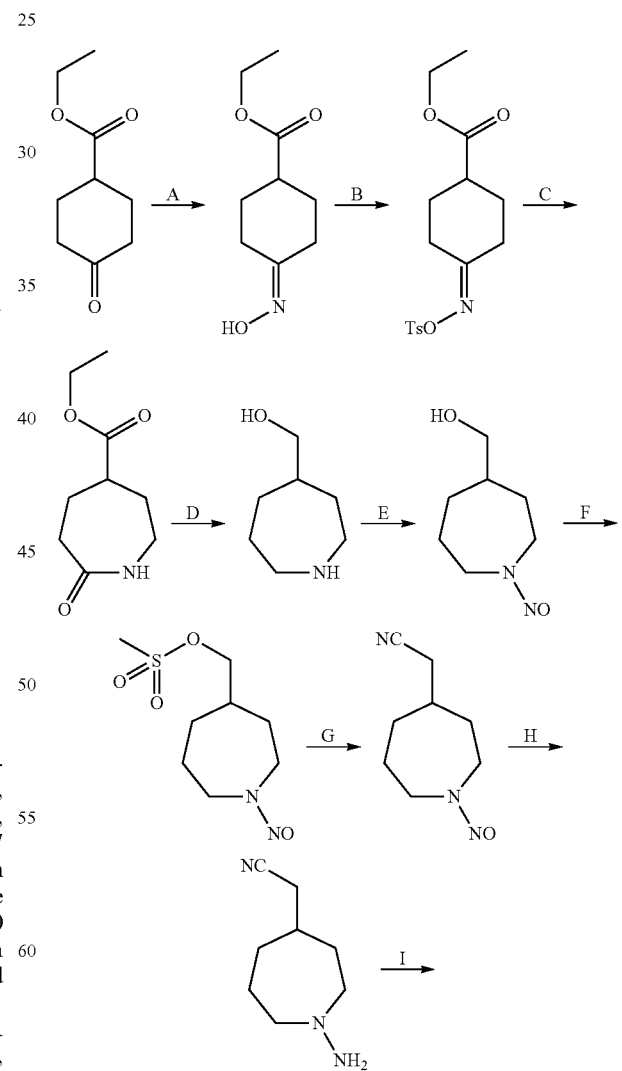

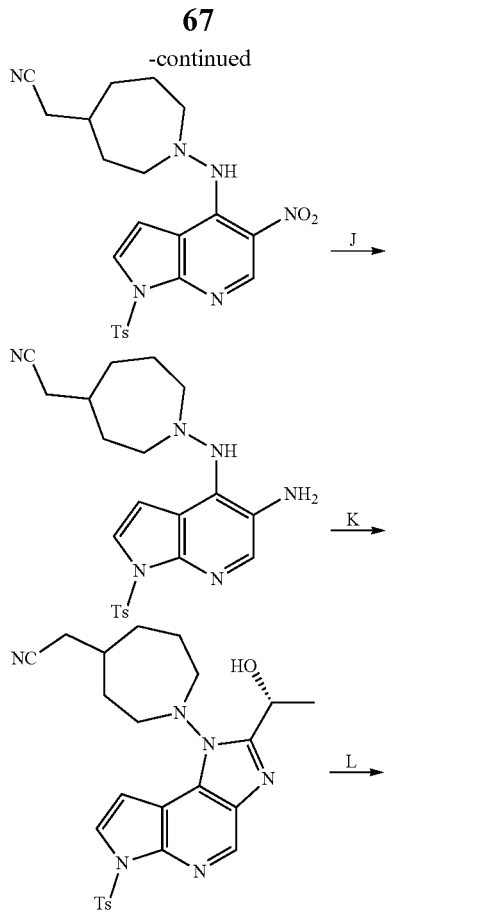

Step A

Dissolve hydroxylamine hydrochloride (6.12 g, 88.1 mmol) in 25 mL water, add sodium acetate (9.64 g, 118 mmol) and then stir at room temperature for 10 min. Drip compound p-cyclohexanone ethylcarboxylate (10.0 g, 58.8 mmol) to the reaction and stir the mixture at 45° C. for 16 h. Afterwards, extract the solution 3 times with 50 mL ethyl acetate, merge the organic phases, washed with 20 mL water and 20 mL saturated brine. Then, dry with anhydrous sodium sulfate, concentrate and decompress it, and finally apply silica column chromatography to obtain the compound 4-ethyl formate cyclohexanone oxime (10.9 g, yield 100%). $^1$H NMR (400 MHz, CDCl3) δ 8.02 (brs, 1H), 4.19-4.09 (m, 2H), 3.20-3.10 (m, 1H), 2.60-2.51 (m, 1H), 2.49-2.40 (m, 1H), 2.21-2.00 (m, 4H), 1.82-1.66 (m, 2H), 1.26 (t, J=7.1 Hz, 3H).

Step B

Dissolve the compound ethyl 4-oxocyclohexanecarboxylate (3.32 g, 12.9 mmol) in pyridine (15 mL) and add p-toluene sulfonyl chloride (4.10 g, 21.5 mmol) under the nitrogen protection at −15° C. Then, stir at −15° C. at nitrogen protection for 2 h. Pour into 60 mL ice water, stir for 20 min, conduct suction filtration and wash with 30 mL water. Afterwards, collect the filter mass and conduct depression dry to obtain compound 4-((p-toluene sulfonyloxy)imino)cyclohexane-1-ethyl formate (4.87 g, yield 80%). $^1$H NMR (400 MHz, CDCl3) δ 7.85 (d, J=8.3 Hz, 2H), 7.34 (d, J=8.0 Hz, 2H), 4.13 (q, J=7.1 Hz, 2H), 3.07-2.97 (m, 1H), 2.58-2.46 (m, 2H), 2.45 (s, 4H), 2.28-2.12 (m, 2H), 2.11-1.96 (m, 2H), 1.85-1.64 (m, 2H), 1.25 (t, J=7.1 Hz, 3H).

Step C

Dissolve compound 4-((p-toluene sulfonyloxy)imino)cyclohexane-1-ethyl formate (16.6 g, 45.9 mmol) in 35 mL acetic acid and stir at room temperature for 16 h. After that, concentrate and decompress the reaction solution. Then, add 40 mL saturated aqueous sodium bicarbonate solution, stir for 15 min with 150 mL ethyl acetate extracting the aqueous phase 3 times. Afterwards, merge organic phase, wash it with 50 mL saturated salt water, dry with anhydrous sodium sulfate, conduct decompression and concentration, and finally apply silica column chromatography to obtain 7-oxynitrogen heterocyclic heptane-4-ethyl formate (5.33 g, yield 63%). $^1$H NMR (400 MHz, CDCl3) δ 6.30 (s, 1H), 4.15 (q, J=7.1 Hz, 2H), 3.41-3.29 (m, 1H), 3.29-3.17 (m, 1H), 2.68-2.52 (m, 2H), 2.52-2.39 (m, 1H), 2.15-2.00 (m, 2H), 1.92-1.76 (m, 2H), 1.37-1.18 (m, 3H).

Step D

Dissolve the compound 7-oxoazepane-4-ethylcarboxylate (3.72 g, 20.1 mmol) in 50 mL tetrahydrofuran, and drip lithium aluminum hydride (3.81 g, 100 mmol) to the tetrahydrofuran solution (300 mL) under nitrogen protection in an ice bath. Stir at room temperature for 2 h and stir for 4 h at 60° C. Then, heat to 0° C. and successively drip water (4 mL), 15% Sodium hydroxide solution (4 mL), water (8 mL). Stir at room temperature for 3 h. Filter through diatomite and wash with 50 mL tetrahydrofuran. Then, decompress and concentrate the solution to obtain the compound 4-hydroxymethyl nitrogen heterocyclic heptane (2.31 g, yield 89%). $^1$H NMR (400 MHz, CDCl$_3$) δ 3.56-3.45 (m, 2H), 3.08-2.72 (m, 4H), 1.94-1.73 (m, 4H), 1.66-1.52 (m, 1H), 1.50-1.35 (m, 2H).

Step E

Dissolve compound 4-hydroxymethyl nitrogen heterocyclic heptane (2.31 g, 17.9 g) in 100 mL dichloromethane and successively add sodium nitrite (3.70 g, 53.6 mmol) at room temperature. Monohydrate p-toluene sulfonic acid (10.2 g, 53.6 mmol). Stir at 35° C. for 2 h, decompress and concentrate the reaction solution and apply silica column chromatography to obtain the compound 1-nitroso-4-hydroxymethyl nitrogen heterocyclic heptane (2.19 g, yield 77%). $^1$H NMR (400 MHz, CDCl$_3$) δ 4.83-4.63 (m, 1H), 4.12-3.96 (m, 1H), 3.92-3.70 (m, 1H), 3.68-3.43 (m, 3H), 2.30-2.14 (m, 1H), 2.09-1.79 (m, 3H), 1.78-1.40 (m, 3H), 1.27-1.00 (m, 1H).

Step F

Dissolve compound 1-nitroso-4-hydroxymethyl nitrogen heterocyclic heptane (1.10 g, 6.95 mmol) in 20 mL dichloromethane, and drip triethylamine (1.19 g, 10.4 mmol) and methylsulfonyl chloride (1.19 g, 10.4 mmol) under nitrogen protection in an ice bath. Stir in ice bath for 2 h. Add water (10 mL) and stir at room temperature for 15 min. Afterwards, add ethyl acetate (100 mL), separate the organic phases, wash twice with water (30 mL) and then with saturated salt solution (30 mL). Then, dry with anhydrous sodium sulfate, conduct suction filtration, decompress and concentrate to obtain the compound (1-nitro-nitrogen heterocyclic heptane-4-yl) methyl methanesulfonate (1.64 g, yield 100%).

Step G

Dissolve compound 1-nitroso-nitrogen heterocyclic heptane-4-yl) methyl methanesulfonate (1.64 g, 6.94 mmol) in 10 mL anhydrous N,N-dimethylformamide, and add sodium cyanide under nitrogen condition (1.02 g, 20.8 mmol). Stir at 80° C. for 5 h. Then, decompress and concentrate. Afterwards, pour the reaction solution into 20 mL water and extract 3 times with 40 mL ethyl acetate. Merge the organic phases and wash with water (20 mL) and saturated salt solution (20 mL). Then, dry with anhydrous sodium sulfate, conduct suction filtration, decompress and concentrate. Finally, apply silica column chromatography to obtain the compound 1-nitroso-4-cyanomethyl nitrogen heterocyclic heptane (1.09 g, yield 94%).

Step H

Dissolve compound 1-nitroso-4-cyanomethyl nitrogen heterocyclic heptane (600 mg, 3.59 mmol) in 20 mL methanol. Successively add zinc powder (4.69 g, 71.8 mmol) at room temperature and add acetic acid dropwise (5 mL). Stir at 35° C. for 15 min. Extract the reaction solution, wash with 20 mL methanol, and concentrate the filtrate, through which the oily substance 1-amino-4-cyanomethyl azacyclic heptane is directly used for the next step of reaction.

Step I

Dissolve the crude compound 1-amino-4-cyanomethyl azacyclic heptane from the previous step in 25 mL isopropanol, followed by the addition of N,N-diisopropylethylamine (2.20 mL, 17.1 mmol) and 4-chlorine-5-nitro-1-toluene sulfonyl-1H-pyrrolo[2,3-b]pyridine (1.00 g, 2.84 mmol). Heat to 85° C. under nitrogen protection, Stir and react for 16 h. Then, concentrate the reaction solution and apply silica column chromatography to obtain compound 2-(1-((5-nitro-1-toluene sulfonyl-1H-pyrrolo[2,3-b]pyridine-4-yl)amino)azacycloheptane-4-yl)acetonitrile (450 mg, yield 34%).

Step J

Add compound 2-(1-((5-nitro-1-toluene sulfonyl-1H-pyrrolo[2,3-b]pyridine-4-yl)amino)azepan-4-yl)azacycloheptane (527 mg, 1.12 mmol) to 25 mL ethanol, successively add iron powder (1.26 g, 22.5 mmol) and saturated ammonium chloride (1.5 mL) at room temperature, and stir at 75° C. and react for 5 min. Filtrate with diatomite while it is hot and wash with 20 mL methanol, concentrate the filtrate. Finally apply silica column chromatography (ethyl acetate) to obtain compound 2-(1-((5-amino-1-toluene sulfonyl-1H-pyrrolo[2,3-b]pyridine-4-yl)amino)azacycloheptane-4-yl) acetonitrile (200 mg, yield 41%).

Step K

Add R-lactamide (107 mg, 1.23 mmol) and triethyloxonium tetrafluoroboric acid (234 mg, 1.24 mmol) to 8 mL dry tetrahydrofuran under nitrogen condition and stir at 30° C. for 2 h. Then, decompress and concentrate the reaction solution. Dissolve the residue in 3 mL dry ethanol and add compound 2-(1-((5-amino-1-toluene sulfonyl-1H-pyrrorolo[2,3-b]pyridine-4-yl)amino)azacycloheptane-4-yl)acetonitrile (180 mg, 0.41 mmol). Afterwards, stir at 75° C. and react for 1 h. decompress and concentrate the reaction solution. Add saturated sodium bicarbonate solution (10 mL) and ethyl acetate (15 mL) and stir for 5 min. Separate the organic phases and extract the aqueous phase with 15 mL ethyl acetate for three times. Then, merge the organic phases and wash with 10 mL water and 10 mL saturated salt water, dry with anhydrous sodium sulfate, decompress and concentrate and finally apply silica column chromatography to obtain the compound 2-(10(2-((R)-1-hydroxyethyl)-6-p-toluene sulfonyl imidazolide[4,5-d]pyrrorolo[2,3-b]pyridine-1(6H)-yl)azacycloheptane-4-yl)acetonitrile (980 mg, yield 49%).

Step L

Dissolve the compound 2-(1-(2-((R)-1-hydroxyethyl)-6-p-toluene sulfonyl imidazo[4,5-d]pyrrolo[2,3-b]pyridine-1 (6H)-yl)azacycloheptane-4-yl)acetonitrile (98 mg, 0.2 mmol) in 3 mL methanol and add 1 N sodium hydroxide solution (1 mL, 1.0 mmol). Stir at 35° C. for 7 h. Afterwards, dilute the reaction solution with 40 mL dichloromethane, dry with anhydrous sodium sulfate, conduct suction filtration, decompress and evaporate to remove the solvent. After that, prepare the residue by TLC to obtain the compound 2-(1-(2-((R)-1-hydroxyethyl)imidazo[4,5-d]pyrrolo[2,3-b]pyridine-1(6H)-yl)-6-azacycloheptane-4-yl)acetonitrile (40 mg, yield 59%). $^1$H NMR (400 MHz, DMSO-$d_6$) δ 11.87 (s, 1H), 8.59-8.47 (m, 1H), 7.52-7.44 (m, 1H), 6.76-6.64 (m, 1H), 5.36-5.25 (m, 1H), 5.25-5.14 (m, 1H), 3.90-3.62 (m, 2H), 3.28-3.01 (m, 2H), 2.69-2.59 (m, 2H), 2.12-1.63 (m, 7H), 1.58 (d, J=6.5 Hz, 3H). LCMS ESI(+) m/z: 339.1 (M+1).

Example 28

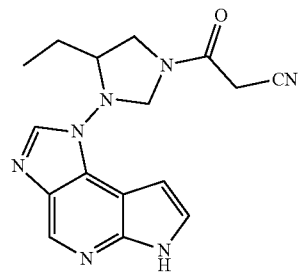 [SMILES: CCC1CN(C(=O)CC#N)CN1n1cnc2cnc3[nH]ccc3c21]

3-(4-ethyl-3-(imidazo[4,5-d]pyrrolo[2,3-b]pyridine (6H)-yl)imidazoline-1-yl)-3-oxopropionitrile The specific implementation methods are as follows:

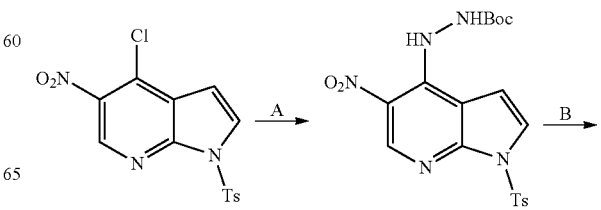

71

-continued

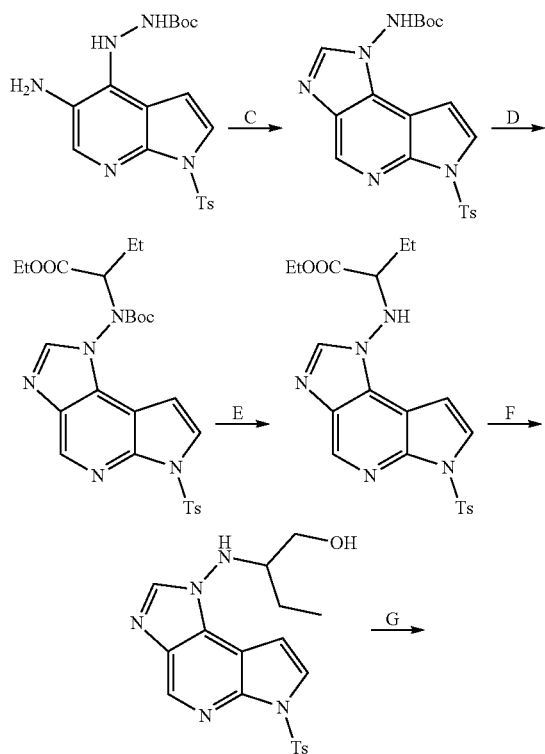

72

-continued

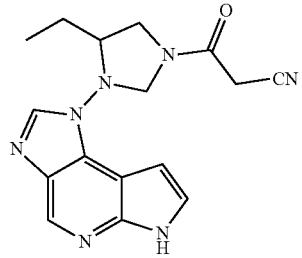

Step A

Add compound 4-chlorine-5-nitro-1-p-toluene sulfonyl-1H-pyrrolo[2,3-b]pyridine (4.80 g, 13.7 mmol), tert-Butyl-carbazate (1.98 g, 15.0 mmol), N,N-diisopropylethylamine (3.81 mL, 27.3 mmol) to 100 mL isopropyl alcohol. Stir at 85° C. under nitrogen protection for 16 h. After the reaction, decompress and evaporate the solvent. Then, the residues are subjected to silica column chromatography to obtain the compound 2-(5-nitro-1-p-toluene sulfonyl-1H-pyrrolo[2,3-b]-4-yl)tert-butyl carbazate (4.56 g, yield 75%). $^1$H NMR (400 MHz, CDCl$_3$) δ 9.73 (s, 1H), 9.11 (s, 1H), 8.06 (d, J=8.4 Hz, 2H), 7.61 (d, J=4.1 Hz, 1H), 7.31 (d, J=8.1 Hz, 2H), 6.96 (d, J=4.1 Hz, 1H), 6.68 (s, 1H), 2.40 (s, 3H), 1.46 (s, 9H). LCMS ESI(+) m/z: 448.1 (M+1).

Step B

Dissolve compound 2-(5-nitro-1-p-toluene sulfonyl-1H-pyrrolo[2,3-b]-4-yl)tert-butyl carbazate (4.56 g, 10.2 mmol) in 250 mL methanol, and add 10% palladium on carbon (2.78 g) under nitrogen condition. Stir the mixture at room temperature under a hydrogen atmosphere for 16 h. Then, filter the reaction solution and wash twice with methanol (20 mL). Decompress and evaporate the filtrate to remove the solvent, through which the compound 2-(5-amino-1-p-toluene sulfonyl-1H-pyrrorolo[2,3-b]-4-yl)tert-butyl carbazate (4.25 g, 100% yield) can be obtained. $^1$H NMR (400 MHz, CDCl$_3$) δ 7.99 (d, J=8.3 Hz, 2H), 7.87 (s, 1H), 7.49 (d, J=4.1 Hz, 1H), 7.23 (d, J=8.2 Hz, 3H), 6.69 (d, J=4.1 Hz, 1H), 6.56 (s, 2H), 2.36 (s, 4H), 1.43 (s, 9H). LCMS ESI(+) m/z: 418.1 (M+1).

Step C

Add compound 2-(5-amino-1-p-toluene sulfonyl-1H-pyrrorolo[2,3-b]-4-yl)tert-butyl carbazate (4.25 g, 10.2 mmol), triethyl orthoformate (1.81 g, 12.2 mmol) and pyridine hydrochloride (116 mg, 1.0 mmol) to 150 mL methylbenzene. Heat to 115° C. under nitrogen condition and stir for 2 h. After the reaction, decompress and evaporate the reaction solution to remove the solvent. Then, the residues are subjected to silica column chromatography to obtain the compound tert-butyl(6-toluene sulfonyl imidazo[4,5-d] pyrrolo[2,3-b]pyridine-1 (6H)-yl)carbamate (4.35 g, 100% yield). $^1$H NMR (400 MHz, CDCl3) δ 8.77 (s, 1H), 8.05 (d, J=8.3 Hz, 2H), 7.91 (brs, 1H), 7.91 (s, 1H), 7.58 (d, J=2.8 Hz, 1H), 7.25 (d, J=8.4 Hz, 1H), 6.58 (d, J=2.8 Hz, 1H), 2.35 (s, 3H), 1.49 (s, 9H). LCMS ESI(+) m/z: 428.1 (M+1).

Step D

Dissolve the compound tert-butyl(6-p-toluene sulfonyl imidazo[4,5-d]pyrrolo[2,3-b]pyridine-1(6H)-yl)carbamate (3.69 g, 8.63 mmol) in 400 mL acetone, add sodium hydroxide (726 mg, 13.0 mmol) powder, and stir at room temperature for 10 min. Add ethyl 2-bromobutyrate (5.05 g, 25.9 mmol) to the reaction solution, followed by stirring at room temperature for 1.5 h. Afterwards, conduct suction filtration of the reaction solution and wash the filter mass with dichloromethane (50 mL). Decompress and concentrate the filtrate and the residues are subjected to silica column chromatography to obtain the compound ethyl 2-(tert-butoxycarbonyl)(6-p-toluene sulfonyl imidazo[4,5-d]pyrrolo[2,3-b]pyridine-1(6H)-yl)amino) butyrate methyl ester (4.08 g, yield 87%). $^1$H NMR (400 MHz, CDCl$_3$) δ 8.89 (s, 1H), 8.38 (s, 1H), 8.14 (d, J=8.4 Hz, 2H), 7.78 (d, J=4.0 Hz, 1H), 7.29 (d, J=8.3 Hz, 2H), 6.69 (d, J=3.9 Hz, 1H), 4.98-4.79 (m, 1H), 4.33 (q, J=7.1 Hz, 2H), 2.38 (s, 3H), 1.59-1.48 (m, 2H), 1.36 (t, J=9.2, 5.1 Hz, 3H), 1.33-1.12 (m, 9H), 0.81 (t, J=7.4 Hz, 3H). LCMS ESI(+) m/z: 542.2 (M+1).

Step E

Dissolve the compound ethyl 2-(tert-butoxycarbonyl)(6-p-toluene sulfonyl imidazolo[4,5-d] pyrrolo[2,3-b] pyridine-1(6H)-yl)amino)methyl butyrate (4.08 g, 7.53 mmol) in 33 mL mixed solvent of dichloromethane and methanol (with the volume ratio of 10 to 1). Then, add 4 N dioxane solution of hydrogen chloride (15 mL) under the ice bath. Stir at room temperature under nitrogen protection for 16 h. Concentrate and decompress the reaction solution. Add 80 mL saturated sodium bicarbonate solution and stir for 5 min. Afterwards, extract with ethyl acetate (3*50 mL), merge the organic phases, wash with 50 mL saturated salt water, and dry with anhydrous sodium sulfate. Finally, conduct suction filtration, decompress and concentrate the filtrate to obtain the compound ethyl 2-((6-toluene sulfonyl imidazolo[4,5-d]pyrrolo[2,3-b]pyridine-1(6H)-yl)amino)methyl butyrate (3.10 g, yield 93%). $^1$H NMR (400 MHz, CDCl$_3$) δ 8.85 (s, 1H), 8.10 (d, J=8.4 Hz, 2H), 8.03 (s, 1H), 7.77 (d, J=3.9 Hz, 1H), 7.27 (s, 1H), 7.25 (s, 1H), 6.91 (d, J=4.0 Hz, 1H), 5.74 (d, J=7.8 Hz, 1H), 4.33-4.16 (m, 2H), 3.85-3.76 (m, 1H), 2.35 (s, 3H), 1.92-1.82 (m, 2H), 1.26 (t, J=7.2 Hz, 3H), 1.14 (t, J=7.4 Hz, 3H). LCMS ESI(+) m/z: 442.1 (M+1).

Step F

Dissolve the compound ethyl 2-((6-toluene sulfonyl imidazo[4,5-d]pyrrorolo[2,3-b]pyridine-1(6H)-yl) amino) methyl butyrate (3.10 g, 7.02 mmol) in 200 mL ethanol. Besides, add sodium borohydride (797 mg, 21.1 mmol) under ice bath and nitrogen protection and stirred at room temperature for 48 h. Drip 1 N dilute hydrochloric acid solution to the reaction solution at 0° C. and adjust the reaction solution to neutral property. Add 50 mL water and stir at room temperature. Adjust 1 N hydrochloric acid to neutral, decompress and evaporate the solvent. Then, extract with ethyl acetate (3*50 mL), merge the organic phase and wash with 30 mL saturated salt water, dry with anhydrous sodium sulfate, decompress and evaporate the solvent. Finally, apply silica column chromatography to obtain the compound 2-((6-toluene sulfonyl imidazo[4,5-d]pyrrolo[2,3-b]pyridine-1(6H)-yl) amino) butyl-1-ol (1.97 g, yield 69%). $^1$H NMR (400 MHz, DMSO-d6) δ 8.69 (s, 1H), 8.30 (s, 1H), 8.02 (d, J=8.4 Hz, 2H), 7.92 (d, J=4.0 Hz, 1H), 7.40 (d, J=8.1 Hz, 2H), 7.16 (d, J=4.0 Hz, 1H), 6.95 (d, J=2.7 Hz, 1H), 4.89 (t, J=5.0 Hz, 1H), 3.54-3.44 (m, 1H), 3.37-3-.34 (m, 1H), 3.23-3.15 (m, 1H), 2.33 (s, 3H), 1.42-1.32 (m, 2H), 0.83 (t, J=7.5 Hz, 3H). LCMS ESI(+) m/z: 400.1 (M+1).

Step G

Under the ice bath cooling and the nitrogen protection, add compound 2-((6-p-toluene sulfonyl imidazo[4,5-d]pyrrolo[2,3-b]pyridine-1(6H)-(yl)amino)butyl-1-ol (1.72 g, 4.31 mmol), DBU (3.28 g, 21.5 mmol) and DPPA (3.55 g, 12.9 mmol) in 120 mL methylbenzene. Heat to 75° C. and stir for 16 h. Then, decompress and concentrate the reaction solution. Finally, make the residues subject to silica column chromatography to obtain the compound N-(1-azidine2-yl)-6-P-toluene sulfonyl imidazo[4,5-d]pyrrolo[2,3-b]pyridine-1(6H)-yl)-amine (1.10 g, yield 60%). $^1$H NMR (400 MHz, CDCl$_3$) δ 8.88 (s, 1H), 8.12 (d, J=8.4 Hz, 2H), 7.96 (s, 1H), 7.81 (d, J=4.0 Hz, 1H), 7.27 (d, J=8.4 Hz, 2H), 7.01 (d, J=4.0 Hz, 1H), 5.41 (s, 1H), 3.68 (dd, J=12.0, 2.8 Hz, 1H), 3.47-3.34 (m, 2H), 1.52-1.41 (m, 2H), 0.91 (t, J=7.5 Hz, 3H). LCMS ESI(+) m/z: 425.1 (M+1).

Step H

Dissolve compound N-(1-azidine-2-yl)-6-p-toluene sulfonyl imidazo[4,5-d]pyrrolo[2,3-b]pyridine-1(6H)-yl)-amine (1.10 g, 2.59 mmol) in 200 mL methanol. Add 10% palladium on carbon (220 mg) under nitrogen protection. Replace the hydrogen and stir at room temperature in a hydrogen atmosphere for 6 h. Then, conduct suction filtration and wash the filter mass with 20 mL methanol. Afterwards, decompress and concentrate the filtrate to obtain the compound N$^2$-(6-toluene sulfonyl imidazo[4,5-d] pyrrorolo[2,3-b]pyridine-1(6H)-yl)butane-1,2-diamine (1.03 g, yield 100%). $^1$H NMR (400 MHz, CDCl$_3$) δ 8.88 (s, 1H), 8.12 (d, J=8.4 Hz, 2H), 7.97 (s, 1H), 7.76 (d, J=3.9 Hz, 1H), 7.27 (d, J=8.0 Hz, 2H), 7.12 (d, J=4.0 Hz, 1H), 5.99 (d, J=2.0 Hz, 1H), 3.15 (s, 1H), 3.09 (dd, J=13.1, 3.3 Hz, 1H), 2.64 (dd, J=13.1, 8.8 Hz, 1H), 2.36 (s, 3H), 1.44-1.27 (m, 3H), 0.83 (t, J=7.5 Hz, 3H). LCMS ESI(+) m/z: 399.1 (M+1).

Step I

Dissolve the compound N$^2$-(6-toluene sulfonyl imidazo[4,5-d]pyrrorolo[2,3-b]pyridine-1(6H)-yl)butane-1,2-diamine (1.03 g, 2.58 mmol) in 50 mL methanol and add paraformaldehyde (101 mg, 3.36 mmol). Heat to 70° C. and stir for 16 h. Cool to room temperature, conduct suction filtration and wash with 10 mL methanol. Then, decompress and evaporate the filtrate to remove the solvent to obtain the compound ethyl imidazole 1-(5-alkyl-1 yl)-6-p-toluene sulfonyl-1,6-dihydro imidazole[4,5-d]pyrrolo[2,3-b]pyridine (1.06 g, yield 100%). $^1$H NMR (400 MHz, CDCl$_3$) δ 8.94-8.77 (m, 1H), 8.13-8.07 (m, 2H), 7.79-7.67 (m, 1H), 7.28-7.24 (m, 1H), 7.08 (m, 1H), 4.53-3.97 (m, 2H), 3.80-3.37 (m, 3H), 2.42-2.30 (m, 3H), 1.83-1.59 (m, 2H), 0.96-0.74 (m, 3H). LCMS ESI(+) m/z: 411.1 (M+1).

Step J

Dissolve the compound 1-(5-ethyl imidazolane-1-yl)-6-p-toluene sulfonyl-1,6-dihydroimidazo[4,5-d]pyrrolo[2,3-b] pyridine (60 mg, 0.15 mmol) in 3 mL methanol and add 2 N sodium hydroxide solution (1.0 mL, 2.0 mmol). Stir at room temperature for 16 h. Dilute the reaction solution with 10 mL water and remove methanol by decompression and evaporation. Then, extract it with ethyl acetate, merge organic phases, wash with 5 mL saturated salt water, dry with anhydrous sodium sulfate, conduct suction filtration, decompress and evaporate to remove the solvent. Finally the crude compound 1-(5-ethyl imidazolane-1-yl)-1,6-dihydroimidazolidazole[4,5-d]pyrrolo[2,3-b]pyridine (50 mg, crude yield 100%) is obtained. LCMS ESI(+) m/z: 257.1 (M+1).

Step K

Dissolve compound 1-(5-ethyl imidazolane-1-yl)-1,6-dihydroimidazolidazole[4,5-d]pyrrolo[2,3-b]pyridine (50 mg, 0.2 mmol) in 4 mL dichloromethane. Then, under nitrogen protection and ice bath, successively add cyanoacetic acid (20 mg, 0.24 mmol), HOBT (37 mg, 0.27 mmol), 4-dimethylaminopyridine (38 mg, 0.31 mmol), 4-dimethylaminopyridine (38 mg, 0.31 mmol) and EDCI (60 mg, 0.31 mmol). Stir at room temperature for 16 h. Afterwards, decompress and concentrate the mixture. Finally, apply silica column chromatography and HPLC to prepare the compound 3-(4-ethyl-3-(imidazo[4,5-d]pyrrolo[2,3-b]pyridine-1(6H)-yl) imidazoline-1-yl)-3-oxypropyonitrile (20 mg, yield 32%). $^1$H NMR (400 MHz, DMSO-d$_6$) δ 11.90 (s, 1H), 8.75-8.17 (m, 2H), 7.47 (s, 1H), 6.70 (s, 1H), 5.03-4.68 (m, 2H), 4.24-3.85 (m, 4H), 3.54-3.42 (m, 1H), 1.51-1.28 (m, 2H), 0.82-0.69 (m, 3H). LCMS ESI(+) m/z: 324.1 (M+1).

Example 29

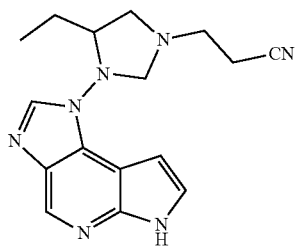 [SMILES: CCC1CN(CCC#N)CN1n1cnc2cnc3[nH]ccc3c21]

3-(4-ethyl-3-(imidazo[4,5-d]pyrrolo[2,3-b]pyridine-1 (6H)-yl)imidazolidine-1-yl)propionitrile

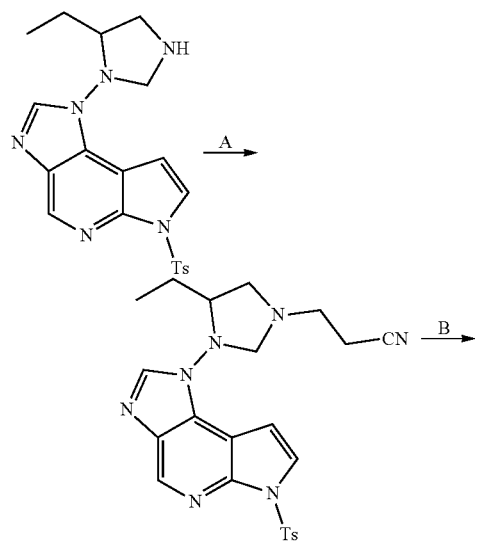

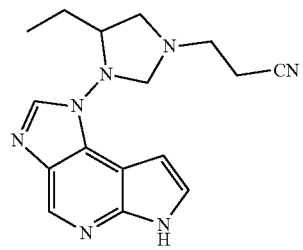

Step A

Dissolve compound 1-(5-ethyl imidazolane-1-yl)-6-p-toluene sulfonyl-1,6-dihydroimidazolidazole[4,5-d] pyrrolo[2,3-b]pyridine (70 mg, 0.17 mmol) and triethylamine (86 mg, 0.85 mmol) in 3 mL acrylonitrile. Stir at 120° C. for 16 h. Then, decompress and evaporate to remove the solvent. Finally, apply silica column chromatography to obtain the compound 3-(4-ethyl-3-(6-toluene sulfonyl imidazolo[4,5-d]pyrrolo[2,3-b] pyridine-1 (6H)-yl)imidazolidine-1-yl) propionitrile (50 mg, yield 63%). LCMS ESI(+) m/z: 464.1 (M+).

Step O

Dissolve the compound 3-(4-ethyl-3-(6-toluene sulfonyl imidazo[4,5-d]pyrrolo[2,3-b]pyridine-1 (6H)-yl) propionitrile (50 mg, 0.11 mmol) in 5 mL anhydrous tetrahydrofuran. Under an ice bath, add 60% sodium hydroxide (22 mg, 0.11 mmol). Stir at room temperature for 4 h. pour the reaction solution into 15 mL saturated aqueous ammonium chloride solution. Afterwards, neutralize the reaction solution, decompress and concentrate it to remove the solvent. Finally, apply silica column chromatography to obtain the compound 3-(4-ethyl-3-(imidazo[4,5-d]pyrrolo[2,3-b] pyridine-1(6H)-yl)imidazolidine-1-yl)propionitrile (150 mg, yield 48%). $^1$H NMR (400 MHz, DMSO-d$_6$) δ 11.03 (s, 1H), 8.06-7.99 (m, 2H), 7.85-7.81 (m, 2H), 7.75-7.64 (m, 2H), 7.49 (d, J=8.4 Hz, 2H), 7.29 (dd, J=6.1, 2.5 Hz, 1H), 6.16-6.10 (m, 2H), 5.18 (s, 2H), 2.01 (s, 1H), 0.86-0.76 (m, 4H). LCMS ESI(+) m/z: 310.1 (M+1).

Example 30

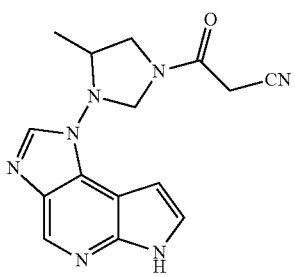 [SMILES: CC1CN(C(=O)CC#N)CN1n1cnc2cnc3[nH]ccc3c21]

3-(4-methyl-3-(imidazo[4,5-d]pyrrolo[2,3-b]pyridine-1(6H)-yl)imidazoline-1-yl)-3-Oxopropionitrile The specific implementation methods are as follows:

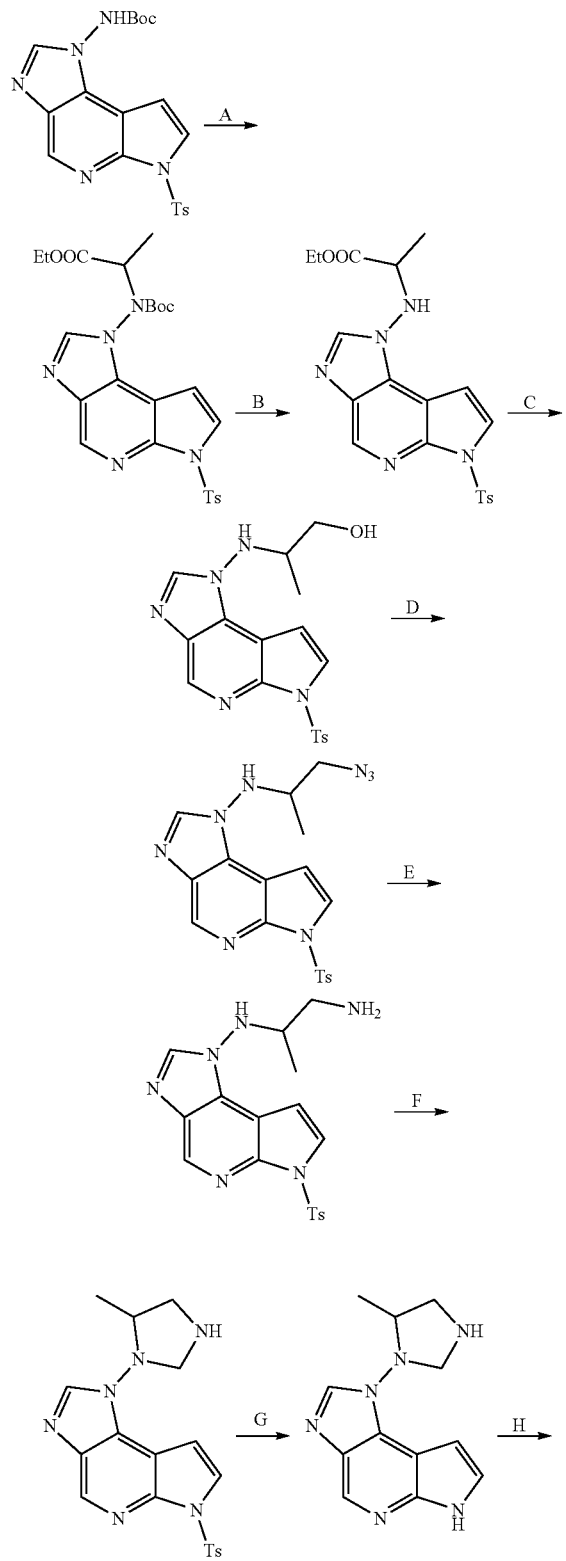

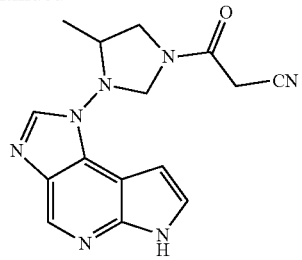

Step A

Dissolve the compound tert-butyl (6-toluene sulfonyl imidazo[4,5-d]pyrrorolo[2,3-b]pyridine-1(6H)-yl) carbamate (3.60 g, 8.42 mmol) in 400 mL acetone and then add sodium hydroxide (709 mg, 12.6 mmol) powder was added. Stir at room temperature for 10 min. Afterwards, add ethyl 2-bromopropionate (4.57 g, 25.3 mmol) to the reaction solution and stir the mixture at room temperature for 1.5 h. Then, conduct suction filtration of the reaction solution and wash the filter mass with dichloromethane (50 mL). After that, decompress and concentrate the filtrate. Finally, make the residues subject to silica column chromatography to obtain the compound 2-(tert-butylcarbonyl)(6-p-toluene sulfonyl imidazo[4,5-d]pyrrorolo[2,3-b]pyridine-1(6H)-yl-amino) methyl propionate (2.85 g, yield 64%). $^1$H NMR (400 MHz, CDCl$_3$) δ 8.92 (s, 1H), 8.39 (s, 1H), 8.15 (d, J=8.2 Hz, 2H), 7.80 (d, J=3.9 Hz, 1H), 7.30 (d, J=8.3 Hz, 2H), 6.71 (d, J=4.0 Hz, 1H), 5.24-5.04 (m, 1H), 4.29 (q, J=7.0 Hz, 2H), 2.38 (s, 3H), 1.40-1.14 (m, 15H). LCMS ESI(+) m/z: 528.2 (M+1).

Step B

Dissolve the compound 2-(tert-butoxycarbonyl)(6-p-toluene sulfonyl imidazo[4,5-d]pyrrorolo[2,3-b] pyridine-1 (6H)-yl) amino) methyl propionate (2.85 g, 5.4 mmol) in 30 mL mixed solvent of dichloromethane and methanol (10:1 by volume). Drip 4 N of dioxane solution of hydrogen chloride (10 mL) under an ice bath. In addition, stir the mixture at room temperature under nitrogen protection for 16 h. Then, decompress and concentrate the reaction solution. Afterwards, add 30 mL saturated sodium bicarbonate solution and stir for 5 min. extract with ethyl acetate (3*50 mL), merge organic phases, wash with 50 mL saturated salt water, and dry with anhydrous sodium sulfate. Through suction filtration, decompression and concentration of the solution, the compound ethyl 2-((6-toluene sulfonyl imidazo[4,5-d]pyrrolo[2,3-b]pyridine-1(6H)-yl)amino)methyl propionate is obtained (2.12 g, yield 92%). $^1$H NMR (400 MHz, CDCl$_3$) δ 8.86 (s, 1H), 8.11 (d, J=8.4 Hz, 2H), 8.05 (s, 1H), 7.78 (d, J=3.9 Hz, 1H), 7.26 (d, J=8.0 Hz, 2H), 6.90 (d, J=3.9 Hz, 1H), 5.80 (d, J=6.1 Hz, 1H), 4.32-4.18 (m, 2H), 4.00-3.91 (m, 1H), 2.35 (s, 3H), 1.43 (d, J=7.1 Hz, 3H), 1.27 (t, J=7.1 Hz, 3H). LCMS ESI(+) m/z: 428.0 (M+1).

Step C

Dissolve the compound ethyl 2-((6-p-toluene sulfonyl imidazo[4,5-d]pyrrolo[2,3-b]pyridine-1(6H)-yl)amino) methyl propionate (2.12 g, 4.96 mmol) in 50 mL ethanol, and add sodium borohydride (563 mg, 14.9 mmol) in an ice bath under nitrogen protection. Then, stir the mixture at room temperature for 16 h. Add 1N dilute hydrochloric acid solution to the reaction solution at 0° C., adjust the reaction solution to neutral, remove the solvent by decompression and concentration. Extract the solution with ethyl acetate, merge the organic phases, wash with 30 mL saturated salt solution. Afterwards, dry with anhydrous sodium sulfate and remove the solvent by decompression and concentration. Finally, apply silica column chromatography to obtain the compound 2-((6-toluene sulfonyl imidazo[4,5-d]pyrrorolo[2,3-b]pyridine-1(6H)-yl) amino)propyl-1-ol (1.48 g, yield 77%). $^1$H NMR (400 MHz, DMSO-$d_6$) δ 8.70 (s, 1H), 8.29 (s, 1H), 8.02 (d, J=8.4 Hz, 2H), 7.92 (d, J=4.0 Hz, 1H), 7.40 (d, J=8.2 Hz, 2H), 7.15 (d, J=4.0 Hz, 1H), 7.03 (s, 1H), 4.94 (d, J=5.2 Hz, 1H), 3.46-3.33 (m, 4H), 2.32 (s, 3H), 0.90 (d, J=5.7 Hz, 3H). LCMS ESI(+) m/z: 386.1 (M+1).

Step D

Add compound 2-((6-toluene sulfonyl imidazo[4,5-d]pyrrolo[2,3-b]pyridine-1(6H)-yl)amino) propyl-1-ol (1.68 g, 4.36 mmol), DBU (3.32 g, 3.36 mmol). 21.8 mmol) and DPPA (3.60 g, 13.1 mmol) to 100 methylbenzene under ice bath cooling and nitrogen protection. Heat to 100° C. and stir for 4 h. Then, decompress and concentrate the reaction solution. Finally, make the residues subject to silica column chromatography to obtain the compound N-(1-azide-2-base)-6-p-toluene sulfonyl imidazo[4,5-d]pyrrolo[2,3-b]pyridine-1(6H)-yl)-amine (1.26 g, yield 67%). $^1$H NMR (400 MHz, CDCl$_3$) δ 8.88 (s, 1H), 8.12 (d, J=8.2 Hz, 2H), 7.95 (s, 1H), 7.80 (d, J=4.0 Hz, 1H), 7.28 (d, 2H), 6.98 (d, J=4.0 Hz, 1H), 5.49 (s, 1H), 3.68-3.52 (m, 2H), 3.49-3.37 (m, 1H), 2.36 (s, 3H), 1.84-1.53 (m, 2H), 1.04 (d, J=6.1 Hz, 3H). LCMS ESI(+) m/z: 411.1 (M+1).

Step E

Dissolve the compound N-(1-azide-2-yl)-6-p-toluene sulfonyl imidazo[4,5-d]pyrrorolo[2,3-b]pyridine-1 (6H)-yl)-amine (1.20 g, 2.59 mmol) in 100 mL methanol, and add 10% palladium on carbon (240 mg) under the protection of nitrogen. Replace the hydrogen and stir at room temperature in a hydrogen atmosphere for 16 h. Filtrate and wash filter mass with 20 mL methanol. Then, decompress and concentrate the solution to obtain the compound N$^2$-(6-toluene sulfonyl imidazo[4,5-d]pyrrolo[2,3-b]pyridine-1(6H)-yl) propane-1,2-diamine (1.16 g, yield 98%). $^1$H NMR (400 MHz, CDCl$_3$) δ 8.88 (s, 1H), 8.11 (d, J=8.4 Hz, 2H), 7.96 (s, 1H), 7.76 (d, J=3.9 Hz, 1H), 7.26 (d, J=8.4 Hz, 5H), 7.10 (d, J=4.0 Hz, 1H), 6.06 (s, 1H), 3.39-3.29 (m, 1H), 3.02 (dd, J=13.2, 3.6 Hz, 1H), 2.65 (dd, J=13.2, 9.2 Hz, 1H), 2.35 (s, 3H), 0.92 (d, J=6.2 Hz, 3H). LCMS ESI(+) m/z: 385.1 (M+1).

Step F

Dissolve the compound N$^2$-(6-toluene sulfonyl imidazo[4,5-d]pyrrolo[2,3-b]pyridine-1(6H)-yl)propane-1,2-diamine (1.16 g, 3.02 mmol) in 50 mL methanol, and add paraformaldehyde (109 mg, 3.62 mmol). Heat to 70° C. and stir for 16 h. Cool to room temperature and conduct suction filtration. Afterwards, wash with 10 mL methanol. Then, remove the solvent by decompressing and concentrating the filtrate to obtain the compound 1-(5-methyl imidazole alkanes-1-yl)-6-p-toluene sulfonyl-1,6-dihydroimidazolidazole[4,5-d]pyrrolo[2,3-b]pyridine (1.28 g, yield 100%). $^1$H NMR (400 MHz, CDCl$_3$) δ 8.73 (s, 1H), 8.57 (s, 1H), 8.01 (d, J=7.7 Hz, 2H), 7.88 (dd, J=21.5, 3.9 Hz, 1H), 7.39 (d, J=7.7 Hz, 2H), 7.24 (d, J=8.7 Hz, 1H), 4.40-4.24 (m, 1H), 4.15-4.01 (m, 1H), 3.87-3.72 (m, 1H), 3.71-3.49 (m, 1H), 3.22 (dd, J=15.9, 8.6 Hz, 1H), 2.32 (s, 3H), 1.55-1.44 (m, 1H). LCMS ESI(+) m/z: 397.1 (M+1).

Step G

Dissolve the compound 1-(5-methyl imidazolidine-1-yl)-6-p-toluene sulfonyl-1,6-dihydroimidazole[4,5-d]pyrrolo[2,3-b]pyridine (400 mg, 1.01 mmol) in 9 mL methanol, and add 2 N sodium hydroxide solution (3.0 mL, 6.0 mmol). Stir the mixture at 35° C. for 40 h. Then, dilute the reaction solution with 15 mL water, remove the methanol through decompression and concentration. Extract with ethyl acetate (3*6 mL), merge the organic phases, wash the organic phases with 5 mL saturated brine, dry with anhydrous sodium sulfate. Afterwards, conduct suction filtration to remove the solvent. Finally, the crude compound 1-(5-methyl imidazolidine-1-yl)-1,6-dihydroimidazo[4,5-d]pyrrolo[2,3-b]pyridine is obtained (223 mg, yield 91%). LCMS ESI(+) m/z: 243.1 (M+1).

Step H

Dissolve the compound 1-(5-methyl imidazolidine-1-yl)-1,6-dihydroimidazole-[4,5-d]pyrrolo[2,3-b]pyridine (100 mg, 0.41 mmol) in 6 mL dichloromethane, and then successively add cyano-acetic acid (42 mg, 0.50 mmol), HOBT (78 mg, 0.58 mmol), 4-dimethylaminopyridine (81 mg, 0.66 mmol) and EDCI (127 mg, 0.66 mmol) under nitrogen protection and ice bath. Stir at room temperature for 16 h, decompress and concentrate the solution. Finally, obtain the compound 3-(4-methyl-3-(imidazo[4,5-d]pyrrolo[2,3-b]pyridine-1(6H)-yl) imidazoline-1-yl)-3-oxypropanitrile (40 mg, yield 31%) by silica column chromatography and high performance liquid chromatography. $^1$H NMR (400 MHz, DMSO-$d_6$) δ 11.91 (s, 1H), 8.60 (s, 1H), 8.45 (s, 1H), 7.47 (s, 1H), 6.72 (d, J=16.2 Hz, 1H), 5.03-4.80 (m, 2H), 4.21-3.92 (m, 4H), 3.44-3.38 (m, 1H), 3.31-3.23 (m, 1H), 1.09-0.88 (m, 3H). LCMS ESI(+) m/z: 310.1 (M+1).

Example 31

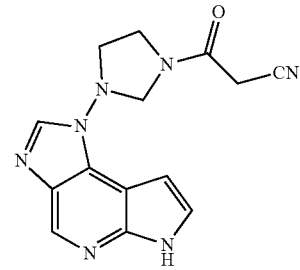 [SMILES: N#CCC(=O)N1CCN(n2cnc3cnc4[nH]ccc4c32)C1]

3-(3-(imidazo[4,5-d]pyrrolo[2,3-b]pyridine-1(6H)-yl)imidazoline-1-yl)-3-oxopropionitrile The specific implementation methods are as follows:

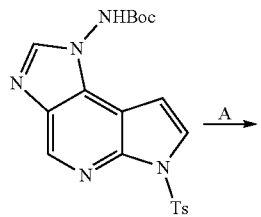

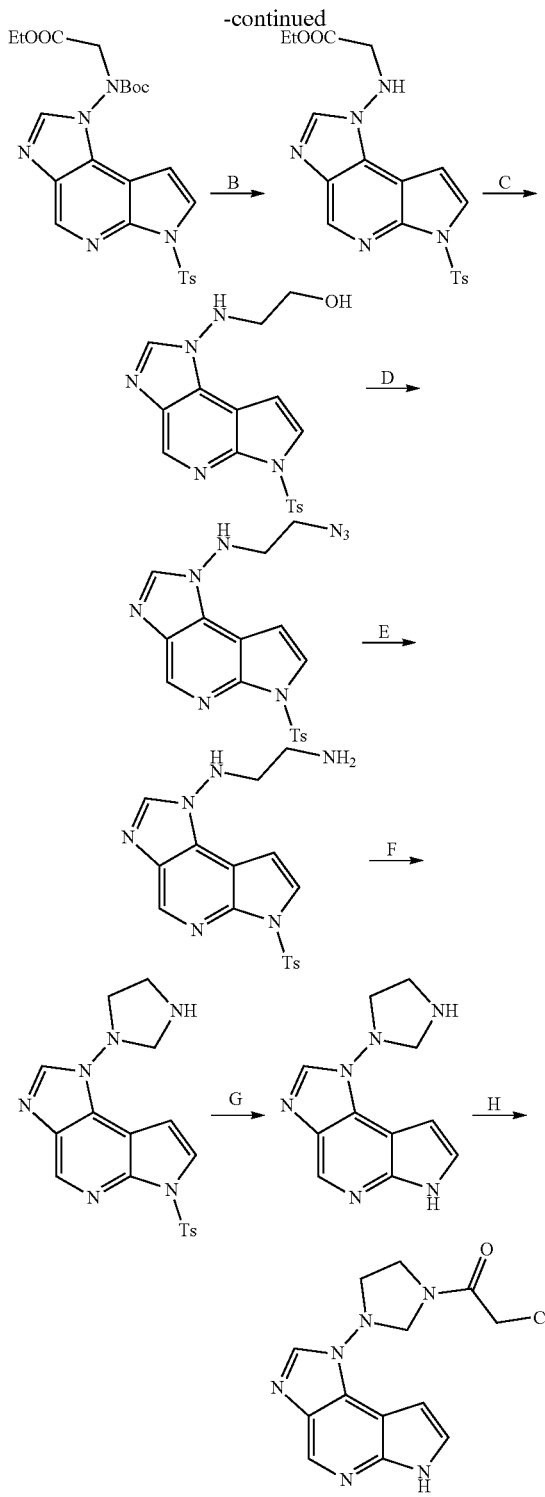

Step A

Dissolve the compound tert-butyl (6-toluene sulfonyl imidazo[4,5-d]pyrrolo[2,3-b]pyridine-1(6H)-yl) carbamate (4.00 g, 9.36 mmol) in 400 mL acetone, add sodium hydroxide (787 mg, 14.0 mmol) powder and stir at room temperature for 10 min. Then, add ethyl 2-bromoacetate (4.69 g, 28.1 mmol) to the reaction solution and stir at room temperature for 1.5 h. Filtrate the reaction solution and wash the filter mass with dichloromethane (400 mL). afterwards, decompress and concentrate the filtrate, making the residue subject to silica column chromatography to obtain the compound 2-(tert-butoxycarbonyl)(6-p-toluene sulfonyl imidazo [4,5-d]pyrrolo[2,3-b]pyridine-1 (6H)-yl-amino) methyl acetate (4.34 g, 90% yield). $^1$H NMR (400 MHz, CDCl$_3$) δ 8.91 (s, 1H), 8.28 (s, 1H), 8.12 (d, J=8.2 Hz, 2H), 7.81 (d, J=3.9 Hz, 1H), 7.29 (d, J=8.4 Hz, 2H), 6.72 (d, J=4.0 Hz, 1H), 5.17-4.78 (m, 1H), 4.33-4.17 (m, 2H), 4.15-3.96 (m, 1H), 2.36 (s, 3H), 1.62-1.36 (m, 3H), 1.35-1.15 (m, 9H). LCMS ESI(+) m/z: 514.1 (M+1).

Step B

Dissolve the compound 2-((tert-butoxycarbonyl)(6-p-toluene sulfonyl imidazo[4,5-d]pyrrolo[2,3-b]pyridine-1 (6H)-yl)amino)methyl acetate (4.34 g, 8.45 mmol) in 45 mL mixed solvent of dichloromethane and methanol (10:1 by volume). Then, add 4 N dioxane solution of hydrogen chloride (15 mL) in an ice bath. Warm the mixture to room temperature and stir for 16 h under nitrogen protection. Afterwards, decompress and concentrate the reaction solution. Add 30 mL saturated sodium bicarbonate solution and stir for 5 min. Extract with ethyl acetate (3*30 mL), merge the organic phases, wash with 10 mL saturated brine. Then, dry with anhydrous sodium sulfate. Conduct suction filtration of the filtrate to obtain the compound ethyl 2-((6-p-toluene sulfonyl imidazo[4,5-d]pyrrolo[2,3-b]pyridine-1 (6H)-yl)amino) methyl acetate (3.49 g, yield 100% yield). $^1$H NMR (400 MHz, CDCl$_3$) δ 8.85 (s, 1H), 8.10 (d, J=8.4 Hz, 2H), 7.78 (d, J=4.0 Hz, 1H), 7.24 (d, J=8.4 Hz, 2H), 6.92 (d, J=4.0 Hz, 1H), 5.73 (s, 1H), 4.26 (q, J=7.2 Hz, 2H), 3.95 (d, J=4.9 Hz, 2H), 2.35 (s, 3H), 1.27 (t, J=7.2 Hz, 3H). LCMS ESI(+) m/z: 414.0 (M+1).

Step C

Dissolve the compound ethyl methyl 2-(((6-p-toluene sulfonyl imidazo[4,5-d]pyrrolo[2,3-b]pyridine-1(6H)-yl) amino)methyl acetate (3.49 g, 4.96 mmol) in 100 mL ethanol. Add sodium borohydride (958 mg, 25.3 mmol) in an ice bath under nitrogen protection. Stir the mixture at room temperature for 16 h. Then, drip 1 N dilute hydrochloric acid solution to the reaction solution at 0° C., adjust the reaction solution to neutrality, and decompress and evaporate to remove the solvent. Afterwards, extract the solution with ethyl acetate (3*50 mL), merge the organic phases, wash with 30 mL saturated brine, dry with anhydrous sodium sulfate. Through removing the solvent by decompression and concentration and applying silica column chromatography, the compound 2-((6-p-toluene sulfonyl imidazo[4,5-d] pyrrolo[2,3-b]pyridine-1(6H)-yl)amino)ethyl-1-ol is obtained (2.98 g, 95% yield). LCMS ESI(+) m/z: 372.0 (M+1).

Step D

Add the compound 2-((6-p-toluene sulfonyl imidazo[4,5-d]pyrrolo[2,3-b]pyridine-1(6H)-yl)amino)ethyl-1-ol (2.98 g, 8.02 mmol), DBU (6.11 g, 40.1 mmol) and DPPA (6.62 g, 24.1 mmol) to 100 mL methylbenzene. Raise the temperature 110° C. and stir for 1 h. Afterwards, decompress and concentrate the reaction solution, and make the residues subject to silica column chromatography to obtain the compound N-(1-azide-2-yl)-6-p-toluene sulfonyl imidazo[4,5-d] pyrrolo[2,3-b]pyridine-1(6H)-yl)-amine (1.16 g, 36% yield). ¹H NMR (400 MHz, CDCl₃) δ 8.86 (s, 1H), 8.11 (d, J=8.4 Hz, 2H), 8.00 (s, 1H), 7.80 (d, J=4.0 Hz, 1H), 7.26 (d, J=8.4 Hz, 2H), 6.94 (d, J=4.0 Hz, 1H), 5.40 (t, J=5.2 Hz, 1H), 3.61-3.54 (m, 2H), 3.45-3.38 (m, 2H), 2.35 (s, 3H). LCMS ESI(+) m/z: 397.1 (M+1).

Step E

Dissolve the compound N-(1-azide-2-yl)-6-p-toluene sulfonyl imidazo[4,5-d]pyrrolo[2,3-b]pyridine-1(6H)-yl)-amine (1.06 g, 2.59 mmol) in 60 mL methanol, and add 10% palladium on carbon (212 mg) under nitrogen protection. Replace the hydrogen, and stir the mixture at room temperature for 16 h under hydrogen atmosphere. Then, conduct suction filtration, wash the filter mass with 20 mL methanol. Finally, through decompression and concentration, the crude compound N²-(6-p-toluene sulfonyl imidazo[4,5-d]pyrrolo[2,3-b]pyridine-1(6H)-yl)ethane-1,2-diamine is obtained (1.16 g, 100% yield). LCMS ESI(+) m/z: 371.1 (M+1).

Step F

Dissolve the compound N²-(6-p-toluene sulfonyl imidazo[4,5-d]pyrrolo[2,3-b]pyridine-1(6H)-yl)ethane-1,2-diamine (1.16 g, 3.13 mmol) in 50 mL methanol, and then add paraformaldehyde (113 mg, 3.76 mmol). Heat to 70° C. and stir for 16 h. Cool to room temperature, conduct suction filtration, and wash with 10 mL methanol. Finally, decompress and evaporate the filtrate to remove the solvent, which helps to obtain the compound 1-(imidazolidine-1-yl)-6-p-toluene sulfonyl-1,6-dihydroimidazole[4,5-d]pyrrolo[2,3-b]pyridine (1.16 g, 97% yield). LCMS ESI(+) m/z: 383.1 (M+1).

Step G

Dissolve the compound 1-(imidazolidine-1-yl)-6-p-toluene sulfonyl-1,6-dihydroimidazo[4,5-d]pyrrolo[2,3-b]pyridine (400 mg, 1.05 mmol) in 9 mL methanol, and add 2 N sodium hydroxide solution (3.0 mL, 6.0 mmol). Stir at room temperature for 7 h. Then, dilute the reaction solution with 10 mL water, decompress and evaporate methanol. Afterwards, extract the residues 3 times with 15 mL ethyl acetate. Merge the organic phases, washed with 5 mL saturated brine, dry with anhydrous sodium sulfate. Later on, conduct suction filtration, and remove the solvent by decompression and evaporation, though these steps, the crude compound 1-(5-imidazolidine-1-yl)-1,6-dihydroimidazole[4,5-d]pyrrolo[2,3-b]pyridine is obtained (277 mg, crude yield 100%). LCMS ESI(+) m/z: 229.1 (M+1).

Step H

Dissolve the compound 1-(5-imidazolidine-1-yl)-1,6-dihydroimidazole[4,5-d]pyrrolo[2,3-b]pyridine (100 mg, 0.44 mmol) in 6 mL dichloromethane. Then, successively add cyanoacetic acid (45 mg, 0.53 mmol), HOBT (83 mg, 0.61 mmol), 4-dimethylaminopyridine (86 mg, 0.70 mmol) and EDCI (134 mg, 0.70 mmol) under nitrogen protection and ice bath. Stir at room temperature for 16 h. Afterwards, decompress and concentrate under reduced, as well as apply silica gel column chromatography and HPLC preparation to obtain compound 3-(3-(imidazo[4,5-d]pyrrolo[2,3-b]pyridine-1(6H)-yl)imidazoline-1-yl)-3-oxopropionitrile (40 mg, 30% yield). ¹H NMR (400 MHz, DMSO-d6) δ 11.88 (s, 1H), 8.58 (s, 1H), 8.39-8.32 (m, 1H), 7.50-7.43 (m, 1H), 6.77-6.70 (m, 1H)), 4.95-4.79 (m, 2H), 4.19-3.99 (m, 2H), 3.86-3.74 (m, 4H). LCMS ESI(+) m/z: 296.1 (M+1).

Example 32

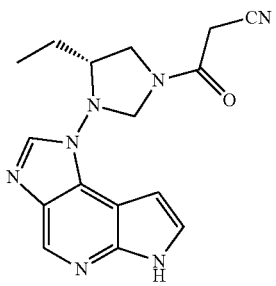 [SMILES: CC[C@@H]1CN(C(=O)CC#N)CN1n1cnc2cnc3[nH]ccc3c21]

(R)-3-(4-ethyl-3-(imidazo[4,5-d]pyrrolo[2,3-b]pyridine-1(6H)-yl)imidazoline-1-yl)-3-oxopropionitrile The specific implementation methods are as follows:

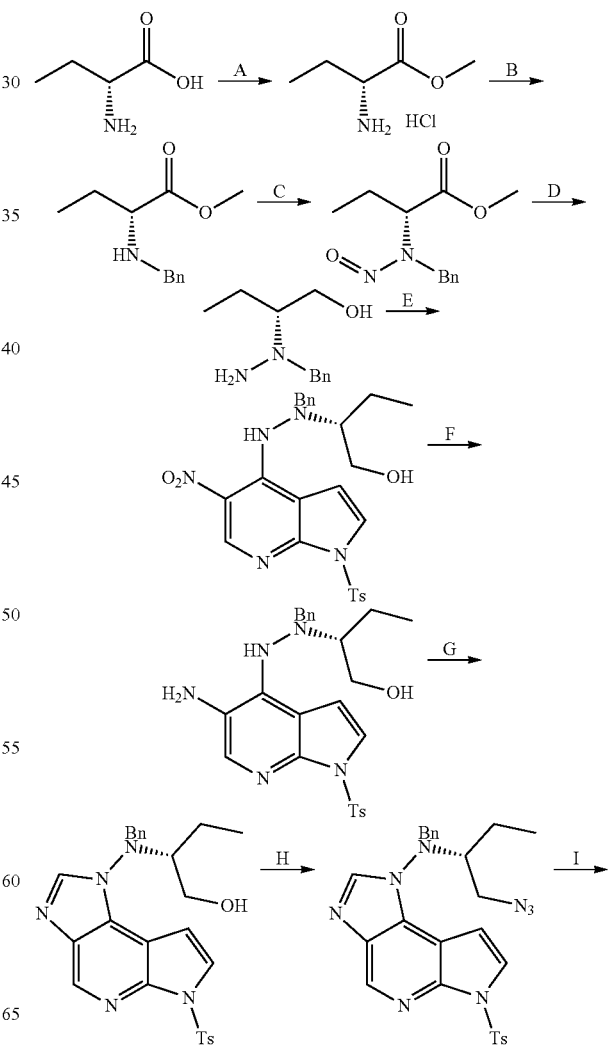

-continued

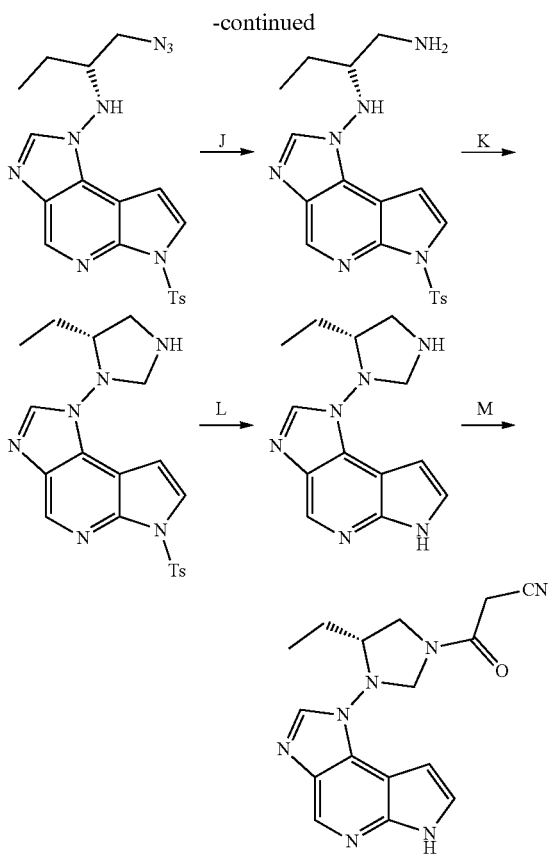

Step A

Dissolve the compound D-2-aminobutyric acid (25.0 g, 242 mmol) in 200 mL methanol, and add thionyl chloride (35.2 mL, 485 mmol) under nitrogen protection in an ice bath. Stir the mixture under ice bath for 1 h, and then warm to 70° C. and stir for 3 h. After the reaction, cool to room temperature. Finally, decompress and concentrate to obtain the compound D-2-aminobutyric acid methyl ester hydrochloride (37.2 g, yield 100%). $^1$H NMR (400 MHz, DMSO-d6) δ 8.68 (s, 3H), 3.96 (s, 1H), 3.75 (s, 3H), 1.90-1.80 (m, 2H), 0.92 (t, J=7.5 Hz, 3H). LCMS ESI(+) m/z: 117.1 (M+1).

Step B

Dissolve the compound D-2-aminobutyric acid methyl ester hydrochloride (10.0 g, 65.1 mmol) in 200 mL tetrahydrofuran, and successively add triethylamine (9.05 mL, 65.1 mmol) and benzaldehyde (7.60 g, 71.6 mmol) at room temperature. Stir at 30° C. for 48 h. Then, filter and wash the filter mass with 75 mL tetrahydrofuran. Afterwards, decompress and concentrate the filtrate, and dissolve it in 200 methanol. Under an ice bath, successively add sodium borohydride (2.71 g, 71.6 mmol) in portions with stirring for 3 h. Later on, quench the reaction with 1 N dilute hydrochloric acid and adjust the pH to neutral. After these steps, extract with ethyl acetate (3*50 mL), merge the organic phases, wash with 50 mL saturated brine, dry with anhydrous sodium sulfate, decompress and concentrate. Finally, obtain the compound D-2-benzylaminobutyric acid methyl ester by silica column chromatography (11.4 g, 84% yield).

$^1$H NMR (400 MHz, CDCl$_3$) δ 7.38-7.20 (m, 5H), 3.81 (d, J=13.0 Hz, 1H), 3.72 (s, 3H), 3.64 (d, J=13.0 Hz, 1H), 3.23 (t, J=6.5 Hz, 1H), 1.74-1.62 (m, 2H), 0.94 (t, J=7.4 Hz, 3H). LCMS ESI(+) m/z: 208.1 (M+1).

Step C

Dissolve the compound D-2-benaminobutyrate (11.4 g, 55.0 mmol) in 150 mL dichloromethane, followed by the addition of sodium nitrite (5.69 g, 82.5 mmol) and p-toluenesulfonic acid (15.7 g, 82.5 mmol) monohydrate at room temperature. Stir at 30° C. for 2 h, filter, wash the filter mass with 50 mL dichloromethane. Afterwards, decompress and concentrate the filtrate. Then, stratify the residue in 100 mL ethyl acetate and 50 mL water. Separate the organic phase, extract with ethyl acetate (3*10 mL), then merge the organic phases, wash them with 30 mL saturated salt water, dry with anhydrous sodium sulfate. Decompress and concentrate the solution to obtain the compound D-2-((N-benzyl-N-nitroso) amino) methyl butyrate (12.3 g, yield 95%). $^1$H NMR (400 MHz, CDCl$_3$) δ 7.41-7.25 (m, 3.8H), 7.11 (m, 1.2H), 5.42-5.25 (m, 0.9H), 5.00 (d, J=14.8 Hz, 0.6H), 4.95 (dd, J=9.4, 6.0 Hz, 0.6H), 4.73 (t, J=7.5 Hz, 0.4H), 4.59 (d, J=14.8 Hz, 0.6H), 3.61 (s, 1.8H)), 3.46 (s, 1.2H), 2.29-1.90 (m, 1.6H), 1.75-1.57 (m, 0.5H), 0.87 (t, J=7.4 Hz, 1.9H), 0.81 (dt, J=28.3, 7.4 Hz, 3H), 0.74 (t, J=7.5 Hz, 1.2H). LCMS ESI(+) m/z: 237.1 (M+1).

Step D

Suspend the Lithium aluminum hydride (3.21 g, 84.7 mmol) in 100 mL diethyl ether, and drip 10 mL diethyl ether solution of compound D-2-((N-benzyl-N-nitroso) amino) methyl butyrate (5.00 g, 21.2 mmol) under nitrogen at room temperature, during which the dripping speed should be kept until reaction reflux. Then, stir at 40° C. for 0.5 h. Later on, quench the ice bath with 3.2 ml water, 3.2 mL 15% sodium hydroxide solution and 9.6 mL water. Stir at room temperature for 5 minutes. Separate the organic phases, dry with anhydrous sodium sulfate, filter, and concentrated the filtrate. Then, the obtained oily substance (R)-2-(1-benzylhydrazyl)-butan-1-ol is directly used for next reaction. $^1$H NMR (400 MHz, CDCl3) δ 7.39-7.26 (m, 5H), 3.88-3.66 (m, 4H), 2.72-2.62 (m, 1H), 1.74-1.62 (m, 1H), CDCl3 δ 7.39-7.26 (m, 5H), 3.88-3.66 (m, 4H), 2.72-2.62 (m, 1H), 1.74-1.62 (m, 1H), 1.59 1.47 (m, 1 h), 0.98 (t, J=7.5 Hz, 3 h). The LCMS ESI(+) m/z: 195.1 (m+1).

Step E

Dissolve the crude compound (R)-2-(1-benzylhydrazino)butan-1-ol from the previous step in 100 mL isopropanol, and successively add N,N-diisopropylethylamine (10.2 mL, 56.9 mmol) and compound 4-chlorine-5-nitro-1-p-toluene sulfonyl-1H-pyrrolo[2,3-b]pyridine (5.00 g, 14.2 mmol). Heat to 85° C. under nitrogen protection. Then, stir and react for 16 h. Afterwards, concentrate the reaction solution and apply silica column chromatography to obtain the compound (R)-2-(1-benzyl-2-(5-nitro-1-p-toluene sulfonyl-1H-pyrrolo[2,3-b]pyridine-4-yl)hydrazine)-butan-1-ol (5.91 g, two-step yield 82%). $^1$H NMR (400 MHz, CDCl$_3$) δ 10.01 (d, J=112.2 Hz, 1H), 9.00 (d, J=5.2 Hz, 1H), 8.02 (dd, J=8.4, 4.3 Hz, 2H), 7.55-7.41 (m, 2H), 7.33-7.06 (m, 7H), 4.29-3.68 (m, 4H), 3.10-2.90 (m, 1H), 2.40 (s, 3H), 1.87-1.42 (m, 2H), 0.96 (dt, J=36.8, 7.5 Hz, 3H). LCMS ESI(+) m/z: 510.0 (M+1).

Step F

Add compound (R)-2-(1-benzyl-2-(5-nitro-1-p-toluene sulfyl-1H-pyrrole[2,3-b]pyridine-4-yl)diazanyl) butan1-ol (5.90 g, 11.6 mmol) to 120 mL ethanol, followed by the addition of iron powder (12.9 g, 232 mmol) and saturated ammonium chloride (40 mL) at room temperature. Stir at 80° C. for 15 min. Conduct suction filtration with hot diatomite, wash with 30 mL methanol and concentrate the filtrate. Then, the residue is partitioned between 60 mL water and 60 mL ethyl acetate. Afterwards, separate the organic phases extract the aqueous phase 4 times with 60 mL ethyl acetate. After that, merge the organic phases, washed with 30 mL water and 30 mL saturated brine. Then, dry with anhydrous sodium sulfate, decompress and concentrate. Finally apply silica column chromatography to obtain the compound (R)-2-(1-benzyl-2-(5-amino-1-p-toluene sulfonyl-1H-pyrrole[2,3-b]pyridine-4-yl) diazanyl)-butan-1-ol (2.45 g, yield 44%). $^1$H NMR (400 MHz, CDCl$_3$) δ 7.99 (d, J=8.4 Hz, 3H), 7.71 (s, 1H), 7.45 (d, J=4.1 Hz, 1H), 7.26-7.16 (m, 7H), 6.75 (d, J=3.9 Hz, 1H), 5.77 (s, 1H), 4.03-3.90 (m, 2H), 3.89-3.64 (m, 2H), 2.36 (s, 3H), 1.86-1.69 (m, 2H), 1.50-1.39 (m, 1H), 1.26 (t, J=7.1 Hz, 1H), 0.95 (t, J=7.6 Hz, 3H). LCMS ESI(+) m/z: 480.1 (M+1).

Step G

Dissolve compound (R)-2-(1-benzyl-2-(5-amino-1-p-toluene sulfonyl-1H-pyrrole[2,3-b]pyridine-4-yl) diazanyl) butan-1-ol (480 mg, 1.0 mmol) in 6 mL acetic acid, and add triethyl protoformate (222 mg, 1.5 mmol) under nitrogen. Stir at 100° C. for 15 min and decompress the reaction solution to remove the solvent. Then, make the residues subject to silica column chromatography so as to obtain the compound (R)-2-(benzyl(6-toluene sulfonyl imidazo[4,5-d]pyrrorole [2,3-b]pyridine-1(6H)-yl) amino) butan-1-ol (316 mg, yield 65%). LCMS ESI(+)M/z: 490.1 (m+1).

Step H

Add compound (R)-2-(benzyl(6-p-toluene sulfonyl imidazo[4,5-b]pyrrolo[2,3-b]pyridine-1(6H)-yl)amino)butan-1-ol (316 mg, 0.65 mmol), DBU (491 mg, 3.23 mmol) and DPPA (533 mg, 1.94 mmol) to 8 mL methylbenzene under ice bath cooling and nitrogen protection. Warm to 100° C. and stir for 16 h. decompress and concentrate the reaction solution. Afterwards, make the residues subject to silica column chromatography to obtain the compound (R)—N-(1-azide-2-yl)-N-benzyl-6-p-toluene sulfonyl imidazo[4,5-d]pyrrolo[2,3-b]pyridine-1 (6H)-yl) amine (216 mg, 65% yield). LCMS ESI(+) m/z: 515.2 (M+1).

Step I

Dissolve compound (R)—N-(1-azidine-2-yl)-N-benzyl-6-p-toluene sulfonyl imidazo[4,5-b]pyrrolo[2,3-b]pyridine-1(6H)-yl)amine (167 mg, 0.33 mmol) in 8 mL dichloromethane, and add anhydrous aluminum chloride (346 mg, 2.6 mmol) under nitrogen protection. Then, stir the mixture at room temperature for 1 h. Add 10 mL saturated sodium bicarbonate to the reaction solution and stir for 5 min. Extract the compound with 15 mL dichloromethane for 3 times, merge the organic phase, wash with 10 mL saturated salt solution, dry with anhydrous sodium sulfate. Decompress and concentrate the filtrate. Finally, make the residues subject to silica gel column chromatography to obtain the compound (R)—N-(1-azidine-2-yl)-6-toluene sulfonyl imidazo[4,5-d]pyrrolo[2,3-b]pyridine-1 (6H)-yl)amine (89 mg, yield 62%). $^1$H NMR (400 MHz, CDCl$_3$) δ 8.90 (s, 1H), 8.22 (s, 1H), 8.12 (d, J=8.4 Hz, 2H), 7.83 (d, J=4.0 Hz, 1H), 7.28 (d, 2H), 7.03 (d, J=4.0 Hz, 1H), 5.65 (s, 1H), 3.68 (dd, J=12.0, 2.8 Hz, 1H), 3.50-3.33 (m, 2H), 2.36 (s, 3H), 1.54-1.44 (m, 2H), 0.93 (t, J=7.5 Hz, 3H). LCMS ESI(+) m/z: 425.0 (M+1).

Step J

Dissolve the compound (R)—N-(1-azidine-2-yl)-6-p-toluene sulfonyl imidazo[4,5-d]pyrrolo[2,3-b]pyridine-1 (6H)-yl)amine (86 mg, 2.59 mmol) in 6 mL methanol, and add 10% palladium on carbon (43 mg) under nitrogen protection. Replace the hydrogen, and stir the mixture under a hydrogen atmosphere at 35° C. for 2 h. Conduct suction filtration, wash with 10 mL methanol. Later on, decompress and concentrate the filtrate to obtain compound (R)—N2-(6-p-toluene sulfonyl imidazo[4,5-d]pyrrolo[2,3-b]pyridine-1(6H)-yl)butane-1,2-diamine (79 mg, 100% yield). LCMS ESI(+) m/z: 399.1 (M+1).

Step K

Dissolve compound (R)—N$^2$-(6-p-P-toluene sulfonyl imidazo[4,5-d]pyrrolo[2,3-b]pyridine-1(6H)-yl)butane-1,2-diamine (79 mg, 0.20 mmol) in 6 mL methanol and add paraformaldehyde (7 mg, 0.2 mmol). Heat to 70° C. and stir for 16 h. Cool to room temperature, conduct suction filtration and wash with 5 mL methanol. Decompress and evaporate the filtrate to remove the solvent, which helps to obtain the compound (R)-1-(5-ethylimidazolidine-1-yl)-6-toluene sulfonyl-1,6-dihydroimidazole[4,5-d]pyrrolo[2,3-b]pyridine (81 mg, yield 100%). $^1$H NMR (400 MHz, CDCl$_3$) δ 8.94-8.77 (m, 1H), 8.13-8.07 (m, 2H), 7.79-7.67 (m, 1H), 7.28-7.24 (m, 1H), 7.08 (m, 1H), 4.53-3.97 (m, 2H), 3.80-3.37 (m, 3H), 2.42-2.30 (m, 3H), 1.83-1.59 (m, 2H), 0.96-0.74 (m, 3H). LCMS ESI(+) m/z: 411.1 (M+1).

Step L

Dissolve the compound (R)-1-(5-ethyl imidazolane-1-yl)-6-p-toluene sulfonyl-1,6-dihydroimidazo[4,5-d]pyrrolo[2,3-b]pyridine (50 mg, 0.12 mmol) in 6 mL methanol and add 2 N sodium hydroxide solution (1.5 mL, 3.0 mmol). Stir at 30° C. for 16 h. Dilute the reaction solution with 10 mL water and remove methanol by decompression and evaporation. The residue is extracted 3 times with 15 mL ethyl acetate. Then, merge the organic phases, wash with 5 mL saturated salt water, dry with anhydrous sodium sulfate. Conduct suction filtration to remove the solvent. Finally, obtain the crude compound (R)-1(5-ethyl imidazolane-1-yl)-1,6-dihydroimidazole[4,5-d] pyrrolo[2,3-b]pyridine (31 mg, yield 100%). LCMS ESI(+) m/z: 257.1 (M+1).

Step M

Dissolve the compound (R)-1-(5-ethylimidazolidine-1-yl)-1,6-dihydroimidazole-[4,5-d]pyrrolo[2,3-b] pyridine (31 mg, 0.14 mmol) in 6 mL dichloromethane, and then successively add cyano-acetic acid (15 mg, 0.17 mmol), HOBT (27 mg, 0.20 mmol), 4-dimethylaminopyridine (28 mg, 0.23 mmol) and EDCI (44 mg, 0.23 mmol) under nitrogen protection and ice bath. Stir at room temperature for 16 h. Then, decompress and concentrate the solution. Finally, through silica column chromatography and HPLC, prepare the compound (R)-3-(4-ethyl-3-(imidazo[4,5-d]pyrrolo[2,3- b]pyridine-1(6H)-yl)imidazoline-1-yl)-3-oxypropanitrile (12 mg, yield 26%). ¹H NMR (400 MHz, DMSO-d₆) δ 11.89 (s, 1H), 8.87-8.03 (m, 2H), 7.47 (s, 1H), 6.70 (s, 1H), 5.05-4.69 (m, 2H), 4.30-3.68 (m, 4H), 3.56-3.41 (m, 1H), 1.54-1.27 (m, 2H), 0.85-0.68 (m, 3H). LCMS ESI(+) m/z: 324.1 (M+1).

Example 33

2-cyano-N-(1-(imidazo[4,5-d]pyrrolo[2,3-b]pyridine-1(6H)-yl)pyrrolidine-3-yl)acetamide The specific implementation methods are as follows:

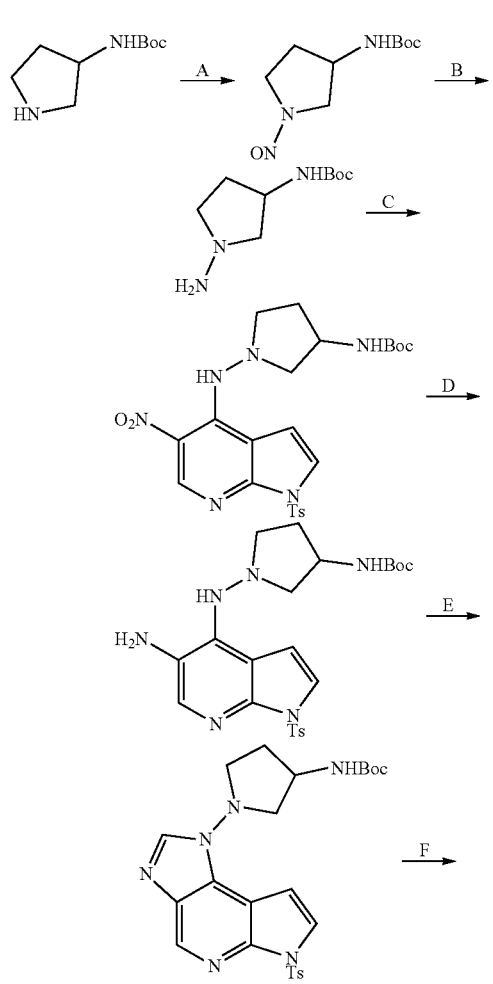

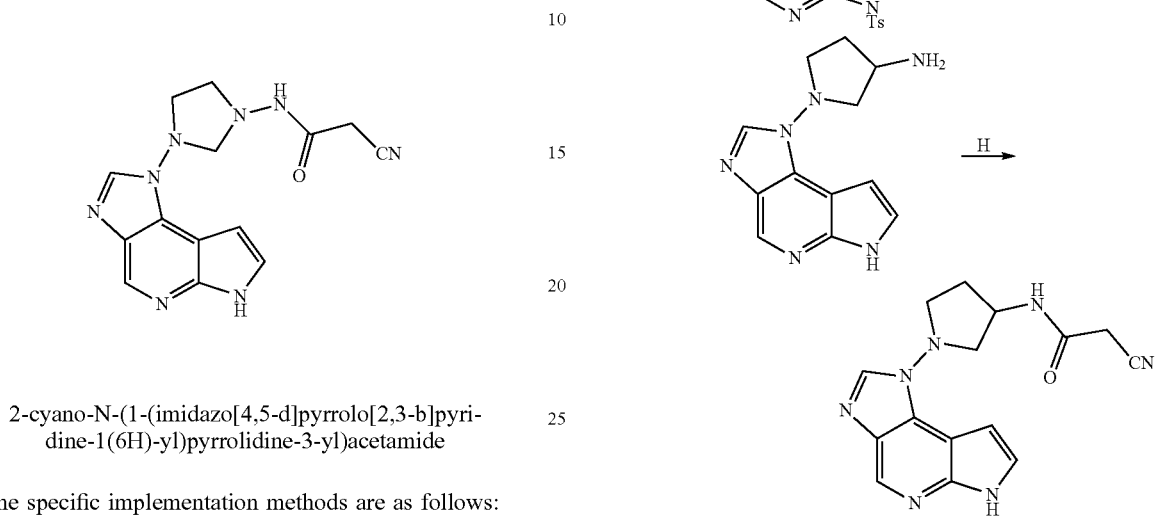

Step A

Dissolve tert-butyl pyrrolidine-3-ylcarbamate (4.33 g, 23.3 mmol) in 30 mL acetic acid and 10 mL water. slowly add drip aqueous solution (20 mL) containing sodium nitrite (3.21 g, 46.6 mmol) at 0° C. Then, warm to room temperature and stir for 18 h under nitrogen protection. After the reaction, quench the solution by adding water at 0° C., extract three times with ethyl acetate (240 mL), filter, spin dry, and purify to obtain the compound (1-nitrosopyrrolidine-3-yl) tert-butyl carbamate (4.58 g, 93% yield). LCMS ESI(+) m/z: 216.1 (M+1).

Step B

Suspend compound (1-nitrosopyrrolidine-3-yl)tert-butyl carbamate (4.58 g, 21.3 mmol), zinc powder (13.8 g, 213 mmol) in acetic acid (5 mL) and methanol (50 mL). Stirred the solution at room temperature for 2 h under nitrogen protection. After the reaction, filter and spin dry to obtain the crude substance (1-aminopyrrolidine-3-yl) tert-butyl carbamate (4.28 g, yield 100%). LCMS ESI(+) m/z: 202.1 (M+1).

Step C

Dissolve compound (1-aminopyrrolidine-3-yl)tert-butyl carbamate (7.75 g, 22 mmol) in 100 mL isopropanol, followed by the addition of (1-aminopyrrolidine-3-yl) tert-butyl carbamate (4.28 g, 21.3 mmol) and N,N-diisopropylethylamine (11 g, 85.3 mmol). Warm them to 100° C. and stir for 20 h. After the reaction, spin dry and purify by column chromatography to obtain the compound (1-((5-nitro-1-p-toluene sulfonyl-1-1H-pyrrole[2,3-b]pyridine-4-yl)amino)pyridine-3-yl)tert-butyl carbamate (6.6 g, 60% yield). LCMS ESI(+) m/z: 517.1 (M+1).

Step D

Suspend compound 1-((5-nitro-1-p-toluene sulfonyl-1-1H-pyrrole[2,3-b]pyridine-4-yl)amino)pyridine-3-yl)Boc-amide (1.5 g, 2.9 mmol), iron powder (977 mg, 17.4 mmol) and ammonium chloride (311 mg, 5.8 mmol) in 12 mL ethanol and 4 mL water. Under nitrogen protection, heat to 75° C. and stir for 1 h. After the reaction, filter, spin dry, and purify by column chromatography to obtain the product 1-((5-amino-1-p-toluene sulfonyl-1-1H-pyrrole[2,3-b]pyridine-4-yl)amino) pyridine-3-yl)tert-butyl carbamate (770 mg, 55% yield). LCMS ESI(+) m/z: 487.1.

Step E

Dissolve compound 1-((5-amino-1-p-toluene sulfonyl-1-1H-pyrrolo[2,3-b]pyridine-4-yl)amino)pyridine-3-yl)tert-butyl carbamate (770 mg, 1.58 mmol), triethyl orthoformate (1 mL) and pyridine hydrochloride (18 mg, 0.16 mmol) in 20 mL methylbenzene. Heat to 115° C. and stir for 2 h under nitrogen protection. After the reaction, spin dry and purify by column chromatography to obtain the compound (1-(6-p-toluene sulfonyl imidazo[4,5-d]pyrrolo[2,3-b]pyridine-1(6H)-yl) pyridine-3-yl)tert-butyl carbamate (700 mg, 89% yield). LCMS ESI(+) m/z: 497.1.

Step F

Dissolve compound (1-(6-p-toluene sulfonyl imidazo[4,5-d]pyrrolo[2,3-b]pyridine-1(6H)-yl)pyridine-3-yl) Boc-amide (700 mg, 1.41 mmol) in 10 mL dichloromethane. Then, add trifluoroacetic acid (2 mL) at 0° C. and stir at room temperature for 5 h under nitrogen protection. After the reaction, spin dry to obtain the crude compound 1-(6-p-toluene sulfonyl imidazo[4,5-d]pyrrolo[2,3-b]pyridine-1(6H)-yl)pyridine-3-ammonia triflate (560 mg, yield 100%). LCMS ESI(+) m/z: 397.1 (M+1).

Step G

Dissolve compound 1-(6-p-toluene sulfonyl imidazo[4,5-d]pyrrolo[2,3-b]pyridine-1(6H)-yl)pyridine-3-amino trifluoromethanesulfonate (360 mg, 0.91 mmol) in 10 mL methanol. Then, add aqueous sodium hydroxide solution (2 N, 3 mL) at 0° C. Stir the mixture at 30° C. for 18 h under nitrogen protection. After the reaction, add 20 mL water, adjust the pH to 8-9, extract with dichloromethane (6*50 mL), merge the organic phases, dry with anhydrous sodium sulfate, filter, spin dry, and purify by column chromatography to obtain compound 1-(imidazo[4,5-d]pyrrolo[2,3-b]pyridine-1(6H)-yl)pyridine-3-amino (140 mg, 64% yield). LCMS ESI(+) m/z: 243.1 (M+1).

Step H

Dissolve compound 1-(imidazo[4,5-d]pyrrolo[2,3-b]pyridine-1(6H)-yl)pyridine-3-amino (70 mg, 0.29 mmol), 2-cyanoacetic acid (29 mg, 0.35 mmol) and HATU (165 mg, 0.43 mmol) in 5 mL N,N-dimethylformamide. Then, add N,N-diisopropylethylamine (112 mg, 0.87 mmol) at 0° C. Stir at room temperature for 16 h under nitrogen protection. After the reaction, add 20 mL water and extract with ethyl acetate (3*50 mL), merge the organic phases, dry with anhydrous sodium sulfate, filter, spin dry, and purify by high-performance liquid phase preparation to obtain the compound 2-cyano-N-(1-(Imidazo[4,5-d]pyrrolo[2,3-b]pyridine-1(6H)-yl)pyrrolidine-3-yl)acetamide (30 mg, 34% yield). $^1$H NMR (400 MHz, DMSO-$d_6$) δ 11.88 (s, 1H), 8.76 (d, J=6.8 Hz, 1H), 8.57 (s, 1H), 8.46 (s, 1H), 7.47 (t, J=3.0 Hz, 1H), 6.75 (dd, J=3.6, 2.0 Hz, 1H), 4.56-4.48 (m, 1H), 3.70 (d, J=1.4 Hz, 2H), 3.68-3.63 (m, 1H), 3.56-3.50 (m, 1H), 3.45-3.39 (m, 1H), 3.27-3.24 (m, 1H), 2.50-2.44 (m, 1H), 1.99-1.90 (m, 1H). LCMS ESI(+) m/z: 310.1 (M+1).

Example 34

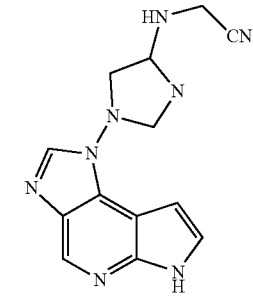 [SMILES: N#CCNC1CN(n2cnc3cnc4[nH]ccc4c32)CN1]

2-((1-(imidazo[4,5-d]pyrrolo[2,3-b]pyridine-1(6H)-yl)pyrrolidine-3-yl)amino)acetonitrile

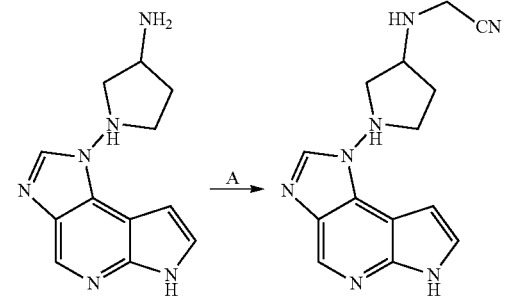

Step A

Dissolve 1-(imidazo[4,5-d]pyrrolo[2,3-b]pyridine-1(6H)-yl)pyridine-3-amino (70 mg, 0.29 mmol) and bromoacetonitrile (42 mg, 0.35 mmol) in 5 mL N,N-dimethylformamide, followed by the addition of triethylamine (88 mg, 0.87 mmol) at 0° C. Stir the solution at room temperature for 16 h under nitrogen protection. After the reaction, add 20 mL water, extract with dichloromethane (5*50 mL), merge the organic phases, dried with anhydrous sodium sulfate, filter, spin dry, and purify by HPLC preparation to obtain the compound 2-((1-(imidazo[4,5-d]pyrrolo[2,3-b]pyridine-1(6H)-yl)pyrrolidine-3-yl)amino)acetonitrile (12 mg, 15% yield). $^1$H NMR (400 MHz, CD$_3$OD-$d_4$) δ 9.03 (s, 1H), 9.85 (s, 1H), 7.66 (d, J=3.4 Hz, 1H), 7.20 (d, J=3.4 Hz, 1H), 4.09 (s, 2H), 4.07-4.00 (m, 1H), 3.89-3.84 (m, 1H), 3.75-3.69 (m, 1H), 3.65-3.58 (m, 2H), 2.66-2.58 (m, 1H), 2.24-2.16 (m, 1H). LCMS ESI(+) m/z: 282.1 (M+1).

Example 35

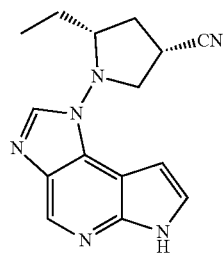 [SMILES: CC[C@@H]1C[C@H](C#N)CN1n1cnc2cnc3[nH]ccc3c21]

(3S,5R)-5-ethyl-1-(imidazo[4,5-d]pyrrole[2,3-b]pyridine(6H)-yl)pyrrolidine-3-carbonitrile The specific implementation methods are as follows:

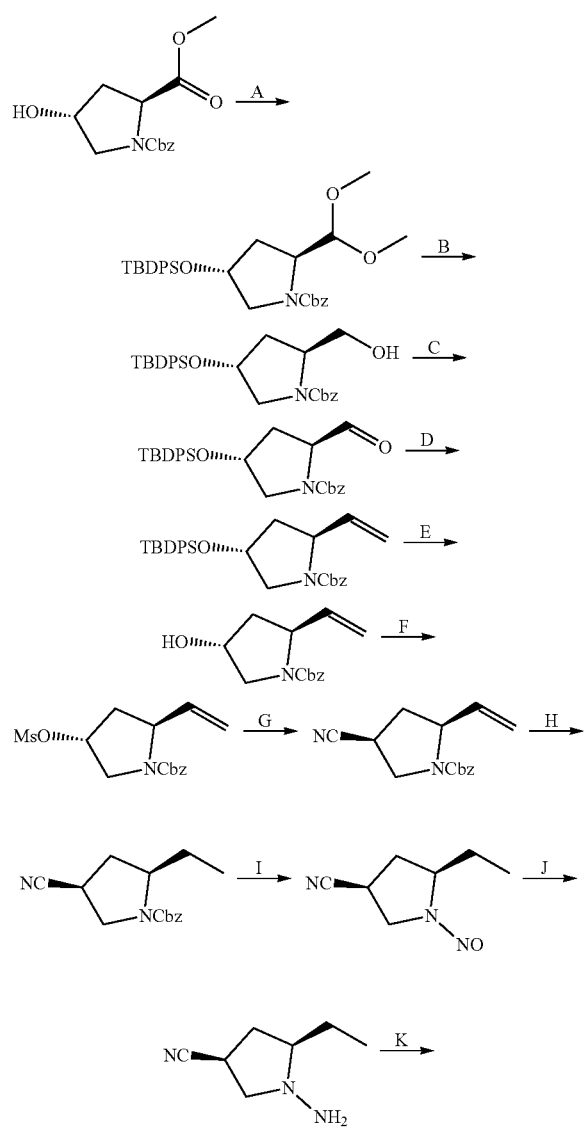

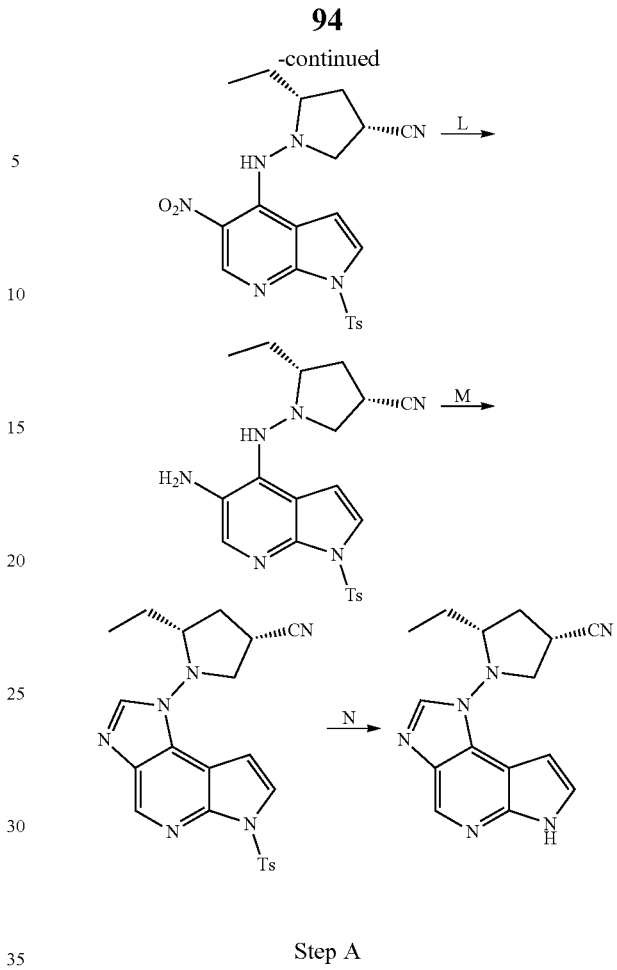

Step A

Dissolve compound (2S,4R)—N-Cbz-2-carboxylate ethyl ester-4-pyrrolidinol (20.0 g, 71.6 mmol) in 70 mL N,N-dimethylformamide. Add imidazole (10.7 mmol, 158 mmol) and TBDPSCl (23.6 g, 85.9 mmol) at room temperature and stir for 16 h. Pour the reaction solution into water (700 mL), extract with ethyl acetate (3*60 mL), merge the organic phases, wash with saturated brine (30 mL), dried with anhydrous sodium sulfate, conduct suction filtration. Afterwards, decompress and concentrate. Finally, make the residues subject to silica column chromatography to obtain the compound (2S,4R)—N-Cbz-2-carboxylic acid ethyl ester-4-O-TBDPS pyrrolidine (34.3 g, yield 92%). $^1$H NMR (400 MHz, CDCl$_3$) δ 7.65-7.56 (m, 4H), 7.46-7.30 (m, 11H), 5.23-5.04 (m, 2H), 4.60-4.47 (m, 1H), 4.41 (m, 1H), 3.70-3.47 (s, 3H), 3.65-3.49 (m, 2H), 2.29-2.21 (m, 1H), 1.93-1.83 (m, 1H), 1.03 (s, 9H). LCMS ESI(+) m/z: 518.2 (M+1).

Step B

Dissolve the compound (2S,4R)—N-Cbz-2-carboxylate ethyl ester-4-O-TBDPS pyrrolidine (10.0 g, 19.3 mmol) in 80 mL ethanol (10:1 by volume). Then, add sodium borohydride (2.19 g, 58.0 mmol) in batches in an ice bath. Warm to room temperature and stir for 16 h. Quench the reaction with 1 N hydrochloric acid solution and made it neutral. Afterwards, decompress and concentrate the reaction solution. Extract 3 times with methanol/ethyl acetate mixed solvent (volume ratio 10:1, 200 mL). Merge the organic phases, wash with 100 mL saturated brine, and dry with anhydrous sodium sulfate. Then, conduct suction filtration, and concentrate the filtrate to obtain the compound (2S, 4R)—N-Cbz-2-hydroxymethyl-4-O-TBDPS pyrrolidine (8.92 g, yield 94%). ¹H NMR (400 MHz, CDCl₃) δ 7.67-7.56 (m, 4H), 7.46-7.29 (m, 11H), 5.21-5.09 (m, 2H), 4.38-4.25 (m, 2H), 3.74-3.50 (m, 3H), 3.31-3.20 (m, 1H), 2.08-1.97 (m, 1H), 1.56-1.45 (m, 1H), 1.03 (s, 9H).

Step C

Dissolve the compound (2S,4R)—N-Cbz-2-hydroxymethyl-4-O-TBDPS pyrrolidine (23.0 g, 4.96 mmol) in 700 mL dichloromethane. Add Dess-Martin oxidant (29.9 g, 70.5 mmol) at room temperature. Stir at room temperature for 1 h. Filter through diatomite and wash with 50 mL dichloromethane. Afterwards, add saturated sodium bicarbonate (200 mL) to the filtrate, followed by stirring for 30 minutes. Then, conduct suction filtration, separate the organic phases, and extract the aqueous phase twice with dichloromethane (100 mL). Merge the organic phases, washed with 30 mL salt brine, dry with anhydrous sodium sulfate. After these steps, decompress and evaporate to remove the solvent. Finally, apply silica column chromatography to obtain the compound (2S,4R)—N-Cbz-2-carbaldehyde-4-O-TBDPS pyrrolidine (14.0 g, 61% yield). ¹H NMR (400 MHz, CDCl₃) δ 9.45 (dd, J=57.2, 2.9 Hz, 1H), 7.68-7.55 (m, 4H), 7.49-7.29 (m, 11H), 5.25-5.09 (m, 2H), 4.57-4.34 (m, 2H), 3.74-3.34 (m, 2H), 2.10 (t, J=10.3 Hz, 1H), 1.88-1.77 (m, 1H), 1.05 (s, 9H). LCMS ESI(+) m/z: 488.2 (M+1).

Step D

Add potassium tert-butoxide (6.44 g, 57.4 mmol) to the tetrahydrofuran (150 mL) solvent of methyltriphenylphosp (20.5 g, 57.4 mmol in an ice bath protected by nitrogen. Heat to 30° C. and stir for 30 min. Cool the reaction solution to 0° C. Then, drip a solution of compound (2S,4R)—N-Cbz-2-carbaldehyde-4-O-TBDPS pyrrolidine (14.0 g, 28.7 mmol) in tetrahydrofuran (30 mL). Keep The temperature and stir for 1 h. Add water (150 mL) and EA (150 mL) to the reaction solution. separate the organic phases, and extract the aqueous phase twice with ethyl acetate (150 mL). Then, merge the organic phases, wash with water (100 mL) and saturated brine (50 mL), dry with anhydrous sodium sulfate, conduct suction filtration. After these, decompress and evaporate the solvent. Finally, obtain the compound (2S, 4R)—N-CBZ-2-vinyl-4-O-TBDPS pyrroliane (13.0 g, yield 93%) by silica column chromatography. ¹H NMR (400 MHz, CDCl₃) δ 7.73-7.57 (m, 4H), 7.49-7.27 (m, 11H), 5.77-5.58 (m, 1H), 5.22-4.90 (m, 4H), 4.61-4.42 (m, 1H), 4.39-4.31 (m, 1H), 3.64-3.45 (m, 1H), 3.46-3.28 (m, 1H), 2.18-2.05 (m, 1H), 1.78-1.62 (m, 1H), 1.04 (s, 9H). LCMS ESI(+) m/z: 487.2 (M+1).

Step E

Drip the crude compound (2S,4R)—N-CBZ-2-vinyl-4-O-TBDPS pyrroliane (20 mL) which was obtained in the last reaction to a 1.0 M solution of tetrahydrofuran (53.5 mL, 53.5 mmol) of n-butylammonium fluoride trihydrate and stir at room temperature for 16 h. Then, decompress and concentrate the solution. Finally, apply silica column chromatography to obtain the compound (2S,4R)—N-CBZ-2-vinyl-4-pyrrolidinol (6.15 g, yield 93%). ¹H NMR (400 MHz, CDCl₃) δ 7.42-7.27 (m, 5H), 5.86-5.67 (m, 1H), 5.25-5.00 (m, 4H), 4.57-4.40 (m, 2H), 3.70-3.47 (m, 2H), 2.21-2.06 (m, 1H), 1.97-1.86 (m, 1H). LCMS ESI(+) m/z: 248.1 (M+1).

Step F

Dissolve the compound (2S,4R)—N-Cbz-2-vinyl-4-pyrrolidinol (2.00 g, 8.09 mmol) in 50 mL dichloromethane, followed by the dripping of triethylamine (2.25 mL, 16.2 mmol) and methylsulfonyl chloride (1.39 g, 12.1 mmol) under nitrogen protection in an ice bath. Stir under ice bath for 3 h. Then, add water (50 mL) and stir for 15 min. Add ethyl acetate (150 mL), separate the organic phases, wash twice with water (30 mL) and saturated brine (30 mL), dry with anhydrous sodium sulfate, conduct suction filtration. Through these steps, the crude compound (2S,4R)—N-Cbz-2-vinyl-4-methanesulfonate pyrrolidine is obtained (2.63 g, yield 100%). ¹H NMR (400 MHz, CDCl₃) δ 7.45-7.28 (m, 5H), 5.88-5.66 (m, 1H), 5.28-5.04 (m, 5H), 4.60-4.46 (m, 1H), 4.06-3.84 (m, 1H), 3.74-3.61 (m, 1H), 3.00 (s, 3H), 2.57-2.41 (m, 1H), 2.13-2.01 (m, 1H).

Step G

Dissolve the compound (2S,4R)—N-CBZ-2-vinyl-4-mesylate pyrrolidine (2.63 g, 8.08 mmol) in 50 mL anhydrous N,N-dimethylformamide (50 mL), followed by the addition of sodium cyanide solution (1.19 g, 24.3 mmol) under nitrogen. Stir at 80° C. for 7 h and then stir at 100° C. for 2 h. Pour the reaction solution 300 mL water, then extract with ethyl acetate (3*50 mL) and merge the organic phases. Afterwards, wash them with water (50 mL) and saturated salt water (50 mL), dry with anhydrous sodium sulfate, conduct suction and filtration. Finally, obtain the compound (2S,4S)—N-CBZ-2-vinyl-4-cyano-pyrrolidine (1.17 g, yield 56%) by silica gel column chromatography. ¹H NMR (400 MHz, CDCl₃) δ 7.43-7.29 (m, 6H), 5.95-5.81 (m, 1H), 5.34-5.06 (m, 4H), 4.50-4.39 (m, 1H), 4.08-3.89 (m, 1H), 3.71-3.62 (m, 1H), 3.14-3.03 (m, 1H), 2.58-2.47 (m, 1H), 2.17-2.03 (m, 1H). LCMS ESI(+) m/z: 257.1 (M+1).

Step H

Dissolve the compound (2S,4S)—N-Cbz-2-vinyl-4-cyanopyrrolidine (1.17 g, 4.56 mmol) in 30 mL methanol, followed by the addition of 10% palladium on carbon (234 mg) under nitrogen protection. Replace hydrogen. Stir at room temperature for 16 h. Conduct Suction filtration, wash twice with 10 mL methanol. Then, decompress and concentrate the filtrate to obtain compound (3S,5R)-5-ethyl-pyrrolidine-3-methylcyanide (567 mg, yield 100%). LCMS ESI (+) m/z: 125.1 (M+1).

Step I

Dissolve the compound (3S,5R)-5-ethyl-pyrrolidine-3-methylcyanide (456 mg, 4.57 mmol) in 25 mL dichloromethane, and sequentially add sodium nitrite (347 mg, 5.03 mmol) and p-toluenesulfonic acid monohydrate (847 mg, 5.03 mmol) at room temperature. Stir for 3 h, filter, wash the filter mass with 20 mL dichloromethane, decompress and concentrate the filtrate, and finally perform silica column chromatography to obtain the compound (3S,5R)-1-nitroso-5-ethyl-pyrrolidine-3-Methyl cyanide (210 mg, 24% yield). ¹H NMR (400 MHz, CDCl₃) δ 4.52-4.40 (m, 1H), 4.31-4.19 (m, 1H), 3.74-3.65 (m, 1H), 3.20-3.09 (m, 1H), 2.75-2.63 (m, 1H), 2.40-2.28 (m, 1H), 2.26-2.12 (m, 1H), 2.01-1.90 (m, 1H), 1.09 (t, J=7.4 Hz, 3H). LCMS ESI(+) m/z: 128.1 (M+1).

Step J

Dissolve the compound (3S,5R)-1-nitroso-5-ethyl-pyrrolidine-3-methylcyanide (210 mg, 1.37 mmol) in 6 mL methanol, and add zinc powder (896 mg, 13.7 mmol) at room temperature. Then, add acetic acid (2 mL) drip by drip. Stir at 30° C. for 2 h. Afterwards, conduct suction filtration of the reaction solution. Then, wash the solution with 5 mL methanol and concentrate the filtrate. Later, extract the residue with 15 mL dichloromethane, followed by suction filtration, concentrated of the filtrate. Finally, the obtained oily substance (3S,5R)-1-amino-5-ethyl-pyrrolidine-3-methylcyanide is directly used in the next reaction. LCMS ESI(+) m/z: 140.1 (M+1).

Step K

The crude product compound (3S,5R)-1-amino-5-ethyl-pyrrolidine-3-methylcyanide from the previous step was dissolved in 12 mL of isopropanol, and N,N-diisopropyl-ethylamine was added in turn (1.86 g, 14.4 mmol) and compound 4-chloro-5-nitro-1-p-toluenesulfonyl-1H-pyrrolo[2,3-b]pyridine (758 mg, 2.16 mmol), heat to 85° C. under nitrogen protection. Stir and react for 16 h. Afterwards, concentrate the reaction solution and apply silica column chromatography to obtain the compound (3S,5R)-5-ethyl-1-((5-nitro-1-p-toluene sulfonyl-1H-pyrrolo[2,3-b] pyridine-4-yl)amino)pyrrolidine-3-cimetidine (282 mg, yield 43%). $^1$H NMR (400 MHz, CDCl$_3$) δ 9.17 (s, 1H), 8.08 (d, J=8.4 Hz, 2H), 7.60 (d, J=4.0 Hz, 1H), 7.47 (d, J=4.0 Hz, 1H), 7.31 (d, J=8.1 Hz, 2H), 3.61 (d, J=9.6 Hz, 1H), 3.21-3.13 (m, 1H), 2.98-2.90 (m, 1H), 2.80-2.73 (m, 1H), 2.62-2.53 (m, 1H), 2.40 (s, 3H), 1.52-1.43 (m, 1H), 1.31-1.22 (m, 2H), 0.87 (t, J=7.5 Hz, 3H). LCMS ESI(+) m/z: 455.1 (M+1).

Step L

Add the compound (3S,5R)-5-ethyl-1-((5-nitro-1-p-toluenesulfonyl-1H-pyrrolo[2,3-b]pyridin-4-yl)amino) pyrrolidine-3-Methyl cyanide (250 mg, 0.55 mmol) to 12 mL ethanol, and followed by the addition of iron powder (922 mg, 16.5 mmol) and saturated ammonium chloride (2 mL) in sequence at room temperature. Stir at 80° C. and react for 0.5 h. Filter the diatomite while it is hot, wash with 10 mL methanol, and concentrate the filtrate. Then, the residue is partitioned between 6 mL water and 20 mL ethyl acetate. Separate the organic phases and extract the aqueous phase twice with 20 mL ethyl acetate. Merge the organic phases, wash with 10 mL saturated salt water, and dry with anhydrous sodium sulfate. Finally, decompress and concentrate to obtain the crude product of the compound (3S,5R)-5-ethyl-1((5-amino-1-p-toluene sulfonyl-1H-pyrrorole [2,3-b]pyridine-4-yl) amino)pyrrolidine-3-cimetidine, which is directly used for the next step. LCMS ESI(+) m/z: 425.1 (M+1).

Step M

Add the crude product of compound (3S,5R)-5-ethyl-1-((5-amino-1-p-toluenesulfonyl-1H-pyrrolo[2,3-b]pyridine-4-yl)amino)pyrrolidine-3-methyl cyanide, triethyl orthoformate (122 mg, 0.82 mmol) and pyridine hydrochloride (6 mg, 0.05 mmol) to 15 mL methylbenzene. Heat to 115° C. under nitrogen and stir for 2 h. decompress and evaporate the reaction solution to remove the solvent. Finally, make the residues subject to silica column chromatography to obtain compound (3S,5R)-5-ethyl-1-(6-p-toluene sulfonyl imidazo[4,5-d]pyrrolo[2,3-b]pyridine-1(6H)-yl)pyrrolidine-3-methylcyanide (82 mg, yield 34%). $^1$H NMR (400 MHz, CDCl$_3$) δ 8.90 (s, 1H), 8.23-8.08 (m, 3H), 7.81 (s, 1H), 7.29 (d, J=8.0 Hz, 2H), 7.00 (s, 1H), 3.86-3.72 (m, 1H), 3.60-3.27 (m, 3H), 2.74-2.63 (m, 1H), 2.36 (s, 3H), 2.19-2.09 (m, 1H), 1.52-1.40 (m, 2H), 0.80 (t, J=7.5 Hz, 3H). LCMS ESI(+) m/z: 435.1 (M+1).

Step N

Dissolve the compound (3S,5R)-5-ethyl-1-(6-p-toluene sulfonyl imidazo[4,5-d]pyrrolo[2,3-b]pyridine-1(6H)-yl) pyrrole-3-methyl cyanide (79 mg, 0.18 mmol) in 6 mL methanol and add 1 N sodium hydroxide solution (2.0 mL, 2.0 mmol). Stir at 30° C. for 7 h. Dilute the reaction solution with 10 mL water. Then, decompress and evaporate the solution to remove methanol. Extract the residue 4 times with 10 mL ethyl acetate. Merge the organic phases, wash with 10 mL saturated brine, dry with anhydrous sodium sulfate, conduct suction filtration. Decompress and evaporate to remove the solvent. Afterwards, prepare the residues with HPLC to obtain the compound (3S,5R)-5-ethyl-1-(imidazo[4,5-d] pyrrolio [2,3-b] pyridine-1(6H)-yl)pyrrolidine-3-methylnitrile (20 mg, yield 40%). $^1$H NMR (400 MHz, DMSO-d$_6$) δ 11.85 (s, 1H), 9.10-8.01 (m, 2H), 7.46 (s, 1H), 6.76 (s, 1H), 3.92-3.52 (m, 4H), 2.67 (s, 1H), 1.98-1.87 (m, 1H), 1.40-1.26 (m, 2H), 0.72 (t, J=7.4 Hz, 3H). LCMS ESI(+) m/z: 281.2 (M+1).

Example 36

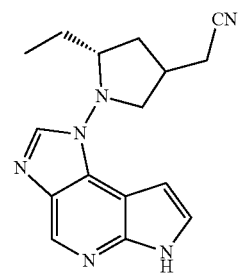 [SMILES: CC[C@@H]1CC(CC#N)CN1n1cnc2cnc3[nH]ccc3c21]

2-((5R)-5-ethyl-1-(imidazo[4,5-d]pyrrolo[2,3-b]pyridine-1(6H)-yl)pyrrolidine-3-yl)acetonitrile The specific implementation methods are as follows:

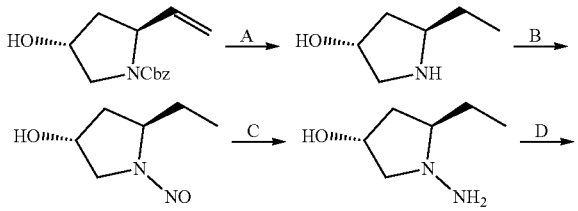

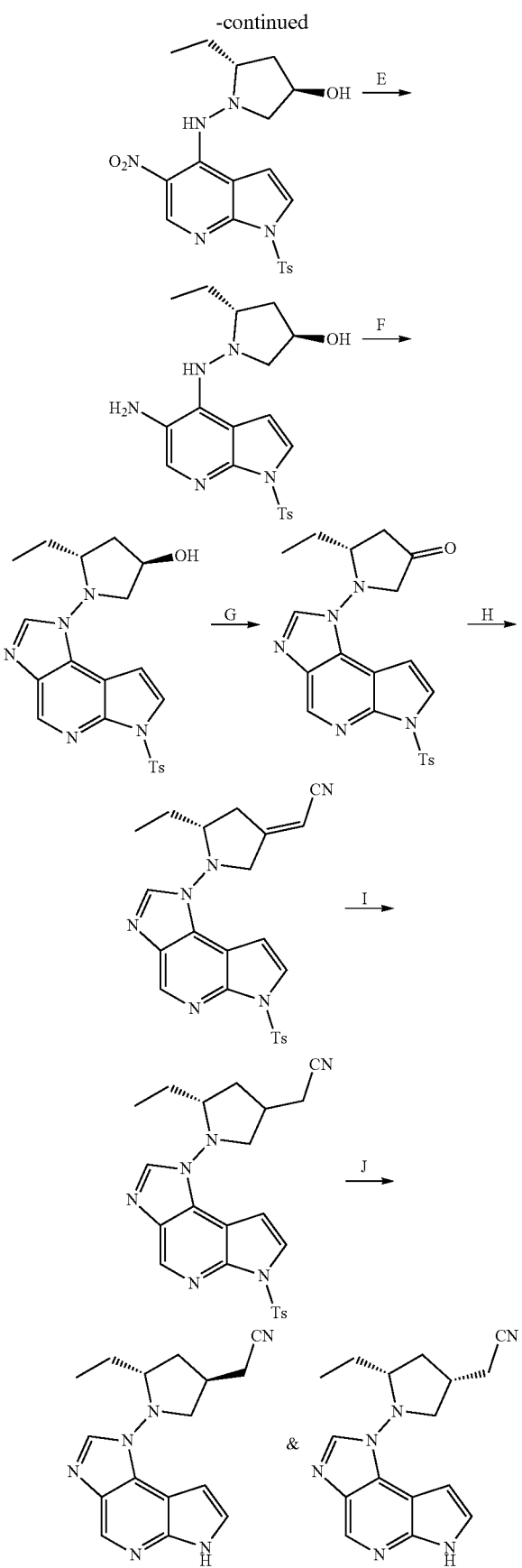

Step A

Dissolve the compound (2S,4R)—N-Cbz-2-vinyl-4-hydroxypyrrolidine (3.50 g, 14.2 mmol) in 200 mL methanol, and add 10% palladium on carbon (700 mg) under nitrogen protection. Replace hydrogen. Stir at room temperature for 16 h. Conduct suction filtration, wash twice with 20 mL methanol. Finally, decompress and concentrate the filtrate to obtain the compound (2S,4R)-2-ethyl-4-hydroxypyrrolidine (1.63 g, yield 100%). $^1$H NMR (400 MHz, CDCl$_3$) δ 4.42 (t, J=5.0 Hz, 1H), 3.37-3.27 (m, 1H), 3.19 (dd, J=11.9, 4.7 Hz, 1H), 2.92 (d, J=11.9 Hz, 1H), 1.95 (dd, J=13.5, 6.4 Hz, 1H), 1.62-1.37 (m, 3H), 0.95 (t, J=7.4 Hz, 3H). LCMS ESI(+) m/z: 116.1 (M+1).

Step B

Dissolve the compounds (2S,4R)-2-ethyl-4-hydroxypyrrolidine (1.63 g, 14.2 mmol) in 70 mL dichloromethane, followed by sodium nitrite (1.46 g, 21.2 mmol) and p-toluenesulfonic acid (4.04 g, 21.2 mmol) monohydrate at room temperature. Stir the mixture for 3 h, and wash the filter mass with 20 mL dichloromethane. Then, decompress and concentrate the filtrate to obtain the compound (2S,4R)-1-nitroso-2-ethyl-4-hydroxypyrrolidine (1.78 g, yield 87%) by silica gel column chromatography. $^1$H NMR (400 MHz, CDCl$_3$) δ 4.63-4.52 (m, 2H), 3.86 (d, J=15.8 Hz, 1H), 3.61 (ddd, J=15.5, 4.8, 1.7 Hz, 1H), 2.37-2.26 (m, 2H), 1.96-1.74 (m, 3H), 1.04 (t, J=7.5 Hz, 3H). LCMS ESI(+) m/z: 145.1 (M+1).

Step C

Dissolve the compound (2S,4R)-1-nitroso-2-ethyl-4-hydroxypyrrolidine (950 mg, 6.59 mmol) in 45 mL methanol, and sequentially add zinc powder (8.62 g, 132 mmol) and acetic acid drip by drip (9 mL) at room temperature. Stir the mixture at 30° C. for 20 min. Conduct suction filtration of the reaction solution, wash with 5 mL methanol, and concentrate the filtrate. Then, the obtained oily substance (2S,4R)-1-amino-2-ethyl-4-hydroxypyrrolidine is directly used in the next reaction. LCMS ESI(+) m/z: 131.1 (M+1).

Step D

Dissolve the crude product compound of the previous step (2S,4R)-1-amino-2-ethyl-4-hydroxypyrrolidine in 50 mL isopropyl alcohol, and successively add N,N-diisopropylethylamine (4.70 mL, 26.3 mmol) and compounds 4-chloro-5-nitro-1-p-toluene sulfonyl-1H-pyrrolio[2,3-b] pyridine (3.01 g, 8.56 mmol). Heat to 85° C. under nitrogen protection. Stir and react for 16 h. then, concentrate the reaction solution and apply silica column chromatography to obtain the compound (3R,5R)-5-ethyl-1-((5-nitro-1H-p-toluene sulfonyl-1-[2,3-b]pyrrole and pyridine-4-yl)amino) pyrrolidine-3-methyl cyanide (1.61 g, yield 55%). $^1$H NMR (400 MHz, CDCl$_3$) δ 9.46 (s, 1H), 9.07 (s, 1H), 8.07 (d, J=8.4 Hz, 2H), 7.51 (t, J=4.9 Hz, 1H), 7.35-7.28 (m, 3H), 4.53 (d, J=5.5 Hz, 1H), 3.67 (dd, J=11.0, 5.5 Hz, 1H), 3.19-3.09 (m, 1H), 2.76 (dd, J=11.1, 3.4 Hz, 1H), 2.40 (s, 3H), 2.13-2.05 (m, 1H), 1.84-1.74 (m, 1H), 1.68-1.62 (m, 2H), 1.40-1.27 (m, 1H), 0.84 (t, J=7.5 Hz, 3H). LCMS ESI(+) m/z: 446.1 (M+1).

Step E

Add the compound (3R,5R)-5-ethyl-1-((5-nitro-1-p-toluenesulfonyl-1H-pyrrolo[2,3-b]pyridine-4-yl)amino)pyrrolidine-3-Methyl cyanide (1.61 g, 3.61 mmol)] to 80 mL ethanol, and followed by addition of the iron powder (6.05 g, 108 mmol) and saturated ammonium chloride (20 mL) in sequence at room temperature. Stir at 80° C. for 20 min. Filter through diatomite while it is hot, wash with 10 mL methanol, and concentrate the filtrate. Then, the residue is partitioned between 50 mL water and 50 mL ethyl acetate. Separate the organic phase extract the aqueous phase twice with 50 mL ethyl acetate. Merge the organic phases, wash with 10 mL saturated brine, and dry with anhydrous sodium sulfate.

Step F

Dissolve compounds (3R,5R-5-ethyl-1-(5-amino-1-p-toluene sulfonyl-1H-pyrrolo[2,3-b]pyridine-4-yl) amino)pyrrolidine-3-methylcyanide (75 mg, 0.18 mmol) in 1 mL acetic acid, and add triethyl protoformate (40 mg, 0.27 mmol) under nitrogen. Stir 100° C. for 5 minutes under nitrogen condition. Decompress and evaporate the reaction solution to remove the solvent. Finally, make the residues subject to silica column chromatography (pure ethyl acetate) to obtain the compound (3R,5R)-5-ethyl-1-(6-p-toluene sulfonyl imidazo[4,5-d]pyrrolo[2,3-b]pyridine-1 (6H)-yl) pyrrolidine-3-ol (55 mg, yield 72%). LCMS ESI(+) m/z: 426.1 (M+1).

Step G

Dissolve compound (3R,5R)-5-ethyl-1-(6-p-toluene sulfonyl imidazo[4,5-d]pyrrolo[2,3-b]pyridine-1(6H)-yl)pyrrole-3-ol (55 mg, 0.13 mmol) in 10 mL dichloromethane and add Dess Martin's oxidant (112 mg, 0.26 mmol) at room temperature. Stir at room temperature. Conduct suction filtration with diatomite and wash with 10 mL dichloromethane. Add saturated sodium bicarbonate (10 mL) to the filtrate and stir for 30 min. Then, conduct suction filtration, separate the organic and extract the aqueous phases twice with dichloromethane (10 mL). Then, merge the organic phases and wash with 5 mL saline solution. Dry with anhydrous sodium sulfate, remove the solvent through the decompression and evaporation. Afterwards, apply silica column chromatography to obtain the compound (3R,5R)-5-ethyl-1-(6-p-toluene sulfonyl imidazo[4,5-d] pyrrolo[2,3-b]pyridine-1 (6H)-yl)pyrrolidine-3-ketone (25 mg, yield 45%). LCMS ESI(+) m/z: 424.1 (M+1).

Step H

Dissolve diethyl(cyanomethyl)phosphonate (67 mg, 0.38 mmol) in 8 mL tetrahydrofuran and add 60% sodium hydrogen (15 mg, 0.38 mmol) under nitrogen in an ice bath. Stir at room temperature for 0.5 h. Under ice bath protected by nitrogen, add compound tetrahydrofuran solution (1 mL) of compound (3R,5R)-5-ethyl-1-(6-p-toluene sulfonyl imidazo[4,5-d]pyrrolo[2,3-b]pyridine-1(6H)-yl)pyrrolidine-3-ketone (80 mg, 0.19 mmol). Stir for 2 h in ice bath. Add 5 mL saturated ammonium chloride solution, raise the temperature to room temperature and stir for 5 min. Then, extract with ethyl acetate (3*5 mL), merge the organic phases, wash with 3 mL saturated salt solution, dry with anhydrous sodium sulfate. Afterwards, decompress and concentrate the crude compound (R)-2-(5-ethyl-1-(6-p-toluene sulfonyl imidazo[4,5-d]pyrrolo[2,3-b]pyridine-1(6H)-yl)pyrrolidine-3-ylidene) acetonitrile, which is directly used in the next step. LCMS ESI(+) m/z: 447.1 (M+1).

Step I

Dissolve the crude product compound (R)-2-(5-ethyl-1-(6-p-toluene sulfonyl imidazo[4,5-d]pyrrolo[2,3-b]pyridine-1(6H)-yl)pyrrolidine-3-ylidene)acetonitrile in 10 methanol, and add 10% palladium on carbon (84 mg) under nitrogen protection. Replace hydrogen. Stir at room temperature for 16 h. Conduct suction filtration, wash twice with 5 mL methanol. Then, compress and concentrate the filtrate. Finally apply silica gel column chromatography to obtain the compound 2-((5R)-5-ethyl-1-(6-p-toluene sulfonyl imidazo[4,5-d]pyrrolo[2,3-b]pyridine-1(6H)-yl)pyrrolidin-3-yl)acetonitrile (67 mg, 79% yield). LCMS ESI(+) m/z: 449.2 (M+1).

Step J

Dissolve the compound 2-((5R)-5-ethyl-1-(6-p-toluene sulfonyl imidazo[4,5-d]pyrrolo[2,3-b]pyridine-1(6H)-yl) pyrrolidin-3-yl)acetonitrile (30 mg, 0.06 mmol) in 3 mL methanol and add 1 N sodium hydroxide solution (1.0 mL, 1.0 mmol). Stir at 30° C. for 6 h. Extract the residues 4 times with 5 mL ethyl acetate. Then, merge the organic phases and wash them with 1 mL saturated salt solution. Dry with anhydrous sodium sulfate, conduct suction filtration and remove the solvent through decompression and evaporation. After these steps, prepare the residues by silica column chromatography and high performance liquid chromatography to obtain the compound 2-((3S,5R)-5-ethyl-1-(imidazo[4,5-d]pyrrolo[2,3-b]pyridine-1(6H)-yl)pyrrolidin-3-yl) acetonitrile (36-1, 10 mg, yield 58%) and 2-((3R,5R)-5-ethyl-1-(imidazo[4,5-d]pyrrolo[2,3-b]pyridine-1(6H)-yl) pyrrolidin-3-yl) acetonitrile (36-2, 8 mg, 20% yield).

Compound 36-1:2-((3S,5R)-5-ethyl-1-(imidazo[4,5-d] pyrrolo[2,3-b]pyridine-1(6H)-yl)pyrrolidin-3-yl) acetonitrile:

$^1$H NMR (400 MHz, DMSO-$d_6$) δ 11.79 (s, 1H), 9.10-7.84 (m, 2H), 7.42 (s, 1H), 6.84 (s, 1H), 3.94-3.44 (m, 2H), 3.37-3.25 (m, 2H), 3.05-2.71 (m, 3H), 1.52-1.40 (m, 1H), 1.35-1.19 (m, 2H), 0.69 (t, J=7.5 Hz, 3H). LCMS ESI(+) m/z: 295.1 (M+1).

Compound 36-2: 2-((3R,5R)-5-ethyl-1-(imidazo[4,5-d] pyrrolo[2,3-b]pyridine-1(6H)-yl)pyrrolidin-3-yl) acetonitrile:

$^1$H NMR (400 MHz, DMSO-$d_6$) δ 11.79 (s, 1H), 9.10-7.84 (m, 2H), 7.42 (s, 1H), 6.84 (s, 1H), 3.94-3.44 (m, 2H), 3.37-3.25 (m, 2H), 3.05-2.71 (m, 3H), 1.52-1.40 (m, 1H), 1.35-1.19 (m, 2H), 0.69 (t, J=7.5 Hz, 3H). LCMS ESI(+) m/z: 295.1 (M+1).

Example 37

Activity Detection of Small Molecule Inhibitors of JAK Kinase
Experimental Scheme
1. Reagent Preparation
   (1) kinase reaction buffer
   Prepare the kinase reaction buffer with the following components: 50 mM HEPES, pH 7.5, 1 mM EGTA, 10 mM $MgCl_2$, 2 mM DTT, 0.01% Tween20
   (2) 1× detection buffer
   To prepare detection buffer, dilute 10× detection buffer to 1× with deionized water 9:1
   (3) 4× kinase solution
   Dilute JAK to 4× final concentration by JAK reaction buffer (JAK1: 40 nM, JAK2: 0.5 nM)
   (4) 4× substrate solution Dilute ULight™-JAK-1 (Tyr1023) substrate to 200 nM by kinase reaction buffer (final concentration: 50 nM)

(5) 4×ATP solution

Dilute ATP to 4× final concentration by kinase reaction buffer (JAK1: 160 μM, JAK2: 40 μM)

(6) 4× compound testing solution

DMSO dissolves the testing compound into 10 mM stock solution, then prepared to the desired concentration with 3-fold serial dilution, and 10 concentration points were set for each compound. Besides, the final concentration range of the testing compound is: 10 μM-0.5 nM (7) 4× enzyme reaction termination liquid 1× test buffer dissolves EDTA to 40 mM (EDTA final concentration: 10 mM)

(8) 4× antibody detection solution

1× test buffer dilutes Eu labeled antibody (anti-phospho-tyrosine (PT66)) to 8 nM (antibody final concentration: 2 nM)

2. Experimental Process (1) Successively add 2.5 μL 4×JAK solution, and 2.5 μL of diluted 4× test compound solution in different concentrations to the 384 microporous plate, and set 2 multi-wells for each concentration. Meanwhile, set enzyme solution blank control group and negative control group (DMSO group).

(2) Shake the 384-hole plate, mix enzymes and compounds, centrifuge at 1000 rpm for 1 minute, and incubate at room temperature for 60 minutes (3) Add 2.5 μL of 4× substrate solution to a 384-hole plate and centrifuge at 1000 rpm for 1 min (4) Add 2.5 μL of 4×ATP solution to the 384 multi-well plate and centrifuge at 1000 rpm for 1 minute to initiate the enzyme reaction.

(5) JAK1 reacts at room temperature for 2 h, and JAK2 react at room temperature for 1 h.

(6) The final concentrations of each group of the JAK1 reaction are: JAK1: 10 nM, substrate: 50 nM, ATP: 40 uM, and the final concentration range of the test compound is: 10 μM-0.5 nM The final concentrations of each group of the JAK2 reaction are: JAK2: 0.125 nM, substrate: 50 nM, ATP: 10 μM, and the final concentration range of test compounds is: 10 μM-0.5 nM (7) After the enzyme reaction, add 5 μL of 4× enzyme reaction stop solution to each well of the 384-well plate with 1000 rpm, centrifuge for 1 minute, and incubate at room temperature for 5 min.

(8) Add 5 μL of 4× detection antibody solution to each well of a 384-well plate (final concentration of detection antibody is 2 nM) with 1000 rpm, centrifuge for 1 minute, and incubate at room temperature for 1 h.

(10) After antibody incubation, measure the signal value of each well on an Envision plate reader 3. Data Analysis (1) Taking the enzyme solution blank control group as 100% inhibition rate and the negative control group (DMSO group) as 0% inhibition rate, calculate the percentage inhibition rate corresponding to each concentration of the tested compounds (2) In GraphPad Prism software, nonlinear regression analysis is performed on the concentration logarithm of the test compound and the corresponding percentage inhibition rate to obtain the half-inhibitory concentration (IC50) of the test compound. The experimental results obtained are listed in Table 1.

TABLE 1

| Example | JAK1 (IC$_{50}$, nM) | JAK2 (IC$_{50}$, nM) |
|---|---|---|
| 1 | 23.8 | 70.9 |
| 2 | 0.28 | 1.70 |
| 3 | 0.17 | 0.28 |
| 4 | 0.47 | 0.95 |
| 5 | 0.28 | 1.45 |
| 6 | 0.66 | 3.89 |
| 7 | 0.08 | 4.00 |
| 8 | 1.50 | 5.00 |
| 9 | 0.14 | 0.70 |
| 10 | 0.80 | 6.10 |
| 11 | 0.57 | 2.98 |
| 12 | 1.77 | 3.28 |
| 13 | 16.0 | 56.7 |
| 14 | 13.5 | 7.50 |
| 15 | 5.14 | 16.1 |
| 16 | 1.31 | 16.1 |
| 17 | 2.0 | 1.2 |
| 18 | 6.31 | 13.8 |
| 19 | 2.37 | 6.01 |
| 20 | 4.30 | 1.90 |
| 21 | 0.92 | 4.77 |
| 22 | 1.60 | 4.04 |
| 23 | 2.71 | 6.07 |
| 24 | 7.72 | 46.6 |
| 25 | 5.20 | 5.30 |
| 26 | 41.7 | 151 |
| 27 | 1.70 | 2.30 |
| 28 | 3.50 | 13.1 |
| 29 | 13.9 | 27.5 |
| 30 | 2.80 | 28.1 |
| 31 | 6.90 | 71.8 |
| 32 | 6.80 | 15.3 |
| 33 | 11.2 | 29.1 |
| 34 | 73.8 | 51.7 |
| 35 | 9.50 | 61.3 |
| 36-1 | 6.8 | 23.5 |
| 36-2 | 43.6 | 126.9 |

What claimed is:

1. A cyano-substituted cyclic hydrazine derivative, wherein the cyclic hydrazine derivative is a compound represented by the following structural formula or a stereoisomer, geometric isomer, tautomer, racemate, hydrate, solvate, pharmaceutically acceptable salt, or prodrug thereof;

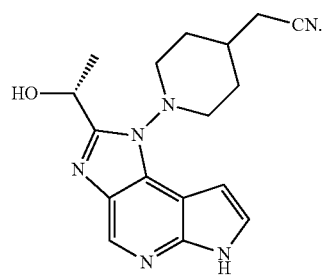

2. A cyano-substituted cyclic hydrazine derivative, wherein the cyclic hydrazine derivative is a compound represented by the following structural formula or a stereoisomer, geometric isomer, tautomer, racemate, hydrate, solvate, pharmaceutically acceptable salt, or prodrug thereof:

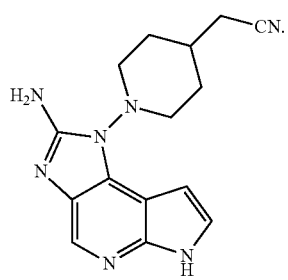 [SMILES: N#CCC1CCN(n2c(N)nc3cnc4[nH]ccc4c32)CC1]

3. A pharmaceutical composition comprising the cyano-substituted cyclic hydrazine derivative of claim 1 and at least one of pharmaceutically acceptable carriers, excipients, diluents, adjuvants or vehicles;

wherein, the amount of the cyano-substituted cyclic hydrazine derivative is 0.01-99.9% of the total mass of the pharmaceutical composition.

4. The pharmaceutical composition of claim 3, wherein the pharmaceutical composition contains additional therapeutic agents, and the additional therapeutic agents are selected from the group consisting of anti-inflammatory drugs, immunomodulators or immunosuppressive agents, neurotrophic factors, active agents for treating cardiovascular diseases, active agents for treating diabetes and active agents for treating autoimmune diseases.

5. A method for preventing, handling, treating or alleviating autoimmune diseases or proliferative diseases of a patient, and/or for inhibiting or regulating the protein kinase activity, comprising administering the cyano-substituted cyclic hydrazine derivative of claim 1 to a subject in need thereof.

6. A method for preventing, handling, treating or alleviating autoimmune diseases or proliferative diseases of a patient, and/or for inhibiting or regulating the protein kinase activity, comprising administering the pharmaceutical composition of claim 3 to a subject in need thereof.

* * * * *